(12) United States Patent
Dong et al.

(10) Patent No.: US 12,651,768 B2
(45) Date of Patent: Jun. 9, 2026

(54) LITHIUM ION CELLS WITH HIGH PERFORMANCE ELECTROLYTE AND SILICON OXIDE ACTIVE MATERIALS ACHIEVING LONG CYCLE LIFE, FAST CHARGE AND HIGH THERMAL STABILITY

(71) Applicant: Zenlabs Energy, Inc., Fremont, CA (US)

(72) Inventors: Yingnan Dong, Fremont, CA (US); Herman A. Lopez, Sunnyvale, CA (US); Kevin Hays, Fremont, CA (US); Yu-Hsin Huang, San Jose, CA (US)

(73) Assignee: Ionblox, Inc., Fremont, CA (US)

( * ) Notice: Subject to any disclaimer, the term of this patent is extended or adjusted under 35 U.S.C. 154(b) by 775 days.

(21) Appl. No.: 17/831,180

(22) Filed: Jun. 2, 2022

(65) Prior Publication Data

US 2022/0393226 A1 Dec. 8, 2022

Related U.S. Application Data

(60) Provisional application No. 63/196,536, filed on Jun. 3, 2021.

(51) Int. Cl.
H01M 10/056 (2010.01)
H01M 4/36 (2006.01)
(Continued)

(52) U.S. Cl.
CPC ......... H01M 10/056 (2013.01); H01M 4/364 (2013.01); H01M 4/386 (2013.01);
(Continued)

(58) Field of Classification Search
CPC .... H01M 10/056; H01M 4/364; H01M 4/386; H01M 4/485; H01M 4/587; H01M 4/622;
(Continued)

(56) References Cited

U.S. PATENT DOCUMENTS 4,857,423 A    8/1989   Abraham et al.
5,192,629 A    3/1993   Guyomard et al.
(Continued)

FOREIGN PATENT DOCUMENTS

CN    101587970 A    11/2009
CN    108933260 A    12/2018
(Continued)

OTHER PUBLICATIONS

Achiha et al., "Electrochemical Behavior of Nonflammable Organo-Fluorine Compunds for Lithium Ion Batteries," Journal of the Electrochemical Society 156(6): A483-A488 (2009).
(Continued)

*Primary Examiner* — Lisa S Park
(74) *Attorney, Agent, or Firm* — Christensen Fonder Dardi; Elizabeth Gallo; Peter Dardi

(57) ABSTRACT

Improved electrolytes for lithium-based cells can include a dual salt combination of lithium hexafluorophosphate and lithium bis(fluorosulfonyl)imide or lithium bis(trifluoro-methanesulfonyl)imide, and a solvent that includes dimethyl carbonate, ethylmethyl carbonate and 5 to 25 volume percent of fluoroethylene carbonate. The improved electrolytes can include additives triethyl phosphate, ethoxy(pentafluo-ro)cyclotriphosphazene, 1,3-propane sultone, or mixtures thereof, and have small limited amounts of additional cosol-vents and/or lithium-free organic additives. The improved electrolytes can be used to prepare lithium-based cells with silicon-based active materials as negative electrodes and nickel rich lithium metal oxides as positive electrodes. The lithium-based cells can achieve high energy, high power, fast charge and long cycle life along with good thermal stability.

17 Claims, 30 Drawing Sheets

(51) Int. Cl.

| | |
|---|---|
| *H01M 4/38* | (2006.01) |
| *H01M 4/485* | (2010.01) |
| *H01M 4/587* | (2010.01) |
| *H01M 4/62* | (2006.01) |
| *H01M 10/0525* | (2010.01) |
| H01M 4/02 | (2006.01) |

(52) U.S. Cl.
CPC ........... *H01M 4/485* (2013.01); *H01M 4/587* (2013.01); *H01M 4/622* (2013.01); *H01M 4/625* (2013.01); *H01M 10/0525* (2013.01); *H01M 2004/021* (2013.01)

(58) Field of Classification Search
CPC ............. H01M 4/625; H01M 10/0525; H01M 2004/021; H01M 4/131; H01M 10/0566; H01M 4/623; H01M 10/0568; Y02E 60/10
See application file for complete search history.

(56) References Cited

U.S. PATENT DOCUMENTS

| 5,395,711 | A | 3/1995 | Tahara et al. |
|---|---|---|---|
| 5,422,203 | A | 6/1995 | Guyomard et al. |
| 5,484,669 | A | 1/1996 | Okuno et al. |
| 5,521,027 | A | 5/1996 | Okuno et al. |
| 5,743,921 | A | 4/1998 | Nazri et al. |
| RE35,818 | E | 6/1998 | Tahara et al. |
| 5,830,600 | A | 11/1998 | Narang et al. |
| 5,908,717 | A | 6/1999 | Pendalwar et al. |
| 5,922,494 | A | 7/1999 | Barker et al. |
| 5,994,000 | A | 11/1999 | Ein-Ein et al. |
| 5,998,065 | A | 12/1999 | Tsutsumi et al. |
| 6,153,338 | A | 11/2000 | Gan et al. |
| 6,235,427 | B1 | 5/2001 | Idota et al. |
| 6,291,107 | B1 | 9/2001 | Shimizu et al. |
| 6,346,351 | B1 | 2/2002 | Yde-Andersen et al. |
| 6,444,370 | B2 | 9/2002 | Barker et al. |
| 6,455,200 | B1 | 9/2002 | Prakash et al. |
| 6,482,549 | B2 | 11/2002 | Yoshimura et al. |
| 6,492,064 | B1 | 12/2002 | Smart et al. |
| 6,506,524 | B1 | 1/2003 | McMillan et al. |
| 6,682,849 | B2 | 1/2004 | Narang et al. |
| 6,692,874 | B2 | 2/2004 | Kim et al. |
| 6,746,804 | B2 | 6/2004 | Gan et al. |
| 6,783,896 | B2 | 8/2004 | Tsujioka et al. |
| 6,787,267 | B2 | 9/2004 | Tsujioka et al. |
| 6,787,268 | B2 | 9/2004 | Koike et al. |
| 6,787,269 | B2 | 9/2004 | Sekino et al. |
| 6,855,458 | B1 | 2/2005 | Kim et al. |
| 6,884,546 | B1 | 4/2005 | Fujita et al. |
| 6,942,949 | B2 | 9/2005 | Besenhard et al. |
| 6,958,198 | B2 | 10/2005 | Iwamoto et al. |
| 7,008,722 | B2 | 3/2006 | Huang |
| 7,022,145 | B2 | 4/2006 | Kim et al. |
| 7,026,074 | B2 | 4/2006 | Chen et al. |
| 7,074,523 | B2 | 7/2006 | Arai et al. |
| 7,172,834 | B1 | 2/2007 | Jow et al. |
| 7,214,446 | B1 | 5/2007 | Bi et al. |
| 7,226,704 | B2 | 6/2007 | Panitz et al. |
| 7,229,717 | B2 | 6/2007 | Yamaguchi et al. |
| 7,235,334 | B2 | 6/2007 | Kim et al. |
| 7,255,965 | B2 | 8/2007 | Xu et al. |
| 7,311,993 | B2 | 12/2007 | Ivanov et al. |
| 7,348,103 | B2 | 3/2008 | Ivanov et al. |
| 7,378,190 | B2 | 5/2008 | Yanai et al. |
| 7,416,813 | B2 | 8/2008 | Fujihara et al. |
| 7,432,015 | B2 | 10/2008 | Jeong et al. |
| 7,452,632 | B2 | 11/2008 | Lee et al. |
| 7,455,933 | B2 | 11/2008 | Shimura et al. |
| 7,465,517 | B2 | 12/2008 | Ivanov et al. |
| 7,491,471 | B2 | 2/2009 | Yamaguchi et al. |
| 7,507,503 | B2 | 3/2009 | Amine et al. |
| 7,510,803 | B2 | 3/2009 | Adachi et al. |
| 7,700,221 | B2 | 4/2010 | Yeo |
| 7,754,389 | B2 | 7/2010 | Yamaguchi et al. |
| 7,794,511 | B2 | 9/2010 | Wensley et al. |
| 7,923,150 | B2 | 4/2011 | Yamamota et al. |
| 8,187,752 | B2 | 5/2012 | Buckley et al. |
| 8,227,974 | B2 | 7/2012 | Hayafuji et al. |
| 8,277,969 | B2 | 10/2012 | Kobayashi et al. |
| 8,389,160 | B2 | 3/2013 | Venkatachalam et al. |
| 8,394,534 | B2 | 3/2013 | Lopez et al. |
| 8,399,136 | B2 | 3/2013 | Ohashi et al. |
| 8,465,873 | B2 | 6/2013 | Lopez et al. |
| 8,535,832 | B2 | 9/2013 | Karthikeyan et al. |
| 8,663,849 | B2 | 3/2014 | Ventakachalam et al. |
| 8,765,306 | B2 | 7/2014 | Amiruddin et al. |
| 8,928,286 | B2 | 1/2015 | Amiruddin et al. |
| 8,993,177 | B2 | 3/2015 | Amiruddin et al. |
| 9,083,062 | B2 | 7/2015 | Kumar et al. |
| 9,139,441 | B2 | 9/2015 | Anguchamy et al. |
| 9,142,858 | B2 | 9/2015 | Nakanishi et al. |
| 9,159,990 | B2 | 10/2015 | Amiruddin et al. |
| 9,166,222 | B2 | 10/2015 | Amiruddin et al. |
| 9,190,694 | B2 | 11/2015 | Lopez et al. |
| 9,552,901 | B2 | 1/2017 | Amiurddin et al. |
| 9,601,228 | B2 | 3/2017 | Deng et al. |
| 9,627,716 | B2 | 4/2017 | Yang et al. |
| 9,780,358 | B2 | 10/2017 | Masarapu et al. |
| 9,825,335 | B2 | 11/2017 | Lim et al. |
| 9,843,041 | B2 | 12/2017 | Lopez et al. |
| 10,218,033 | B1 | 2/2019 | Bhardwaj et al. |
| 10,290,871 | B2 | 5/2019 | Masarapu et al. |
| 10,727,535 | B2 | 7/2020 | Yang et al. |
| 10,763,547 | B1 * | 9/2020 | Wang ................ H01M 10/0525 |
| 10,886,526 | B2 | 1/2021 | Anguchamy et al. |
| 11,094,925 | B2 | 8/2021 | Venkatachalam et al. |
| 2002/0037458 | A1 | 3/2002 | Yamaguchi et al. |
| 2002/0084445 | A1 | 7/2002 | Garbe |
| 2002/0102466 | A1 | 8/2002 | Hwang et al. |
| 2003/0157407 | A1 | 8/2003 | Kosuzu et al. |
| 2003/0165733 | A1 | 9/2003 | Takehara et al. |
| 2004/0023117 | A1 | 2/2004 | Imachi et al. |
| 2004/0033419 | A1 | 2/2004 | Funabiki |
| 2004/0072072 | A1 | 4/2004 | Suzuki et al. |
| 2004/0151951 | A1 | 8/2004 | Hyung et al. |
| 2004/0214085 | A1 | 10/2004 | Sheem et al. |
| 2005/0008941 | A1 | 1/2005 | Kim et al. |
| 2005/0019670 | A1 | 1/2005 | Amine et al. |
| 2005/0031963 | A1 | 2/2005 | Im et al. |
| 2005/0042520 | A1 | 2/2005 | Roh et al. |
| 2005/0233207 | A1 | 10/2005 | Kim |
| 2005/0233213 | A1 | 10/2005 | Lee et al. |
| 2006/0040182 | A1 | 2/2006 | Kawakami et al. |
| 2006/0115734 | A1 | 6/2006 | Ishihara et al. |
| 2006/0172201 | A1 | 8/2006 | Yasukawa et al. |
| 2006/0194119 | A1 | 8/2006 | Son et al. |
| 2006/0228626 | A1 | 10/2006 | Kawashima et al. |
| 2006/0269834 | A1 | 11/2006 | West et al. |
| 2006/0281012 | A1 | 12/2006 | Ugawa et al. |
| 2006/0286459 | A1 | 12/2006 | Zhao et al. |
| 2007/0003836 | A1 | 1/2007 | Suzuki et al. |
| 2007/0148549 | A1 | 6/2007 | Kobayashi et al. |
| 2007/0287071 | A1 | 12/2007 | Chiga et al. |
| 2008/0008933 | A1 | 1/2008 | Lampe-Onnerud |
| 2008/0026297 | A1 | 1/2008 | Chen et al. |
| 2008/0063945 | A1 | 3/2008 | Ivanov et al. |
| 2008/0131772 | A1 | 6/2008 | Jambunathan et al. |
| 2008/0131783 | A1 | 6/2008 | Choi et al. |
| 2008/0193831 | A1 | 8/2008 | Mah et al. |
| 2008/0226988 | A1 | 9/2008 | Minami et al. |
| 2008/0254353 | A1 | 10/2008 | Takezawa |
| 2008/0261115 | A1 | 10/2008 | Saito et al. |
| 2009/0023065 | A1 | 1/2009 | Hwang et al. |
| 2009/0092900 | A1 | 4/2009 | Obana et al. |
| 2009/0111028 | A1 | 4/2009 | Lee et al. |
| 2009/0117466 | A1 | 5/2009 | Zhamu et al. |
| 2009/0142670 | A1 | 6/2009 | Wang et al. |
| 2009/0214952 | A1 | 8/2009 | Wakita et al. |
| 2009/0233178 | A1 | 9/2009 | Saidi et al. |
| 2009/0239151 | A1 | 9/2009 | Nakanishi et al. |
| 2009/0253042 | A1 | 10/2009 | Sun et al. |

(56) References Cited

U.S. PATENT DOCUMENTS

| | | | |
|---|---|---|---|
| 2009/0253046 A1 | 10/2009 | Smart et al. | |
| 2009/0263721 A1 | 10/2009 | Haruna et al. | |
| 2009/0297937 A1 | 12/2009 | Lampe-Onnerud et al. | |
| 2009/0317721 A1 | 12/2009 | Shirane et al. | |
| 2009/0317722 A1 | 12/2009 | Watanabe | |
| 2010/0035147 A1 | 2/2010 | Kotato et al. | |
| 2010/0086854 A1 | 4/2010 | Kumar et al. | |
| 2010/0119942 A1 | 5/2010 | Kumar | |
| 2010/0120179 A1 | 5/2010 | Zhamu et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0111294 A1 | 5/2011 | Lopez et al. | |
| 2011/0111298 A1 | 5/2011 | Lopez et al. | |
| 2011/0111304 A1 | 5/2011 | Cui et al. | |
| 2011/0117446 A1 | 5/2011 | Lucht et al. | |
| 2011/0136019 A1 | 6/2011 | Amiruddin et al. | |
| 2011/0163274 A1 | 7/2011 | Plee et al. | |
| 2011/0165474 A1 | 7/2011 | Im et al. | |
| 2011/0171529 A1 | 7/2011 | Kono et al. | |
| 2011/0244331 A1 | 10/2011 | Karthikeyan et al. | |
| 2012/0045670 A1 | 2/2012 | Stefan et al. | |
| 2012/0070741 A1 | 3/2012 | Liu et al. | |
| 2012/0070746 A1 | 3/2012 | Mikahylik et al. | |
| 2012/0082877 A1 | 4/2012 | Song et al. | |
| 2013/0122353 A1 | 5/2013 | Kawasaki et al. | |
| 2013/0157147 A1 | 6/2013 | Li et al. | |
| 2013/0224585 A1 | 8/2013 | Oh et al. | |
| 2013/0295439 A1 | 11/2013 | Masarapu et al. | |
| 2014/0308585 A1 | 10/2014 | Han et al. | |
| 2014/0370387 A1 | 12/2014 | Anguchamy et al. | |
| 2015/0037690 A1 | 2/2015 | Dalavi et al. | |
| 2015/0050535 A1 | 2/2015 | Amiruddin et al. | |
| 2015/0064549 A1* | 3/2015 | Pinnell | H01M 10/0567 |
| | | | 429/163 |
| 2015/0086873 A1 | 3/2015 | Hotta et al. | |
| 2016/0006021 A1 | 1/2016 | Lopez et al. | |
| 2016/0079591 A1 | 3/2016 | Yang et al. | |
| 2017/0155133 A1* | 6/2017 | Lee | H01M 4/62 |
| 2017/0194627 A1 | 7/2017 | Deng et al. | |
| 2018/0034039 A1 | 2/2018 | Masarapu et al. | |
| 2018/0034058 A1* | 2/2018 | Suh | H01M 4/587 |
| 2018/0062206 A1 | 3/2018 | Yang et al. | |
| 2018/0175459 A1* | 6/2018 | Mccalla | H01M 4/625 |
| 2018/0309169 A1 | 10/2018 | Yang et al. | |
| 2019/0081359 A1* | 3/2019 | Yushin | H01M 10/0525 |
| 2019/0148773 A1 | 5/2019 | Kim et al. | |
| 2019/0207209 A1* | 7/2019 | Venkatachalam | H01M 4/587 |
| 2020/0168955 A1 | 5/2020 | Shimanuki et al. | |
| 2020/0212486 A1 | 7/2020 | Xu et al. | |
| 2020/0411901 A1 | 12/2020 | Dong et al. | |
| 2021/0407742 A1 | 12/2021 | Raman et al. | |
| 2022/0006090 A1 | 1/2022 | Hays et al. | |
| 2022/0109190 A1 | 4/2022 | Liang et al. | |

FOREIGN PATENT DOCUMENTS

| | | | |
|---|---|---|---|
| CN | 109119631 A | 1/2019 | |
| CN | 111139002 A | 5/2020 | |
| EP | 2079120 A2 | 1/2009 | |
| JP | 09-45373 | 2/1997 | |
| JP | 10-255837 | 9/1998 | |
| JP | 2001-118568 | 4/2001 | |
| JP | 2005-332707 A | 12/2005 | |
| JP | 2007-165111 A | 6/2007 | |
| JP | 2007-250440 A | 9/2007 | |
| JP | 2014-203748 A | 10/2014 | |
| JP | 2015-079636 A | 4/2015 | |
| KR | 10-0493960 B1 | 9/2004 | |
| KR | 10-2004-0100058 A | 12/2004 | |
| KR | 10-2008-0082276 A | 9/2008 | |
| KR | 2012-0073603 A | 7/2012 | |
| KR | 10-2016-0081395 A | 7/2016 | |
| KR | 10-2017-0076592 A | 7/2017 | |
| KR | 20190058134 A | 5/2019 | |
| WO | 2004-040687 A1 | 5/2004 | |
| WO | 2005-083829 A1 | 9/2005 | |
| WO | 2007-126257 A1 | 11/2007 | |
| WO | 2008-079670 A1 | 7/2008 | |
| WO | 2009-022848 A1 | 2/2009 | |
| WO | 2013-082330 A1 | 6/2013 | |
| WO | 2018-051675 A1 | 3/2018 | |
| WO | 2018-212276 A1 | 11/2018 | |
| WO | 2019-065704 A1 | 4/2019 | |
| WO | 2019138056 A1 | 7/2019 | |
| WO | 2020-150154 A1 | 7/2020 | |
| WO | 2021-127997 A1 | 7/2021 | |
| WO | 2021-235760 A1 | 11/2021 | |
| WO | 2022-138490 A1 | 6/2022 | |

OTHER PUBLICATIONS

Arai et al. "Air Product's StabiLife™ Electrolyte Salts for Lithium Ion Batteries," Product Brochure; Air Products and Chemicals, Inc., Allentown, PA (2009).

Chen et al., "Develop & evaluate materials & additives that enhance thermal and overcharge abuse," presentation for Argonne National Laboratory, May 19, 2009.

Choi et al., "Effect of fluoroethylene carbonate additive on interfacial properties of silicon thin-film electrode" Journal of Power Sources 161 (2006) 1254-1259. (Abstract only).

Han et al., "Lithium bis(fluorosulfonyl)imide (LiFSI) as conducting salt for nonaqueous liquid electrolytes for lithium-ion batteries: Physicochemical and electrochemical properties", Journal of Pwer Sources, vol. 195 No. 7, p. 3623-3632, (Apr. 2011).

Ishikawa et al., "Li-ion Battery Performance with FSI-based Ionic Liquid Electrolyte and Fluorinated Solvent-based Electrolyte" ECS Trans. 33:29-36 (2010) (Abstract).

Li et al., "Lithium polyacrylate as a binder for tin-cobalt-carbon negative electrodes in lithium-ion batteries", Electrochimica Acta, 55, pp. 2991-2995, (2010).

Market Insight "Tasks of Korean rechargeable electrolyte industry," Solar & Energy col. published Dec. 27, 2010, http://www.solarenergy.com/eng/info/show.php?c_id=4899 (viewed Jun. 23, 2011).

Mcmillan et al. "Fluoroethylene carbonate electrolyte and its use in lithium ion batteries with graphite anodes," Journal of Power Sources 81-2: 20-26 (1999) (Abstract).

Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).

Plichta et al., "A low-temperature electrolyte for lithium and lithium-ion batteries," Journal of Power Sources, 88: 192-196 (2000).

Schweiger et al., "Optimization of Cycling Behavior of Lithium Ion Cells at 60° C. by Additives for Electrolytes Based on Lithium bis[1,2-oxalato(2-)-O,O'] borate," Int. J. Electrochem. Sci., 3: 427-443 (2008).

Smart et al., "Performance of low temperature electrolytes in experimental and prototype Li-ion cells," 5th International Energy Conversion Engineering Conference, St. Louis, Missouri Jun. 25-27, 2007, published by NASA's Jet Propulsion Laboratory, Pasadena California, 2007 (http://hdl.handle.net/2014/41350).

Tech Briefs, "Optimized Carbonate and Ester-Based Li-Ion Electrolytes," published by NASA's Jet Propulsion Laboratory, Pasadena, California (Apr. 1, 2008).

Tech Briefs, "Ester-Based Electrolytes for Low-Temperature Li-Ion Cells," published by NASA's Jet Propulsion Laboratory, Pasadena, California (Dec. 1, 2005).

"Technical Support Package for Optimized Carbonate and Ester-Based Li-Ion Electrolytes," NASA Tech Briefs NPO-44974, published by NASA's Jet Propulsion Laboratory, Pasadena, California (37 pages).

Xu et al., "Development of novel lithium borate additives for designed surface modification of high voltage LiNi0.5Mn1.5O4 cathodes", The Royal Society of Chemistry; Energy & Enviornmental Science, (Jan. 2016).

(56) References Cited

OTHER PUBLICATIONS

International Search Report and Written Opinion from corresponding PCT Application No. PCT/US2022/ 031969, dated Sep. 20, 2022 (5 pages).

Li Xi et al.; Ethoxy (Pentafluoro Cyclotriphosphazene As A Mult-Functional Flame Retardant Electrolyte Additive For Lithium-Ion Batteries; Journal of Power Sources; vol. 378, Feb. 1, 2018; 707-716.

Search Report from corresponding European Patent Application No. 22816859.7 dated May 7, 2025.

* cited by examiner

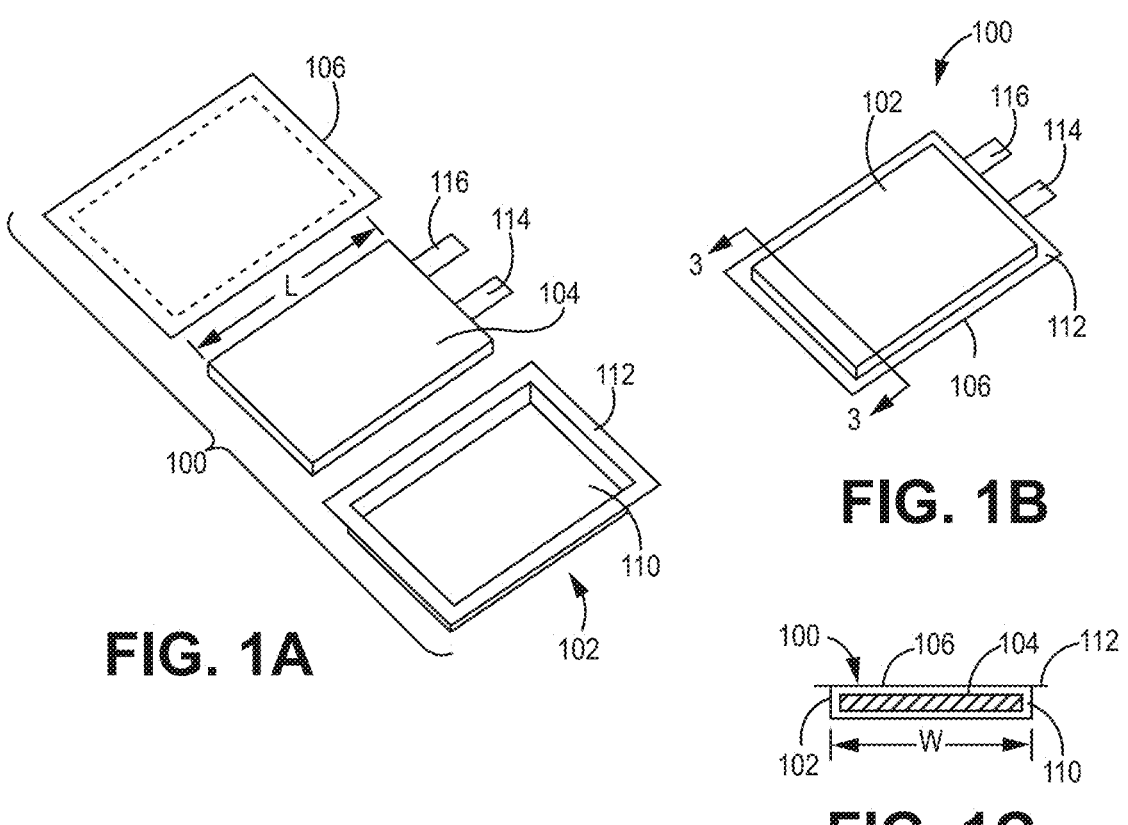
FIG. 1A
FIG. 1B
FIG. 1C
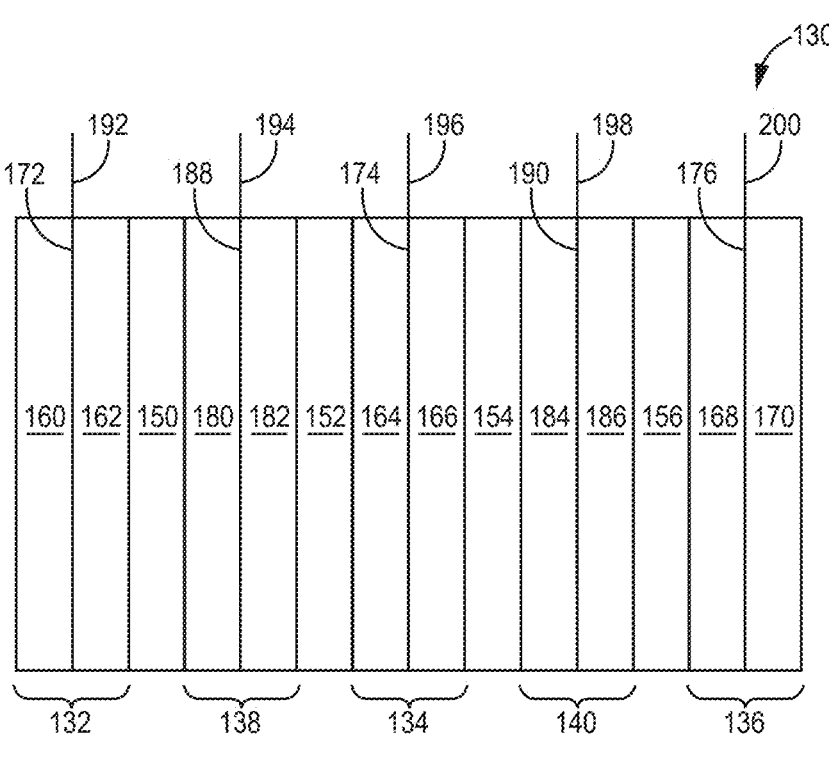
FIG. 1D

E1- #1 4C/
E1- #2 4C

E21- #1 1C/
E21- #2 1C

LITHIUM ION CELLS WITH HIGH PERFORMANCE ELECTROLYTE AND SILICON OXIDE ACTIVE MATERIALS ACHIEVING LONG CYCLE LIFE, FAST CHARGE AND HIGH THERMAL STABILITY

CROSS REFERENCE TO RELATED APPLICATIONS

This application claims priority to U.S. provisional patent application No. 61/196,536 filed on Jun. 3, 2021 to Dong et al., entitled "Lithium Ion Cells With High Performance Electrolyte and Silicon Oxide Active Materials Achieving Long Cycle Life, Fast Charge and High Thermal Stability" and incorporated herein by reference.

FIELD OF THE INVENTION

The invention relates to assembly of cells with electrolytes that have been discovered to work with negative electrodes incorporating high capacity silicon oxide active materials while achieving good cycling capabilities, reduction of out gassing and stability for broad commercial applications.

BACKGROUND OF THE INVENTION

Lithium batteries are widely used in consumer electronics and electric vehicles due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

BRIEF DESCRIPTION OF THE DRAWINGS

FIG. 1A is an exploded view of a pouch battery with a battery core separated from two portions of the pouch case.

FIG. 1B is a perspective lower face view of the assembled pouch battery of FIG. 1A.

FIG. 1C is a bottom plan view of the pouch battery of FIG. 1B.

FIG. 1D is a depiction of an embodiment of a battery core comprising an electrode stack.

The electrode active materials were NMC811 for the positive active material and SOC for the negative electrode active material.

Figure 8A:
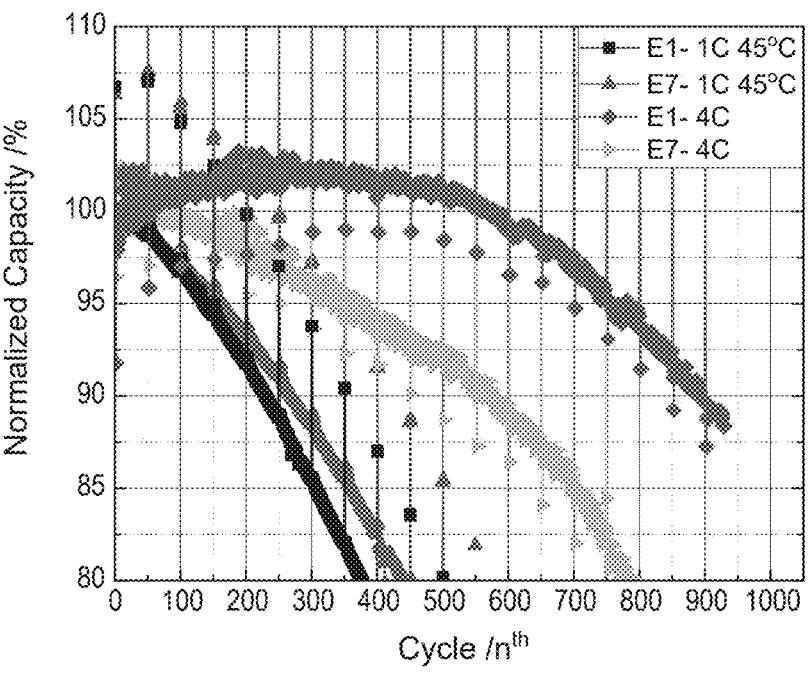
FIG. 8A is a plot of normalized capacity as a function of cycle number for coin cells prepared with electrolytes E1 and E7. The coin cells were cycled as described in FIG. 5C.
Figure 8B:
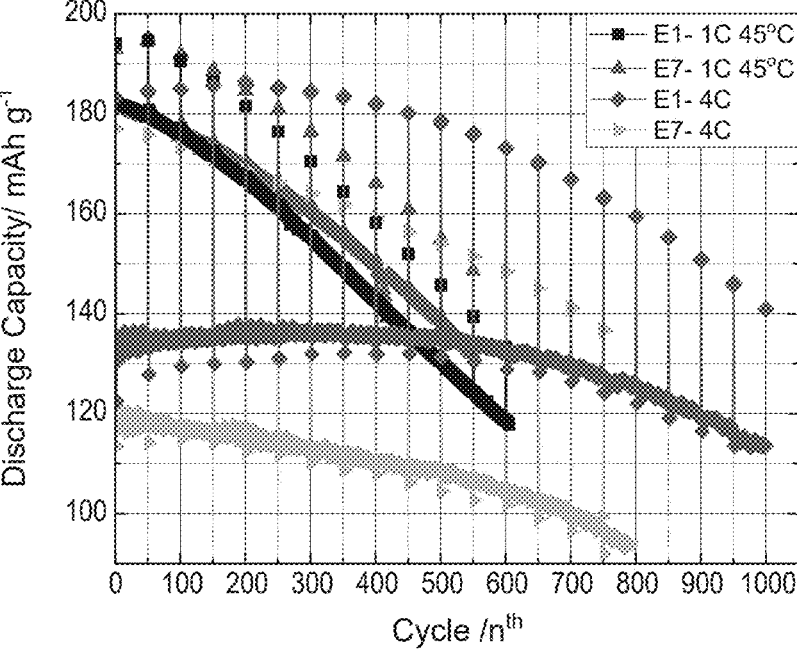

FIG. 8B is a plot of un-normalized specific discharge capacity, referenced relative to the weight of the positive electrode active material, for the data shown in FIG. 8A.

Figure 9A:
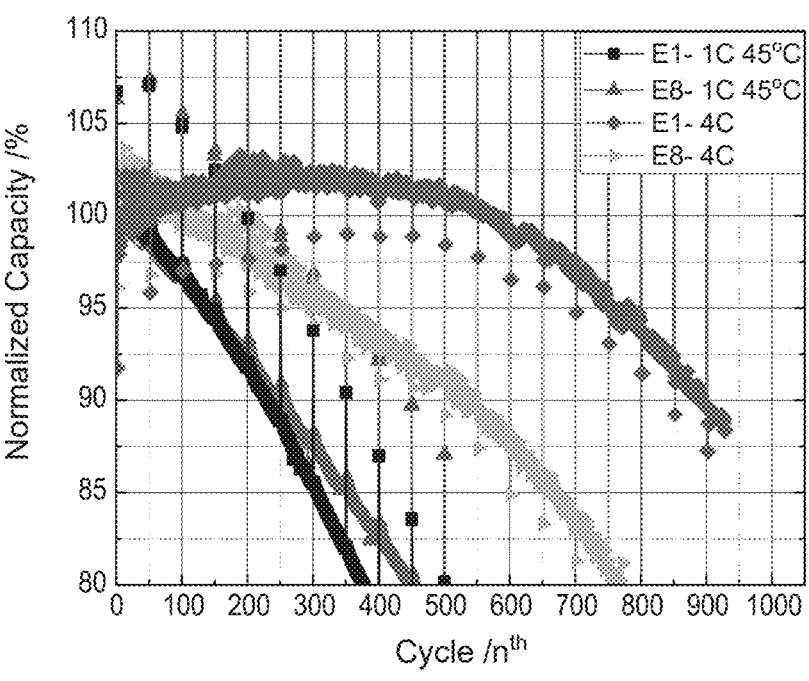

FIG. 9A is a plot of normalized capacity as a function of cycle number for coin cells prepared with electrolytes E1 and E8. The coin cells were cycled as described in FIG. 5C. The electrode active materials were NMC811 for the positive active material and SOC for the negative electrode active material.

Figure 9B:
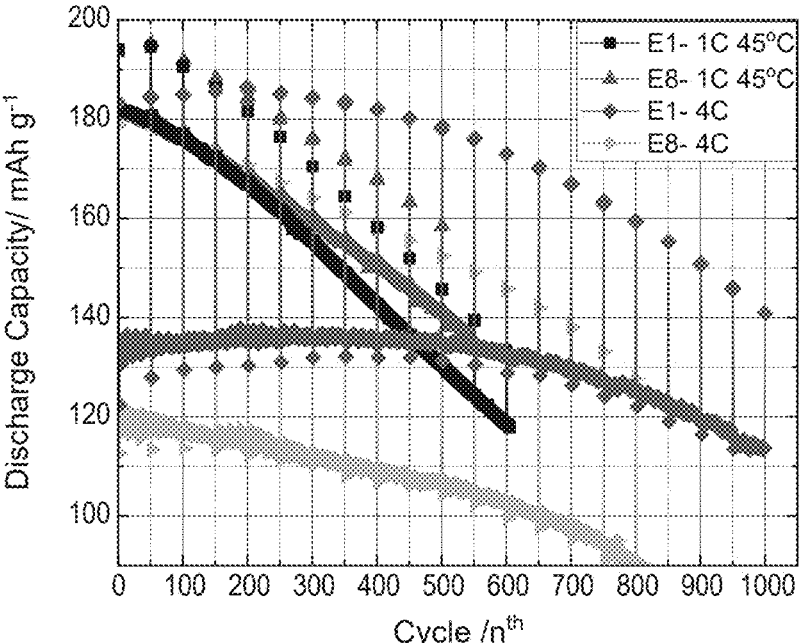

FIG. 9B is a plot of un-normalized specific discharge capacity, referenced relative to the weight of the positive electrode active material, for the data shown in FIG. 9A.

Figure 10:
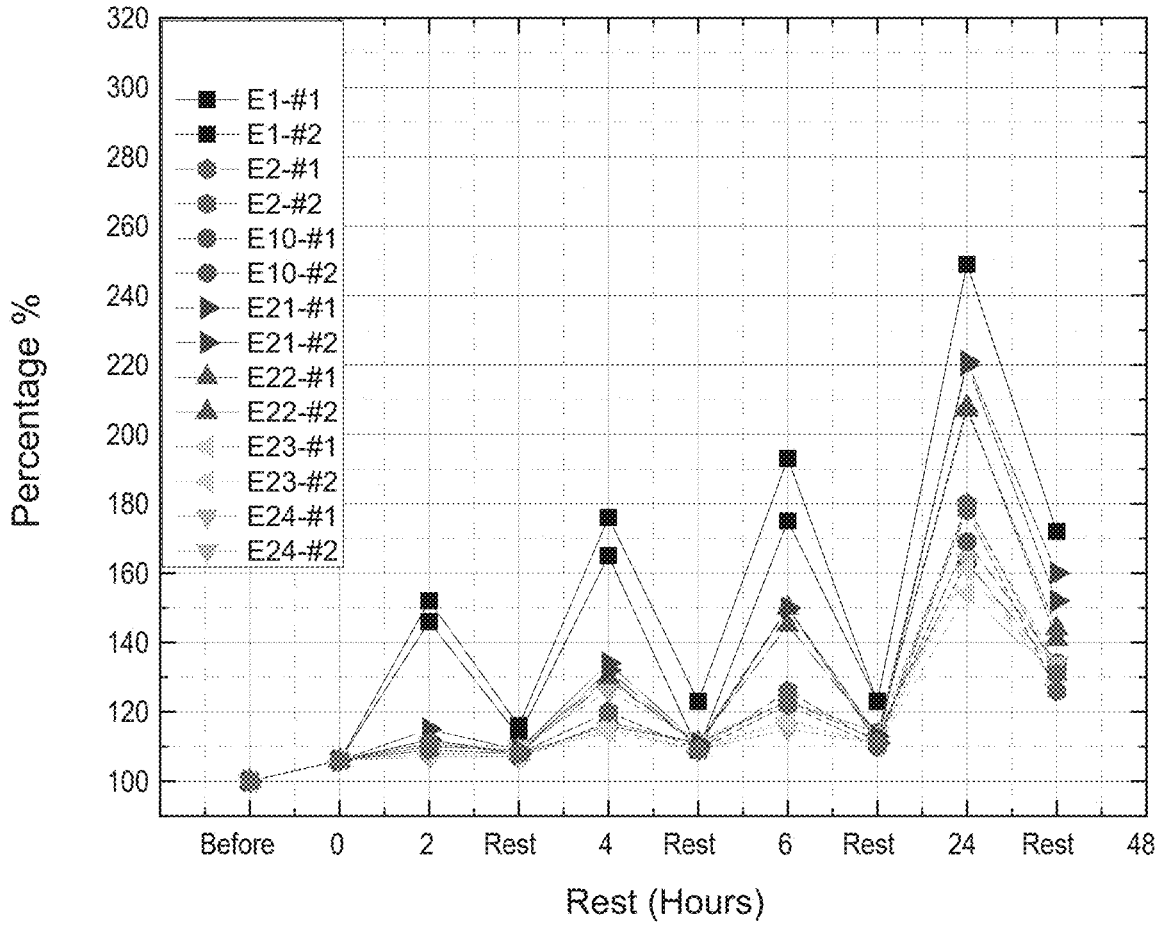

FIG. 10 is a plot showing gassing performance of electrolytes E1, E2, E10 and E21-E24 in pouch cells held at 65° C. The plot shows percent change in thickness of the pouch cells as a function of time. The electrode active materials were NMC622 for the positive active material and SOC for the negative active material.

Figure 11A:
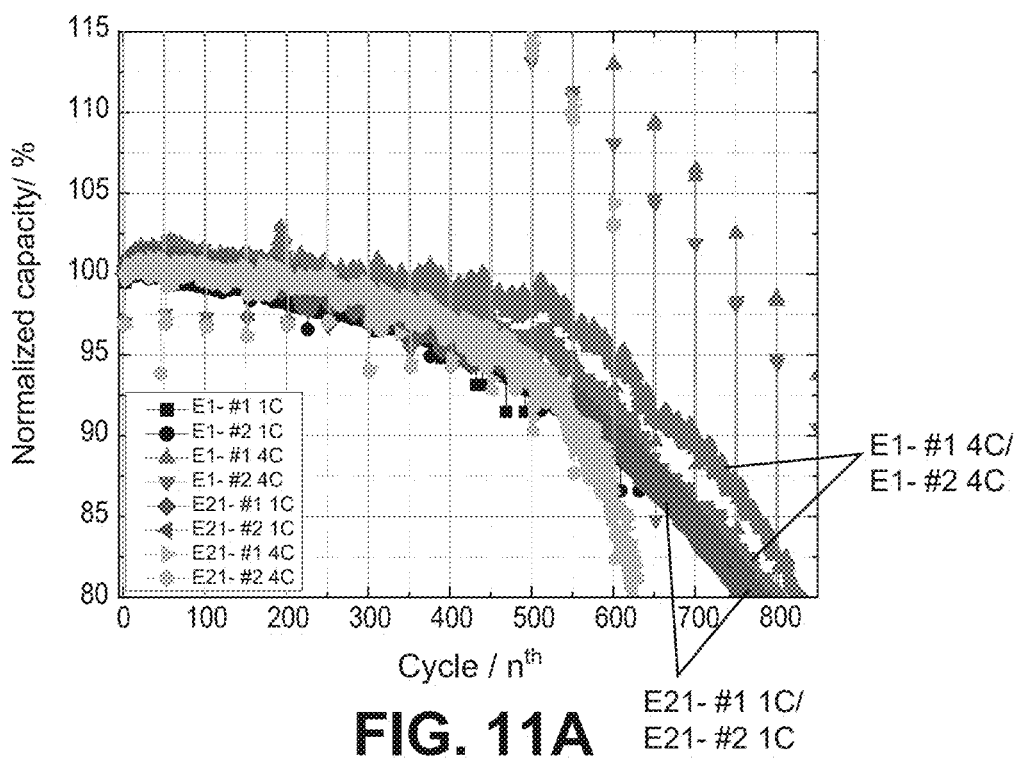

FIG. 11A is a plot of normalized capacity as a function of cycle number for coin cells prepared with electrolytes E1 and E21. The coin cells were cycled as described in FIG. 5C, except that all cycling was performed at room temperature. The electrode active materials were NMC622 for the positive active material and SOC for the negative electrode active material.

Figure 11B:
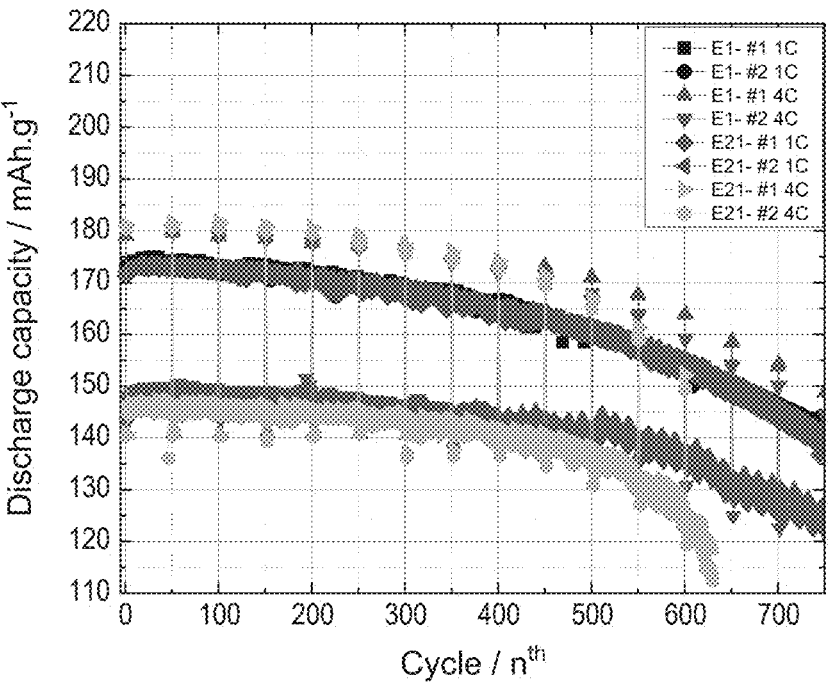

FIG. 11B is a plot of un-normalized specific discharge capacity, referenced relative to the weight of the positive electrode active material, for the data shown in FIG. 11A.

Figure 12A:
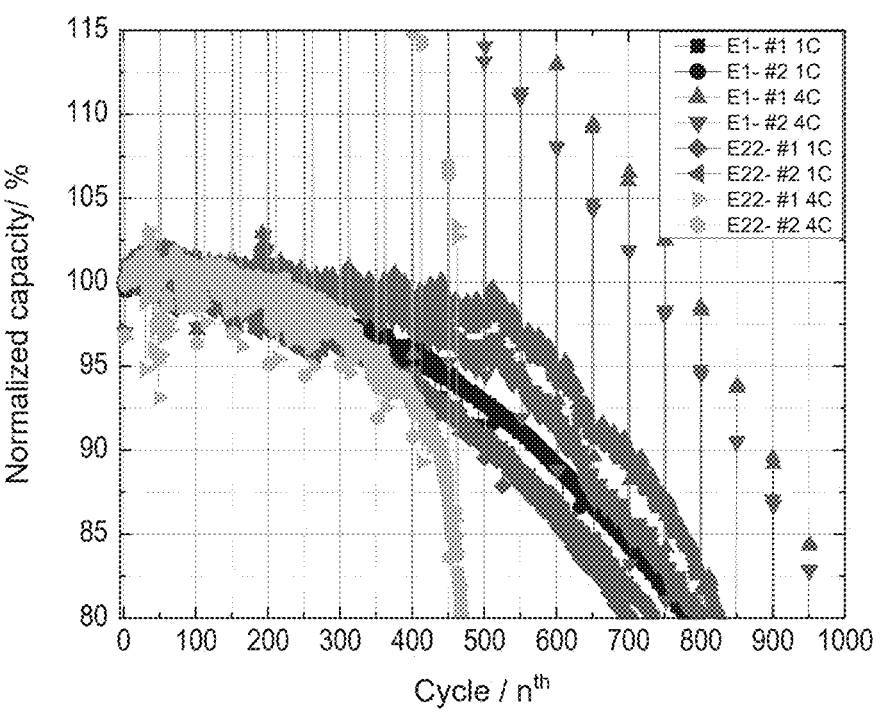

FIG. 12A is a plot of normalized capacity as a function of cycle number for coin cells prepared with electrolytes E1 and E22. The coin cells were cycled as described in FIG. 5C, except that all cycling was performed at room temperature. The electrode active materials were NMC622 for the positive active material and SOC for the negative electrode active material.

Figure 12B:
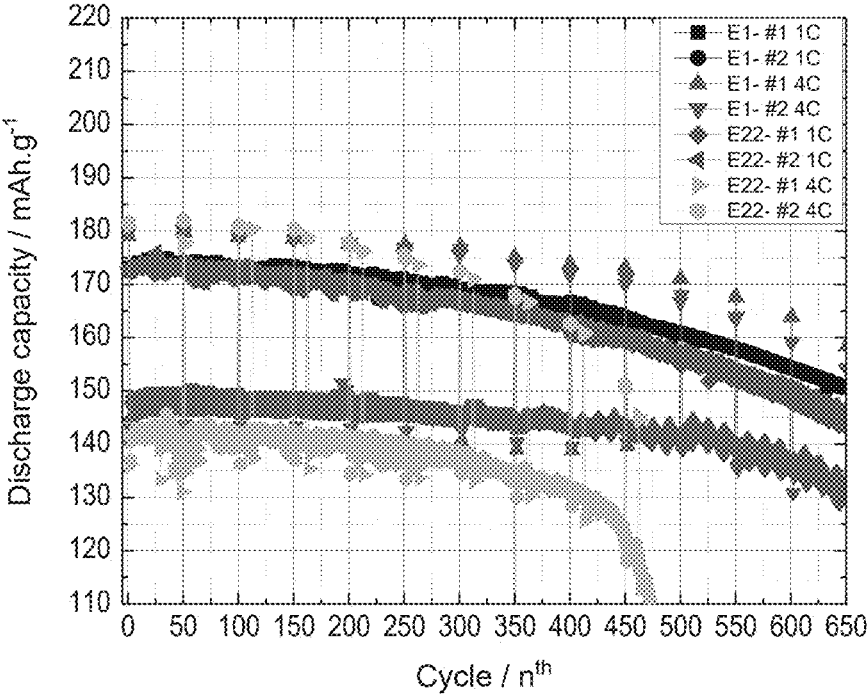

FIG. 12B is a plot of un-normalized specific discharge capacity, referenced relative to the weight of the positive electrode active material, for the data shown in FIG. 12A.

Figure 13A:
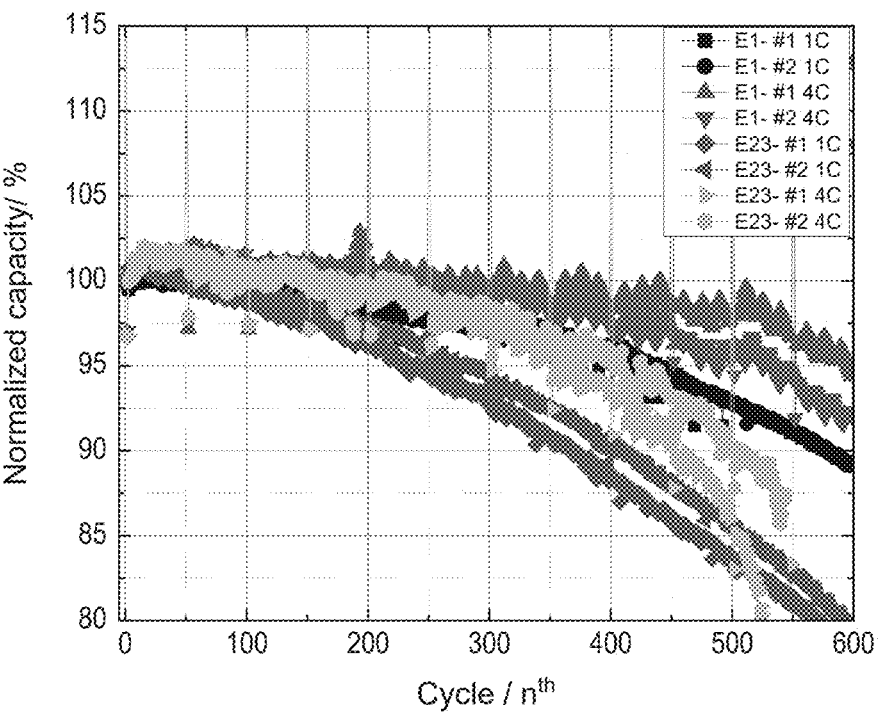

FIG. 13A is a plot of normalized capacity as a function of cycle number for coin cells prepared with electrolytes E1 and E23. The coin cells were cycled as described in FIG. 5C, except that all cycling was performed at room temperature. The electrode active materials were NMC622 for the positive active material and SOC for the negative electrode active material.

Figure 13B:
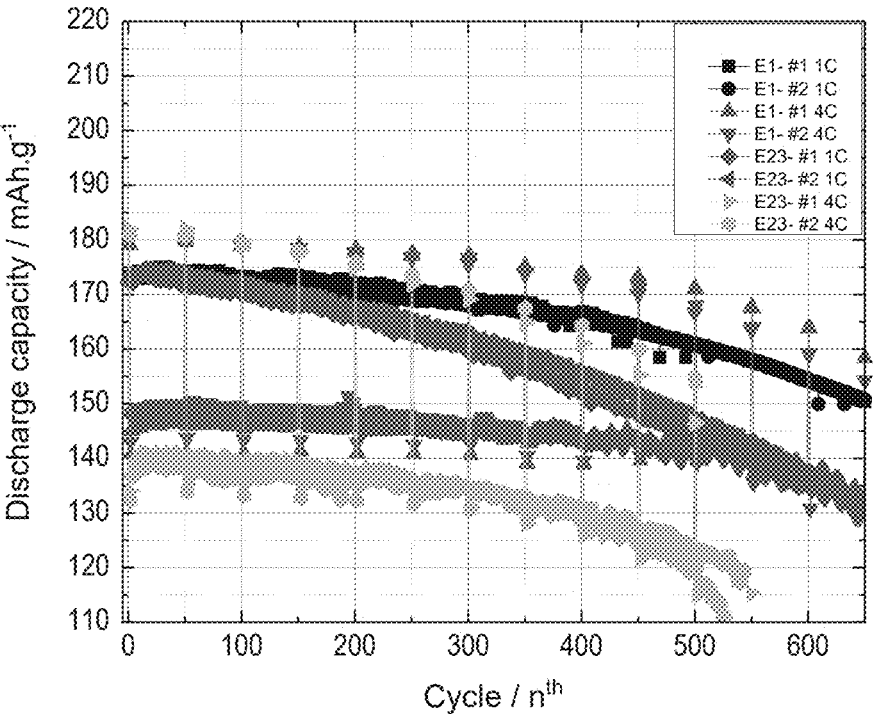

FIG. 13B is a plot of un-normalized specific discharge capacity, referenced relative to the weight of the positive electrode active material, for the data shown in FIG. 13A.

Figure 14A:
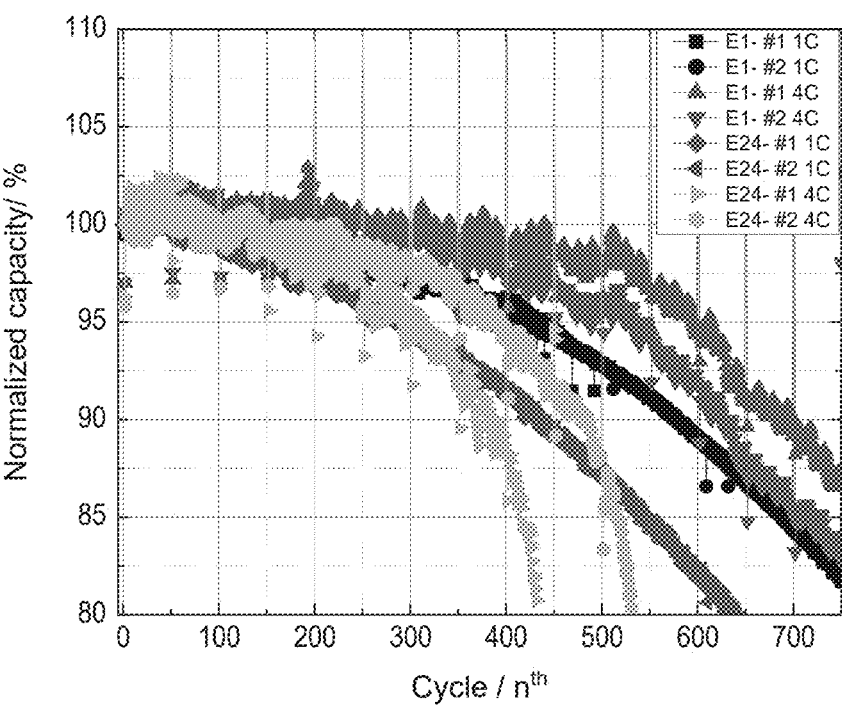

FIG. 14A is a plot of normalized capacity as a function of cycle number for coin cells prepared with electrolytes E1 and E24. The coin cells were cycled as described in FIG. 5C, except that all cycling was performed at room temperature. The electrode active materials were NMC622 for the positive active material and SOC for the negative electrode active material.

Figure 14B:
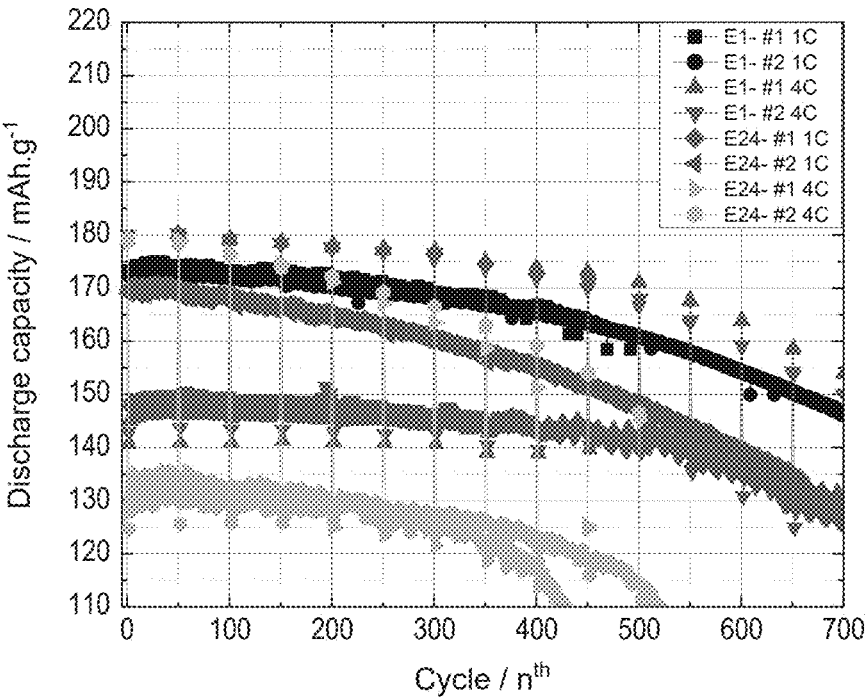

FIG. 14B is a plot of un-normalized specific discharge capacity, referenced relative to the weight of the positive electrode active material, for the data shown in FIG. 14A.

Figure 15A:
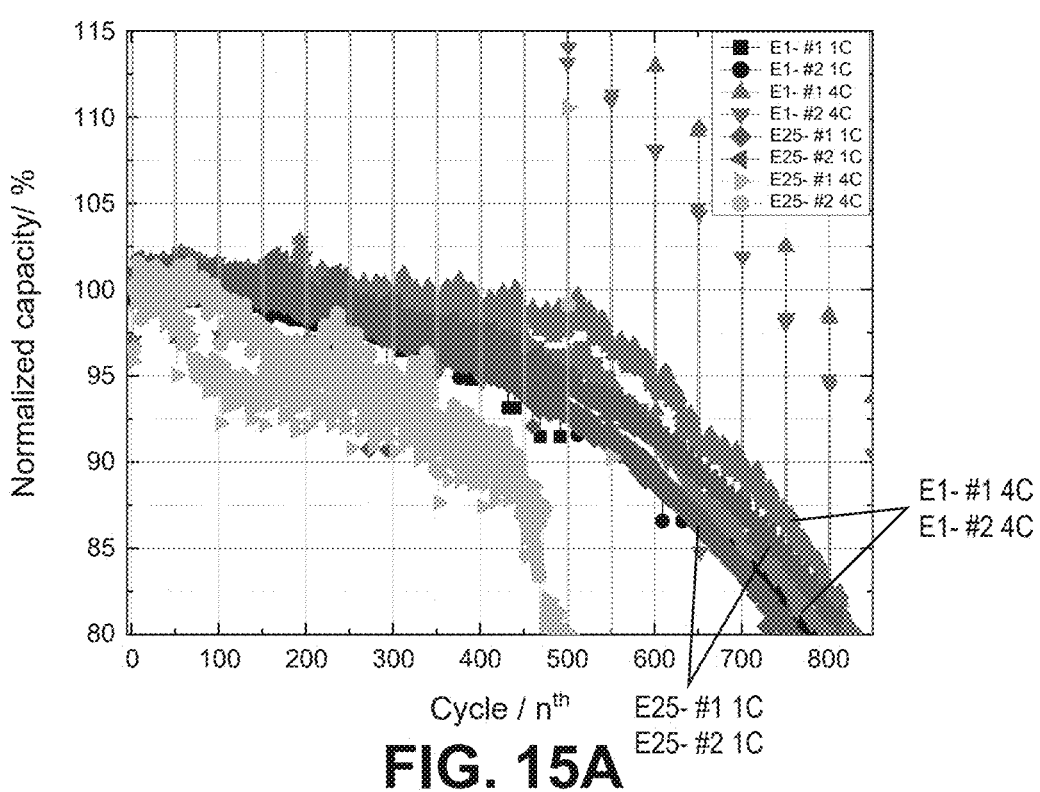

FIG. 15A is a plot of normalized capacity as a function of cycle number for coin cells prepared with electrolytes E1 and E25. The coin cells were cycled as described in FIG. 5C, except that all cycling was performed at room temperature.

The electrode active materials were NMC622 for the positive active material and SOC for the negative electrode active material.

Figure 15B:
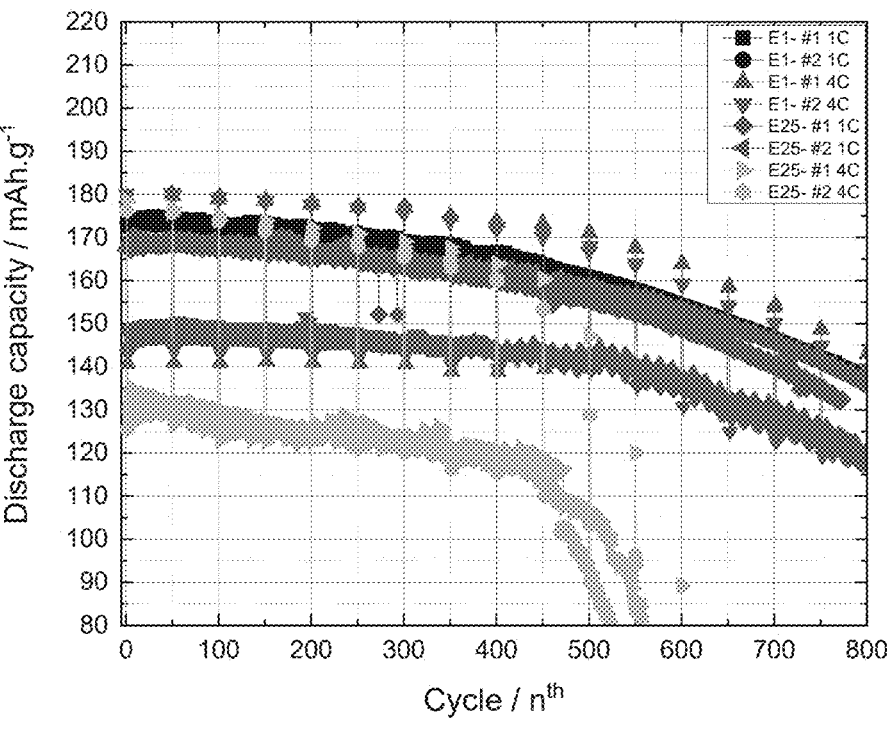

FIG. 15B is a plot of un-normalized specific discharge capacity, referenced relative to the weight of the positive electrode active material, for the data shown in FIG. 15A.

Figure 16:
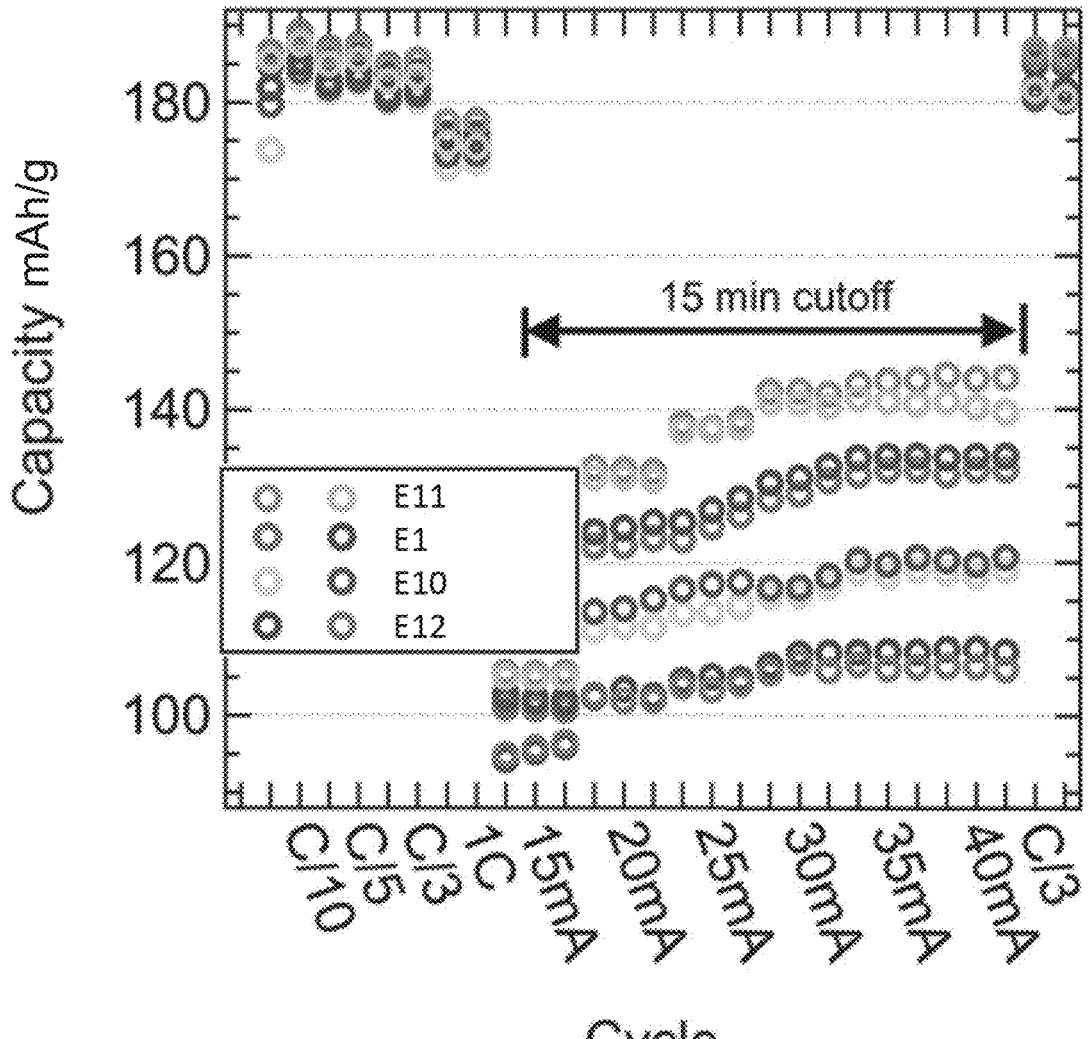

FIG. 16 is a plot of un-normalized specific discharge capacity at various rates for coin cells prepared with electrolytes E1 and E10-E12. The data are referenced relative to the weight of the positive electrode active material. The electrode active materials were NMC622 for the positive active material and silicon oxide composite SOC for the negative active material.

Figure 17:
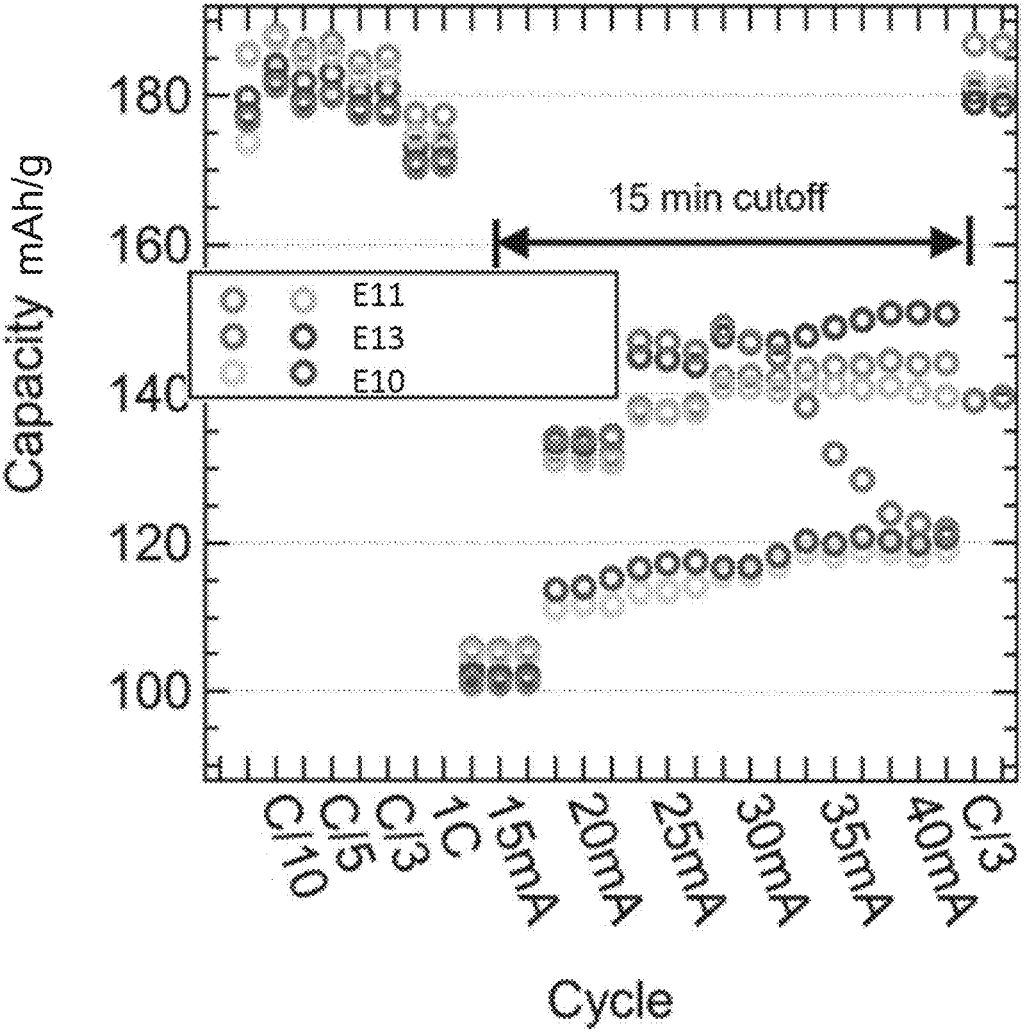

FIG. 17 is a plot of un-normalized specific discharge capacity at various rates for coin cells prepared with electrolytes E10, E11 and E13. The data are referenced relative to the weight of the positive electrode active material. The electrode active materials were NMC622 for the positive active material and silicon oxide composite SOC for the negative active material.

Figure 18:
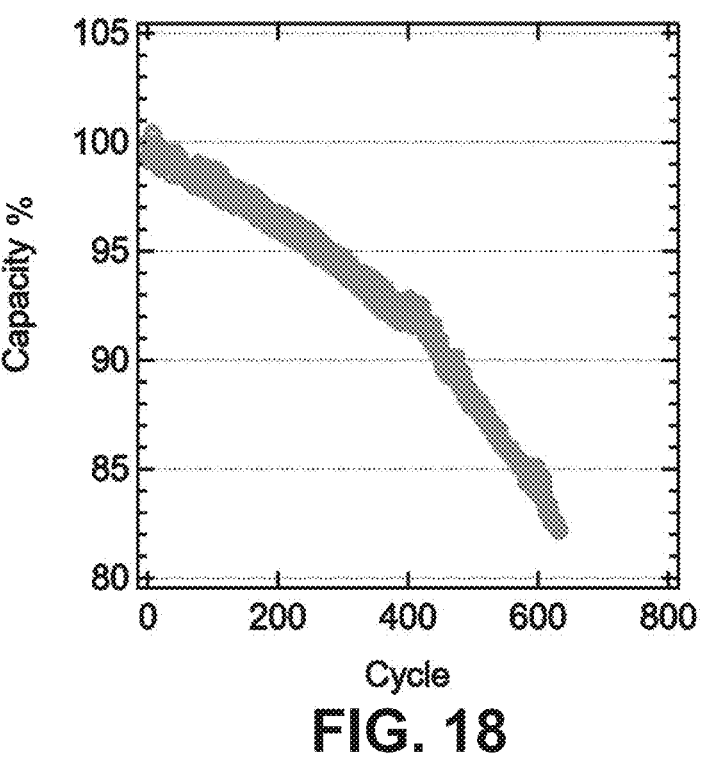

FIG. 18 is a plot of normalized capacity as a function of cycle number for a coin cell prepared with electrolyte E14. The coin cell was cycled with a 1 C charge/1 C discharge rate. The electrode active materials were NMC811 for the positive active material and silicon oxide composite SOC for the negative active material.

Figure 19A:
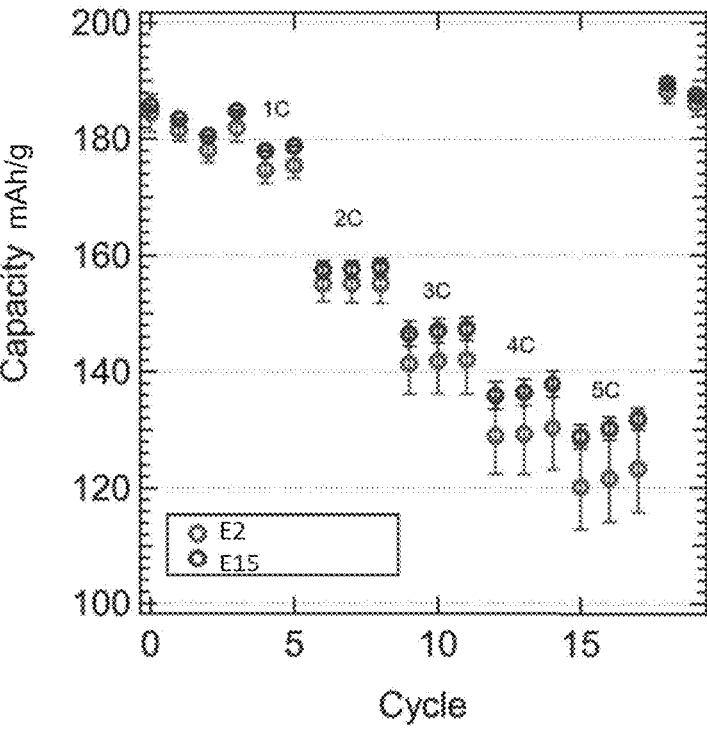

FIG. 19A is a plot of un-normalized specific discharge capacity as a function of cycle number for coin cells prepared with electrolytes E2 and E15. The data are referenced relative to the weight of the positive electrode active material. The coin cells were cycled with different charge rates as described in Example 8. The electrode active materials were NMC811 for the positive active material and silicon oxide composite SOC for the negative active material.

Figure 19B:
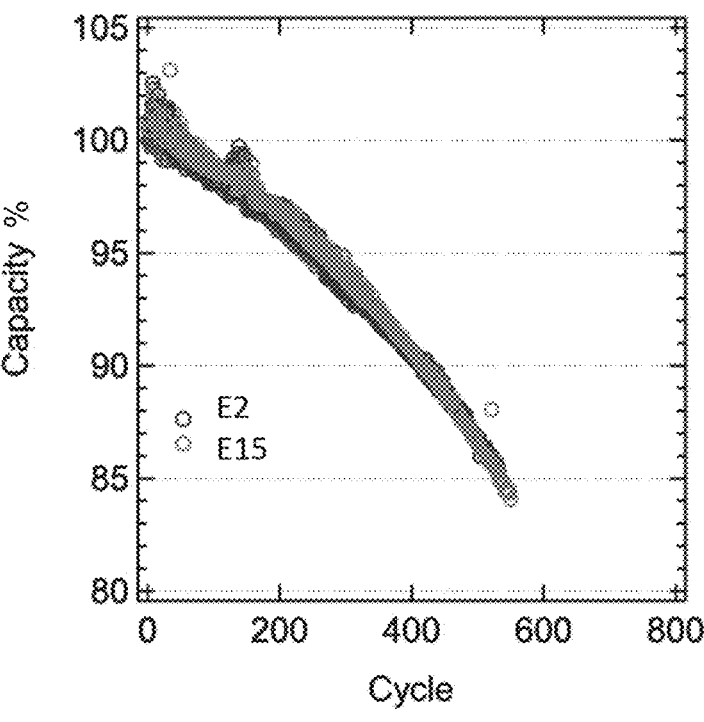

FIG. 19B is a plot of normalized capacity as a function of cycle number for coin cells described in FIG. 19A. The coin cells were cycled with 1 C charge and 1 C discharge rates. The electrode active materials were NMC811 for the positive active material and silicon oxide composite SOC for the negative active material.

Figure 19C:
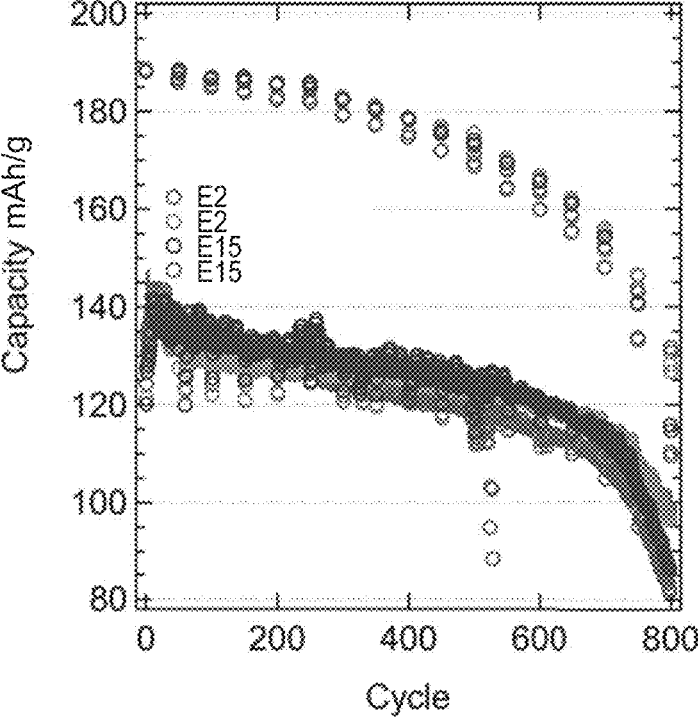

FIG. 19C is a plot of un-normalized specific discharge capacity, referenced relative to the weight of the positive electrode active material. Cycling is carried out with a 4 C charge/1 C discharge rate (room temperature).

Figure 20A:
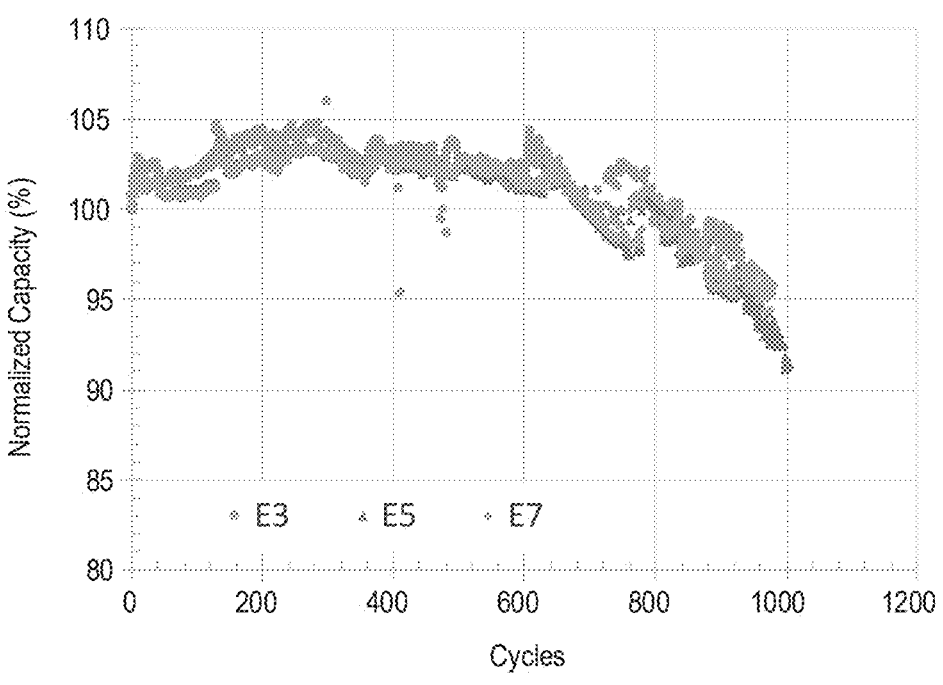

FIG. 20A is a plot of normalized capacity as a function of cycle number for pouch cells prepared with electrolytes E3, E5 and E7. The pouch cells were cycled with a 1 C charge/1 C discharge rate. The electrode active materials were a commercial single crystalline NMC811 for the positive active material and silicon oxide composite SOC for the negative active material.

Figure 20B:
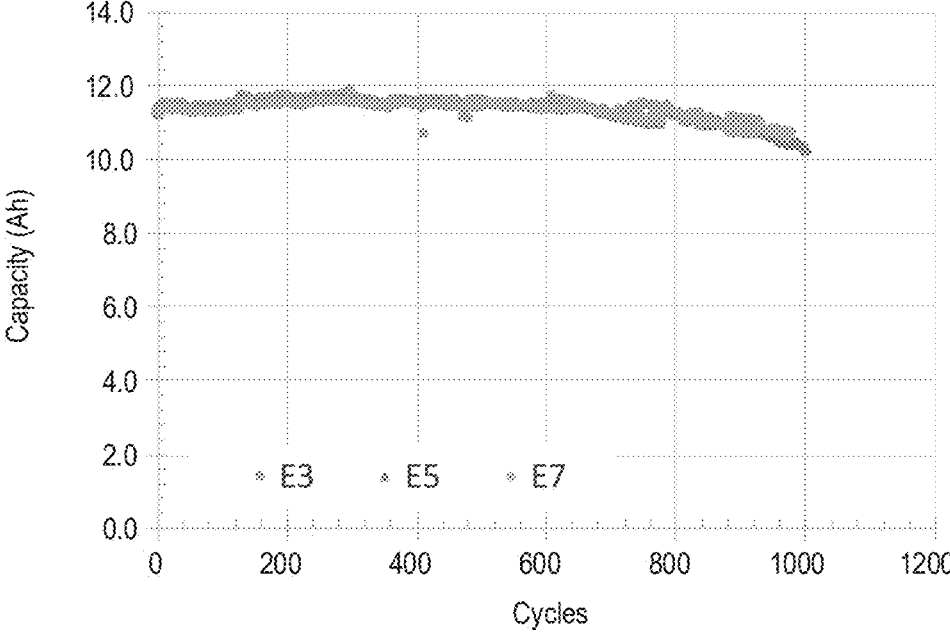

FIG. 20B is a plot of un-normalized specific discharge capacity, referenced relative to the weight of the positive electrode active material, for the data shown in FIG. 20A.

Figure 21A:
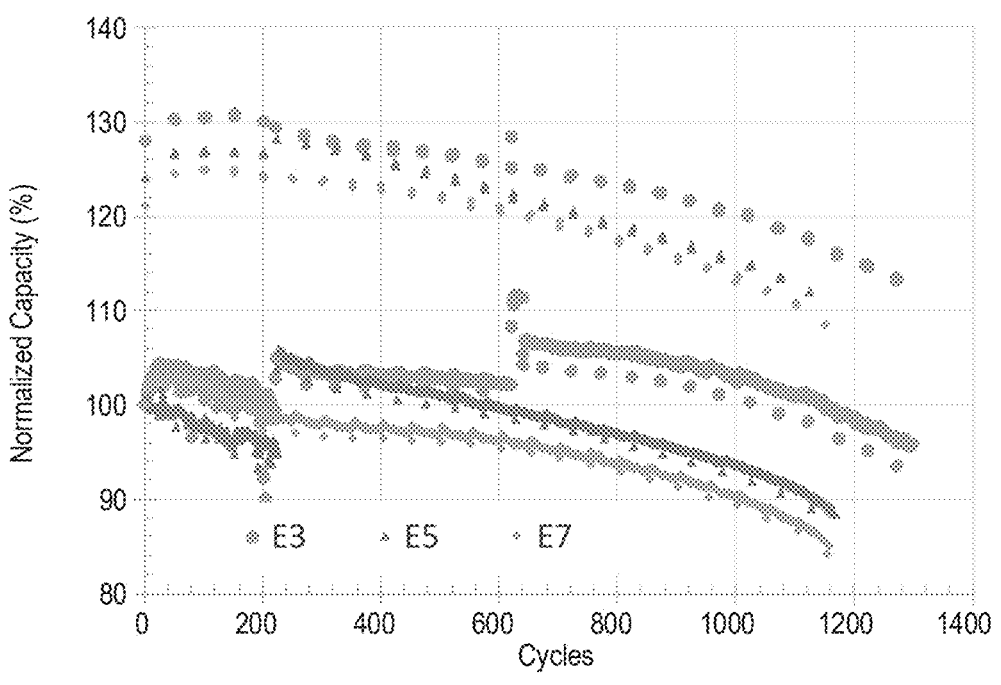

FIG. 21A is a plot of normalized capacity as a function of cycle number for the pouch cells described in FIG. 20A, where cycling is carried out with a 4 C charge/1 C discharge rate.

Figure 21B:
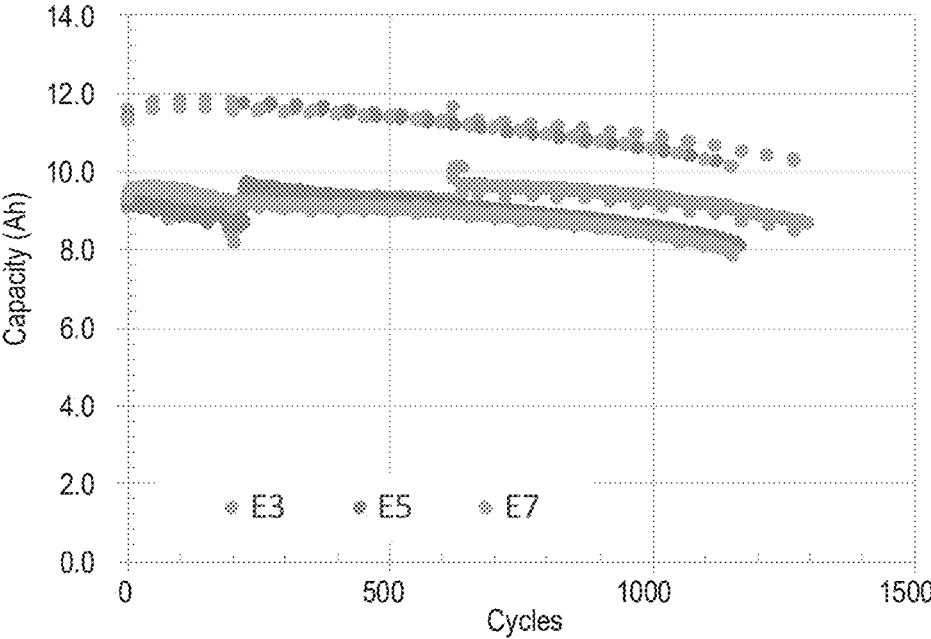

FIG. 21B is a plot of un-normalized specific discharge capacity, referenced relative to the weight of the positive electrode active material, for the data shown in FIG. 21A.

Figure 22A:
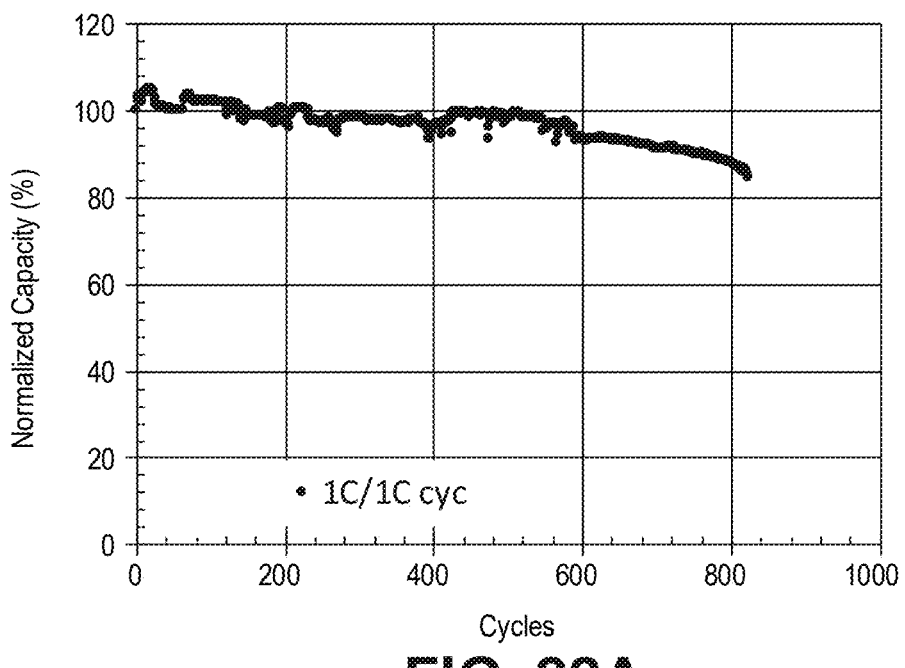

FIG. 22A is a plot of normalized capacity as a function of cycle number for a pouch cell prepared with electrolytes E3 and commercial single crystalline NMC811 as the cathode active material. The pouch cell was cycled with a 1 C charge/1 C discharge rate.

Figure 22B:
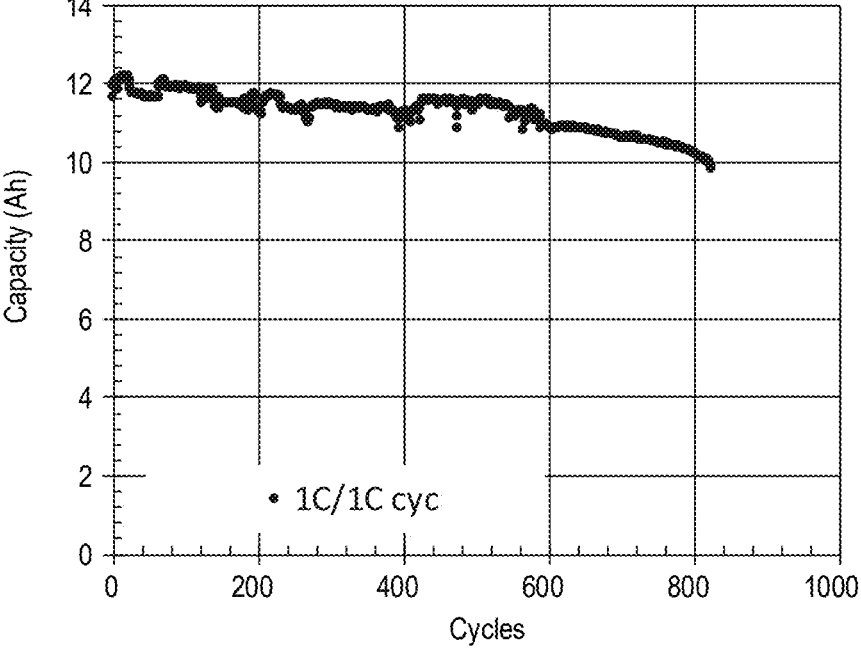

FIG. 22B is a plot of un-normalized specific discharge capacity, referenced relative to the weight of the positive electrode active material, for the data shown in FIG. 22A.

Figure 23A:
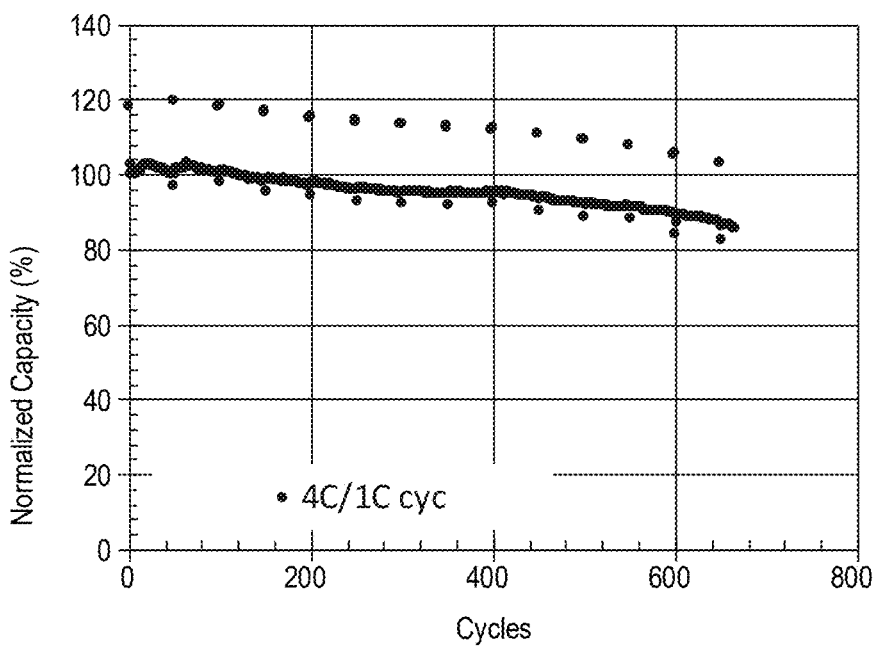

FIG. 23A is a plot of normalized capacity as a function of cycle number for a pouch cell prepared with electrolytes E3 and commercial single crystalline NMC811 as the cathode active material. The pouch cell was cycled with a 4 C charge/1 C discharge rate.

Figure 23B:
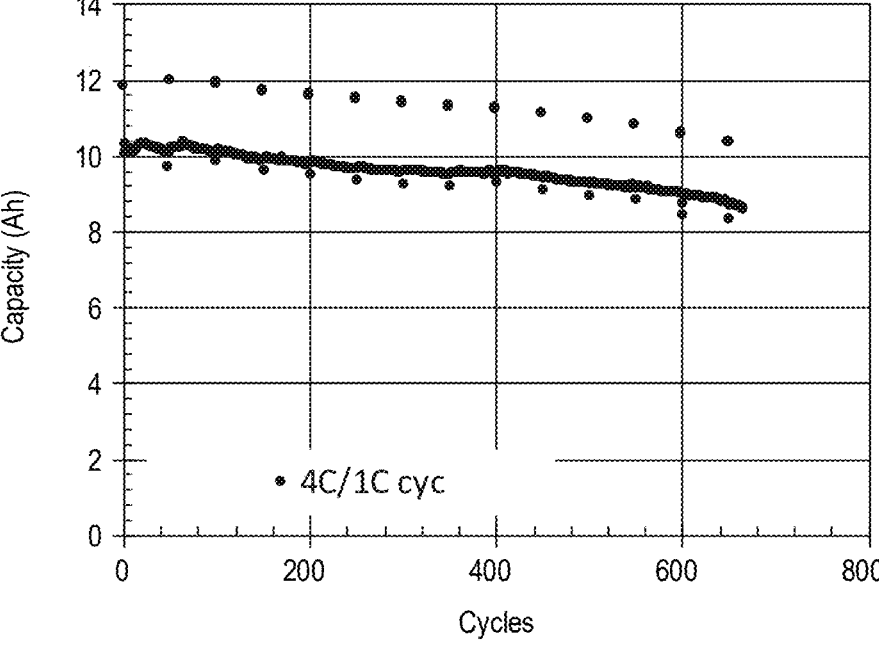

FIG. 23B is a plot of un-normalized specific discharge capacity, referenced relative to the weight of the positive electrode active material, for the data shown in FIG. 23A.

Figure 24A:
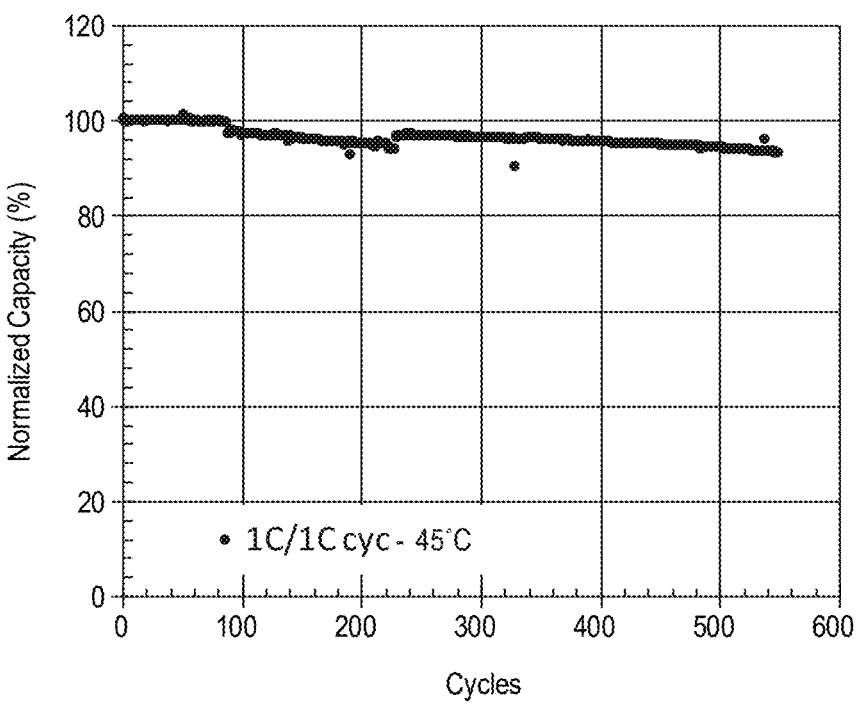

FIG. 24A is a plot of normalized capacity as a function of cycle number for a pouch cell prepared with electrolytes E3 and commercial single crystalline NMC811 as the cathode active material. The pouch cell was cycled with a 1 C charge/1 C discharge rate and was at a temperature of 45° C.

Figure 24B:
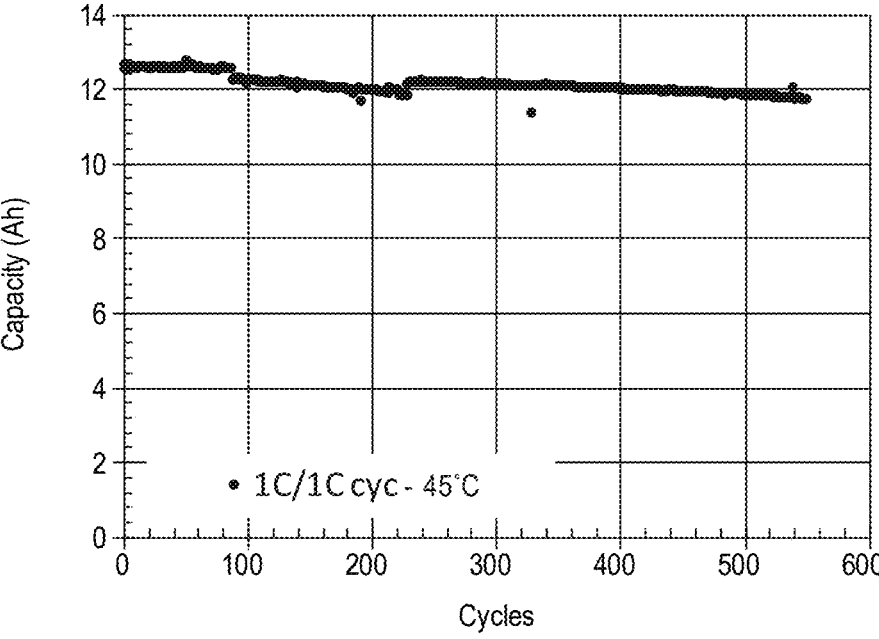

FIG. 24B is a plot of un-normalized specific discharge capacity, referenced relative to the weight of the positive electrode active material, for the data shown in FIG. 24A.

Figures 25, 26:
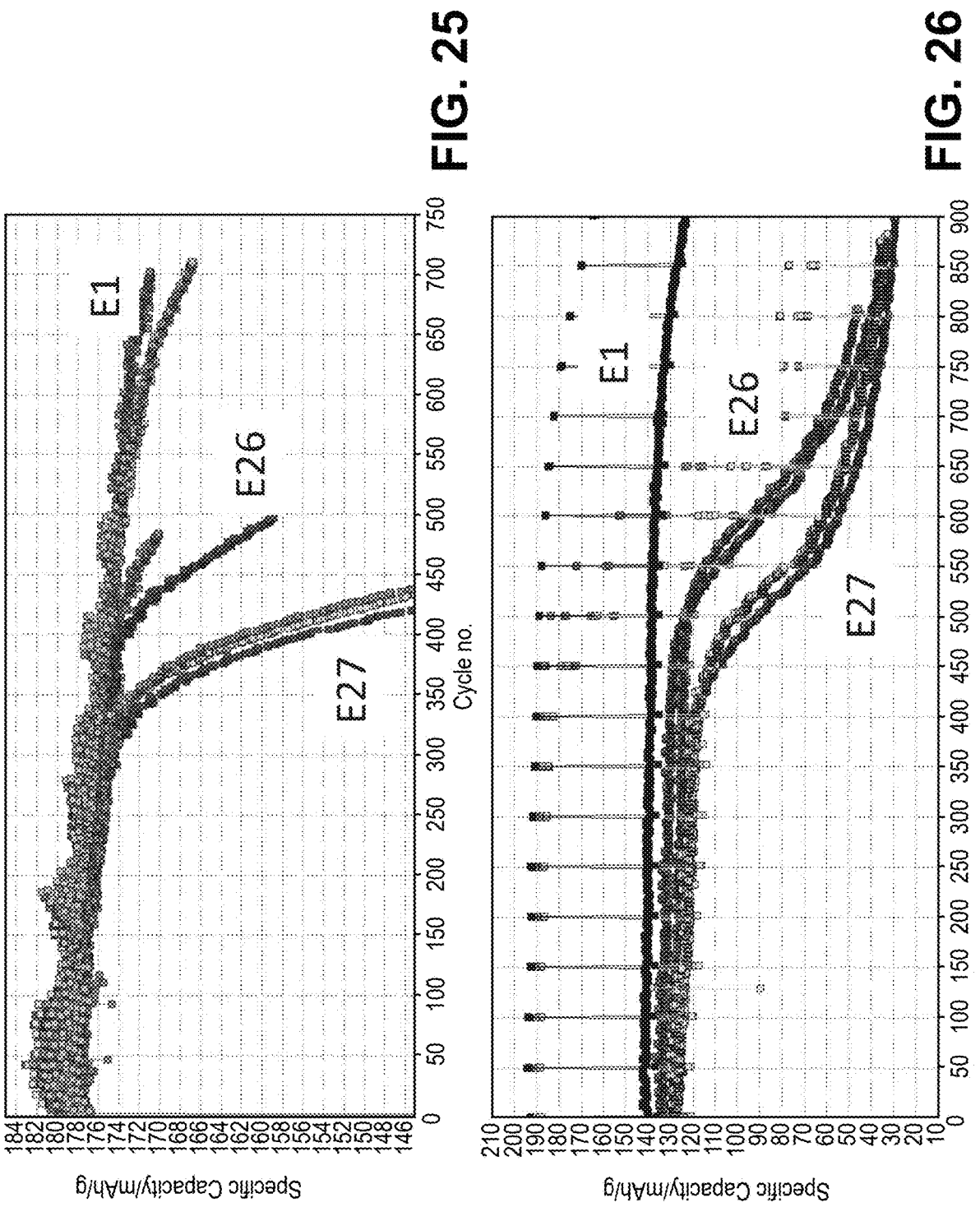

FIG. 25 is a plot of specific capacity, referenced relative to the weight of the positive electrode active material, as a function of cycle number for the coin cells prepared with E1, E26 and E27. Cycling was carried out with 1 C charge/1 C discharge rates, from 4.2V to 2.5V.

FIG. 26 is a plot of specific capacity, referenced relative to the weight of the positive electrode active material, as a function of cycle number for the coin cells prepared with E1, E26 and E27. Cycling was carried out with 4 C charge/1 C discharge rates, from 4.2V to 2.5V.

Figure 27A:
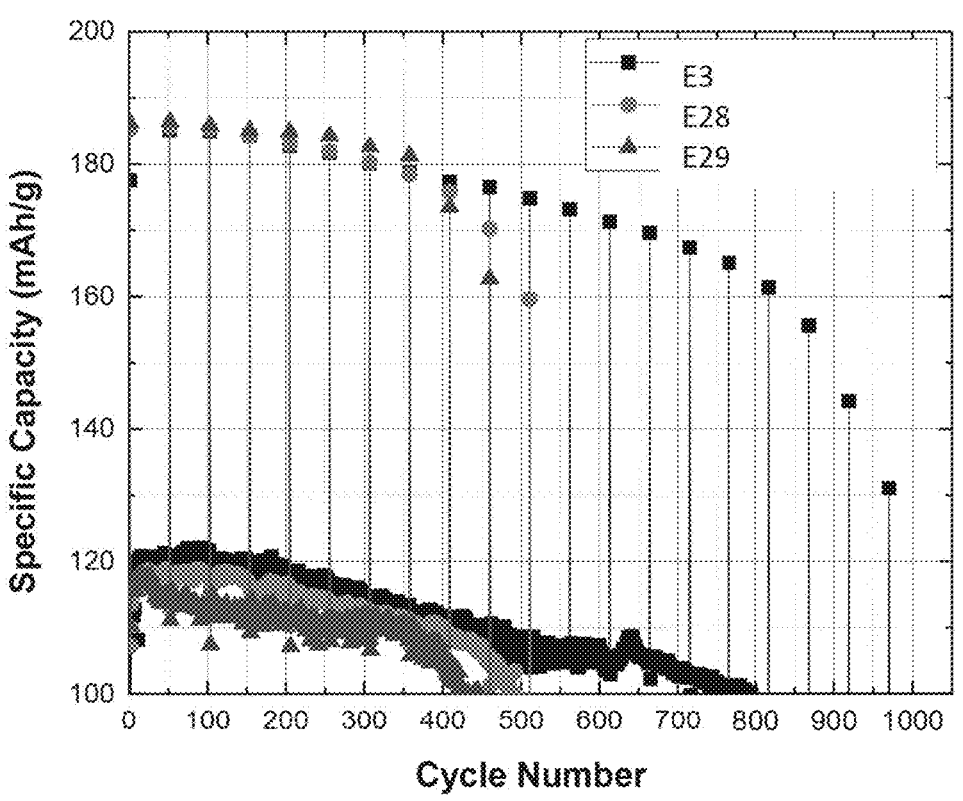

FIG. 27A is a plot of specific capacity, referenced relative to the weight of the positive electrode active material, as a function of cycle number for the coin cells prepared with E3, E28 and E29. Cycling was carried out with 4 C charge/1 C discharge rates, from 4.2V to 2.5V.

Figure 27B:
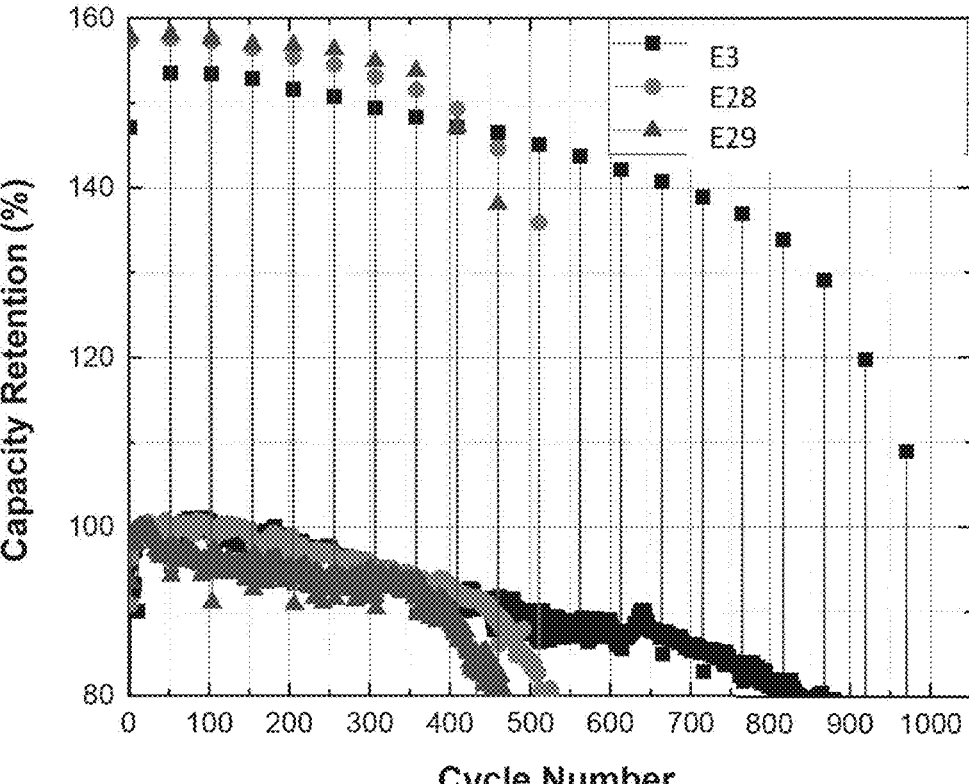

FIG. 27B shows a plot of capacity retention for the data shown in FIG. 27A.

Figure 28:
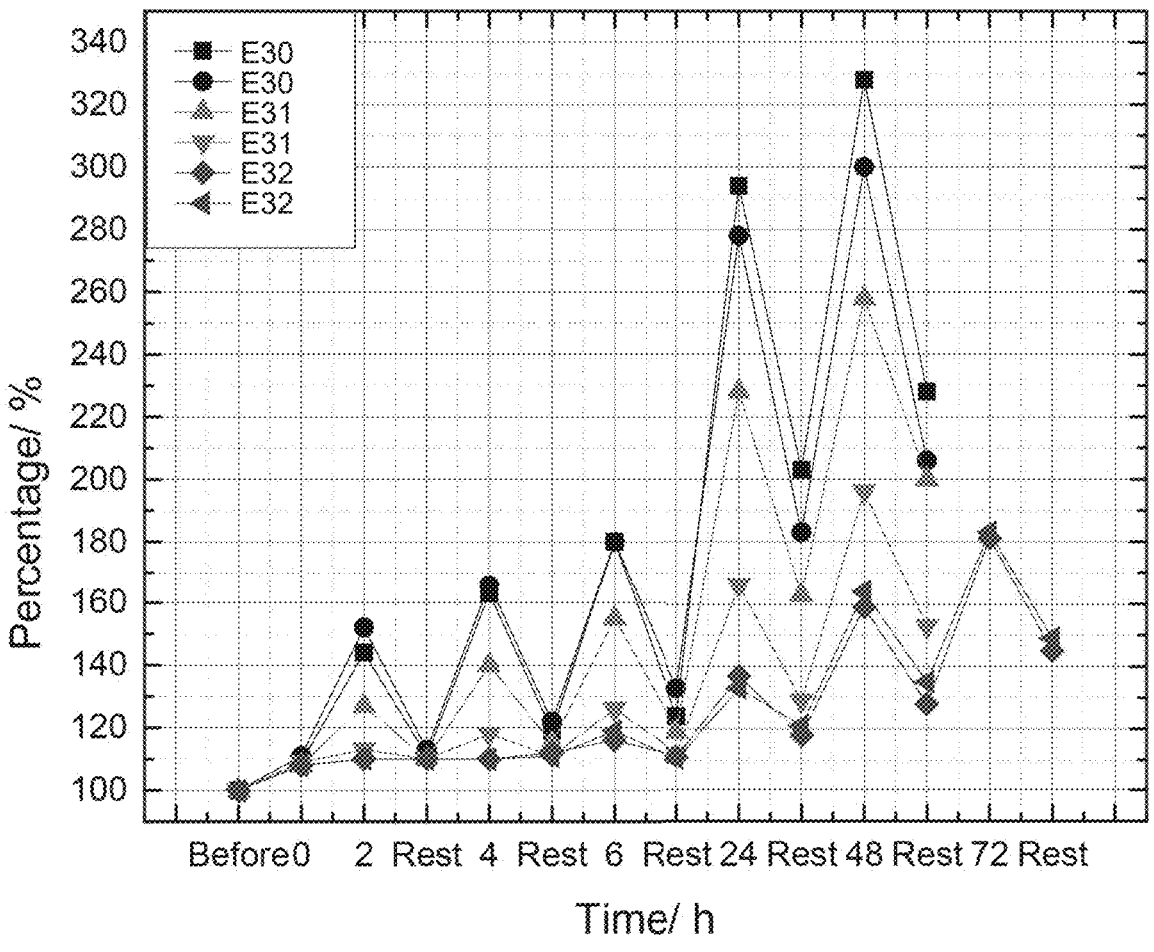

FIG. 28 shows hours of storage at 65° C. versus percentage change in thicknesses for pouch cells having the SOC anode and NMC811 cathode in combination with the E30-32 electrolytes.

SUMMARY OF THE INVENTION

In a first aspect, the invention pertains to an electrolyte for a lithium-based cell consisting essentially of:

about 1.1M to about 2.2M lithium salt, consisting essentially of from about 0.05M to about 0.6M $LiPF_6$, from about 0.75M to about 1.8M lithium bis(fluorosulfonyl) imide (LiFSI) or lithium bis(trifluoromethanesulfonyl) imide (LiTFSI), and no more than about 5 mole percent optional other lithium salts;

solvent consisting essentially of from about 5 volume percent (vol %) to about 25 vol % fluoroethylene carbonate, from about 50 vol % to about 90 vol % dimethyl carbonate, ethylmethyl carbonate or a mixture thereof, and 0 about 35 vol % optional cosolvent selected from the group consisting of propylene carbonate, ethyl acetate, methyl acetate, propyl acetate, and mixtures thereof;

no more than about 10 weight percent (wt %) optional additive selected from the group consisting of triethyl phosphate (TEP), ethoxy(pentafluoro)cyclotriphosphazene (PFPN), 1,3-propane sultone (PS), and mixtures thereof; and no more than about 5 wt % additional cosolvents and/or lithium-free organic additives.

In a further aspect, the invention pertains to a lithium ion cell comprising:

a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 to about 55 wt % graphitic carbon;

a positive electrode comprising a lithium metal oxide, conductive carbon, and a polymer binder;

a separator between the negative electrode and the positive electrode;

electrolyte comprising from about 1.1M to about 2.2M lithium salt and non-aqueous solvent, wherein the lithium salt comprises from about 60 mole percent to about 100 mole percent LiTFSI, and wherein the non-aqueous solvent comprises from about 5 vol % to about 25 vol % fluoroethylene carbonate, 50 vol % to 90 vol % dimethyl carbonate, ethylmethyl carbonate or a mixture thereof, and no more than about 35 vol % optional cosolvents selected from the group consisting of propylene carbonate, ethyl acetate, methyl acetate, propyl acetate, and mixtures thereof; and a container enclosing the negative electrode, the positive electrode, the separator and the electrolyte;

wherein the cell has a room temperature discharge specific capacity at a rate of 4 C of at least about 120 mAh/g between 2.5V and a selected charge voltage based on the weight of the cathode active material.

In a further aspect, the invention pertains to a lithium ion cell comprising:

a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 wt % to about 55 wt % graphitic carbon;

a positive electrode comprising a lithium metal oxide, conductive carbon, and a polymer binder;

a separator between the negative electrode and the positive electrode;

electrolyte comprising from about 1.0M to about 2.5M lithium salt and non-aqueous solvent, wherein the lithium salt comprises from about 60 mole percent to about 100 mole percent LiTFSI, and wherein the non-aqueous solvent comprises from about 5 vol % to about 25 vol % fluoroethylene carbonate; and a container enclosing the negative electrode, the positive electrode, the separator and the electrolyte;

wherein the cell has a room temperature discharge specific capacity at a rate of 4 C of at least about 120 mAh/g between 2.5V and a selected charge voltage based on the weight of the cathode active material and wherein the lithium ion cell having a capacity at the 700th cycle of at least about 80% of the capacity at the 7th cycle when cycled at room temperature from the 7th cycle to the 700th cycle between 2.5V and the selected charge voltage at a rate of 4 C.

In a further aspect, the invention relates to a lithium ion cell comprising:

a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 to about 55 wt % graphitic carbon;

a positive electrode comprising a lithium metal oxide, conductive carbon, and a polymer binder;

a separator between the negative electrode and the positive electrode;

electrolyte comprising from about 1.1M to about 2.2M lithium salt and non-aqueous solvent, wherein the lithium salt comprises from about 90 mole percent to about 100 mole percent $LiPF_6$, and wherein the non-aqueous solvent comprises from about 5 vol % to about 25 vol % fluoroethylene carbonate, 50 vol % to 80 vol % dimethyl carbonate, ethylmethyl carbonate or a mixture thereof, from about 5 vol % to about 15 vol % propylene carbonate and from about 5 vol % to about 20 vol % methyl acetate, ethyl acetate, propyl acetate, or mixtures thereof; and a container enclosing the negative electrode, the positive electrode, the separator and the electrolyte;

wherein the cell has a room temperature discharge specific capacity at a rate of 4 C of at least about 120 mAh/g between 2.5V and a selected charge voltage based on the weight of the cathode active material and wherein the lithium ion cell having a capacity at the 650th cycle of at least about 80% of the capacity at the 7th cycle when cycled at room temperature from the 7th cycle to the 650th cycle between 2.5V and the selected charge voltage at a rate of 1 C.

DETAILED DESCRIPTION OF THE INVENTION

The lithium-ion batteries described herein can achieve high energy, high power, fast charge, and long cycle life along with good thermal stability. Lithium-ion cells have been developed using novel electrolyte formulations that impart improved cycle life and thermal stability for use with negative electrodes comprising a majority amount of silicon based active material. In exemplified embodiments, lithium-ion cells use nickel rich cathode material paired with SiOx-graphite composite anode. Various SiOx anode formulations have been described in previous patent applications to achieve long cycle life while maintaining high energy. In the present application, lithium-ion cells have been developed using electrolyte formulations that improve cycle life, fast charge cycling and thermal stability using adaptations of Applicant's high performance electrode designs. In the context of formulating practical cells for vehicle application, the electrolytes have been developed that can lower outgassing from the cells without sacrificing the cycling performance or the high rate capabilities that allow for high power output and/or rapid charging. In some embodiments, the lithium-ion cells described herein exhibit improved gassing behavior, along with improved safety due to higher thermal decomposition temperatures of the salts used.

In some embodiments, electrolytes are based on mixture of lithium salts, $LiPF_6$, LiFSI (lithium bis(fluorosulfonyl) imide), LiTFSI (lithium bis(trifluoromethanesulfonyl)imide), in blended organic solvents, while in other embodiments, the improved low out gassing electrolytes are based essentially only on $LiPF_6$, along with a blend of organic solvents that result in the improved properties. The blended organic solvents generally comprise fluoroethylene carbonate with additional solvents, such as dimethyl carbonate, ethyl methyl carbonate, and/or cosolvents such as propylene carbonate. In some embodiments, electrolyte formulations may also use different types of additives and/or cosolvents to enhance certain performance characteristics. For example, co-solvents such as methyl acetate and ethyl acetate boost conductivity of the electrolyte, while additives such as TEP (triethyl phosphite) and PS (1,3-propane sultone) can reduce gassing and PFPN (ethoxy(pentafluoro) cyclotriphosphazene) can increase flame retardant properties. The low gassing electrolytes based on $LiPF_6$ involve organic solvents with cosolvents such as alkyl acetates, for example, methyl acetate or ethyl acetate. The low gassing electrolytes exhibit comparable cycling at moderate charging rates, and the lower gas production can be advantageous for cell production. The mixed lithium salt electrolytes described herein are able to provide lower gas production while also providing good cycling at high charge rates.

The electrolytes and corresponding electrodes described herein are engineered to provide significant properties needed to have commercial cells using a relatively large fraction of silicon-based negative electrode active material. Applicant has been able to achieve suitable cycling of silicon based negative electrodes for vehicle applications of secondary lithium ion cells. In particular, the combined features of high power and high energy can be particularly desirable for flying vehicles. Flying vehicles have high power demands at takeoff and landing. Clearly, landing occurs at the end of a flight, so high power should be available after an appropriate consumption of battery capacity to provide a reasonable range for the flight. Planned and in development flying vehicles include, for example, vertical takeoff taxis, drones, and the like. Other high performance applications, such as high performance cars and boats as well as some commercial vehicles can similarly provide a particular performance advantage based on availability of high power cells.

Lithium has been used in both primary and secondary cells. An attractive feature of lithium for cell or battery use is its light weight and the fact that it is the most electropositive metal, and aspects of these features can be advantageously captured in lithium-based cells also. Certain forms of metals, metal oxides, and carbon materials are known to incorporate lithium ions from the electrolyte into its structure through intercalation, alloying or similar mechanisms. The positive electrode of a lithium based cell generally comprises an active material that reversibly intercalates/alloys with lithium. Lithium ion cells generally refer to cells in which the negative electrode active material is also a lithium intercalation/alloying material. Lithium cells generally refer to cells in which the negative electrode active material is lithium metal or an alloy thereof. As used herein and for convenience, the terms cell and battery as well as variations thereof are used interchangeably unless some explicit distinction is recited.

The cells described herein are lithium ion cells that use a non-aqueous electrolyte solution which comprises lithium cations and suitable anions, although the electrolytes could be suitable for lithium cells also. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C.

The word "element" is used herein in its conventional way as referring to a member of the periodic table in which the element has the appropriate oxidation state if the element is in a composition and in which the element is in its elemental form, M°, when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change with cycling. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that is significantly greater than per cycle capacity loss at subsequent cycles. The irreversible capacity loss (IRCL) is the difference between the charge capacity of the new cell and the first discharge capacity. Positive electrodes based on lithium metal oxides can exhibit some IRCL which results in some compensation for the negative electrode with respect to lithium available for cycling. The irreversible capacity loss can result in a corresponding decrease in the capacity, energy and power for the cell due to changes in the cell materials during the initial cycle.

Elemental silicon as well as other silicon based active materials have attracted significant amount of attention as a potential negative electrode material due to silicon's very high specific capacity with respect to intake and release of lithium. Elemental silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes. Silicon suboxides, i.e., $SiO_x$, x<2, have also been found to be desirable active materials for lithium based batteries, which can have in some embodiments high specific capacities with respect to lithium alloying. The reference to silicon suboxide provides acknowledgement of silicon dioxide as the fully oxidized form of silicon. For convenience, silicon suboxide may be generally referred to as silicon oxide, which is not limited to silicon monoxide (SiO) unless specifically indicated. Silicon oxides are a widely used material in a range of fields, and the terminologies can be slightly different in the different fields, and silicon oxide can also be used to refer to $SiO_2$.

In embodiments of particular interest, the silicon based active materials can comprise elemental silicon, silicon suboxide and/or composites thereof, such as with carbon, as a primary active material. Silicon suboxide has been found particularly effective to achieve longer cycling stability. To stabilize the silicon based active materials as well as to increase electrical conductivity, carbon can be incorporated into a composite active material. With respect to carbon composites with nanoscale elemental silicon and/or silicon oxide, long cycling stability has remained challenging, although Applicant has achieved significant success with cycling stability with cells designed for both consumer electronics applications and vehicle applications. Longer cycling stability is exemplified herein with mixtures of electroactive graphite and silicon based composites although for some applications suitable cycling may be achieved with silicon based composites as the sole negative electrode active material. As discussed in detail below, the silicon based electrodes can further comprise additional conductive sources, such as nanoscale carbon.

The active materials for lithium ion secondary cells herein generally include, for example, a positive electrode (i.e., cathode) active material with a moderately high average voltage against lithium and a silicon based active material for the negative electrode (i.e., anode). In general, various cathode materials can be used. For example, commercially available cathode active materials can be used with existing commercial production availability. Such cathode active materials include, for example, lithium cobalt oxide (Li-$CoO_2$), $LiNi_{1/3}Mn_{1/3}Co_{1/3}O_2$ (L333 or NMC111), LiNi-$CoAlO_2$ (NCA), other lithium nickel manganese cobalt oxides (NMC), $LiMn_2O_4$ (lithium manganese oxide spinel), modified versions thereof, or mixtures thereof.

Nickel rich-lithium nickel cobalt manganese oxides (LiN-$i_xMn_yCo_zO_2$, 0.45≤x, 0.05≤y, z≤0.35) can be of interest due to lower costs and lower flammability risk relative to lithium cobalt oxide as well as the ability to cycle at desirable voltage ranges. Specifically, desirable cycling results can be obtained from nickel-rich-lithium nickel manganese cobalt oxide (N-NMC), which can be represented by the formula $LiNi_xMn_yCo_zO_2$, with x≥0.45 and x+y+z≈1 and specific cathode compositions of particular interest are described below. In the industry, both NCM and NMC are used interchangeably with the cobalt and manganese listed in the corresponding order, and the presentations are equivalent and just based on a personal preference. Also, lithium cobalt oxide can be stabilized to cycle effectively at higher voltages as described in U.S. Pat. No. 10,193,135 to Sharma et al., entitled "Positive Electrode Active Materials With Composite Coatings for High Energy Density Secondary Batteries and Corresponding Processes," incorporated herein by reference.

In the context of lithium ion cell designs, the electrolyte is established based on the design of the electrodes and the performance criteria for the cell. The improved electrolyte described herein provide unsurpassed power and energy output, while still providing excellent cycling performance. The coordination of the various parameters provides a matrix in which all of the portions of the parameters matrix are appropriate to function together to achieve the target performance. The improved electrolytes combined with corresponding electrodes allow for fast charging and significantly reduced gassing, while maintaining good cycling for cells with relatively large amounts of silicon-based active material.

Electrolytes

The desirable electrolytes can be based on mixture of lithium salts: lithium hexafluorophosphate ($LiPF_6$), lithium bis(fluorosulfonyl)imide ($LiN(FSO_2)_2$ or LiFSI) and lithium bis(trifluoromethanesulfonyl)imide ($LiN(SO_2CF_3)_2$ or LiTFSI) in blended organic solvents. In some embodiments, the electrolytes are based on $LiPF_6$, as essentially the sole lithium salt. In some embodiments, the improved electrolytes comprise a mixture of LiPF$_6$ and LiFSI, or a mixture of LiPF$_6$ and LiTFSI. In some embodiments, the improved electrolytes comprise a mixture of LiPF$_6$ and LiFSI, or a mixture of LiPF$_6$ and LiTFSI, with a majority of the lithium salt being LiFSI or LiTFSI. More generally, the electrolytes consist essentially of specified lithium salts, blends of non-aqueous solvents, and possible additives with narrow ranges of optional additional components. These electrolytes provide for the desired high power cell performance described herein, and the acceptable optional components can be used to fine-tune certain performance criteria for a particular application.

Properties of various lithium salts are shown in Table 1. Properties of LiFSI are described in Han et al. Journal of Power Sources, 2011, 196, 3623 and are summarized in Table 2. LiFSI is thermally stable up to 200° C. and when used in battery constructions comprising aluminum, the aluminum is found to be stable in the high potential region (3.0-5.0V versus Li+/Li). LiFSI has the highest ionic conductivity as measured for solutions including lithium salts in 30/70 volume % of EC/EMC (LiFSI>LiPF$_6$>LiTFSi>LiClO$_4$>LiBF$_4$). Selected properties of lithium tetrafluoroborate (LiBF$_4$) and lithium perchlorate (LiClO$_4$) are included in Table 1.

TABLE 1

| | LiFSI | LiTFSI | LiPF$_6$ | LiBF$_4$ | LiClO$_4$ |
|---|---|---|---|---|---|
| Molecular weight (g/mol)[1] | 187 | 287 | 152 | — | — |
| Ionic Conductivity (mS/cm)[1] | 9.8 | 6.8 | 8.0 | — | — |
| Thermal Decomposition Temperature (° C.)[1] | 308 | 337 | 154 | — | — |
| Molecular Radius (Å)[1] | 3.5 | 4.7 | 2.7 | — | — |
| Ionic Conductivity (mS/cm) in 30/70 (w/w) EC/EMC[2] | 10.7 | 8.2 | 9.8 | 3.9 | 6.2 |

[1]Source: Nippon Shokubai Co., Ltd. 1M salts in 3:7 (v:v) ethylene carbonate (EC): ethylmethyl carbonate (EMC).
[2]Source: Arkema, IM salts The properties of electrolytes with different lithium salts are shown in Table 2. The electrolytes are E10-E12 described below in Table 5.

TABLE 2

| Electrolyte Code | Salt | Ionic Conductivity (mS/cm) | Viscosity (mPa/s) | Boiling Point (° C.) |
|---|---|---|---|---|
| E10 | LiPF$_6$ | 7.64 | 4.3 | 116 |
| E11 | LiFSI | 8.31 | 3.7 | 120 |
| E12 | LiTFSI | 5.60 | 3.5 | 116 |
| LiFSI + LiPF$_6$ | LiFSI + LiPF$_6$ | 7.88 | — | — |

In some embodiments, the improved high power electrolytes include blended organic solvents that generally consist essentially of fluoroethylene carbonate (FEC) with additional solvents such as dimethyl carbonate (DMC) and/or ethyl methyl carbonate (EMC). In some embodiments, electrolyte formulations may also use different types of additives and/or cosolvents to enhance certain performance characteristics. For example, co-solvents, such as propylene carbonate (PC), methyl acetate (MA) and ethyl acetate (EA) can boost conductivity of the electrolyte, while additives such as triethyl phosphite ((C$_2$H$_5$O)$_3$P or TEP) or 1,3-propane sultone (C$_3$H$_6$OSO$_2$ or PS) can reduce gassing, and ethoxy(pentafluoro)cyclotriphosphazene ((C$_2$H$_5$O)F$_5$N$_3$P$_3$) or PFPN) can increase flame retardant properties.

The lithium salts are dissolved in the nonaqueous solvent. In some embodiments, the non-aqueous solvent generally comprises a majority by volume of EMC and/or DMC, with a moderate amount of FEC, and optionally PC, acetate esters or mixtures thereof in generally lesser amounts as secondary solvents or cosolvents. In some embodiments, additional additives may be included for safety concerns and/or to further reduce gassing as described above. Improvement in rate performance can be obtained with substitution of EMC for DMC.

In some embodiments, the electrolytes comprise lithium salts at a concentration from about 1.1M to about 2.2M in a non-aqueous solvent. The lithium salts generally comprise or consist essentially of (LiTFSI or LiFSI) and LiPF$_6$ in a molar ratio from about 3:1 to about 1.25:1, in further embodiments from about 2.5:1 to about 1.35:1, and in other embodiments from about 2.25:1 to about 1.45:1. An alternative format for expressing the amounts of these salts in in terms of the individual molarities. In mixed lithium salt embodiments, the electrolyte may have from about 0.05M to about 0.4M LiPF$_6$, in further embodiments, from about 0.075M to about 0.375M and in other embodiments from about 0.1M to about 0.35M LiPF$_6$ and from about 0.7M to about 2.15M (LiFSI or LiTFSI), in further embodiments from about 0.8M to about 2M and in other embodiments from about 0.9M to about 1.9M (LiFSI or LiTFSI). Some low gassing electrolytes are formed with LiPF$_6$ as essentially the sole lithium salt. For the mixed salt electrolytes or the LiPF$_6$ based electrolytes, any additional lithium salts in the electrolyte are present in an amount of no more than about 10 mole percent (mol %) of the total lithium salts, in other embodiments no more than about 7.5 mol %, in further embodiments no more than about 5 mol %, in additional embodiments no more than about 2 mol % and in some embodiments no more than about 1 ml %. A person of ordinary skill in the art will recognize that additional ranges of lithium salt concentrations within the explicit ranges above are contemplated and are within the present disclosure.

Other lithium salts can include, for example, lithium 4-pyridyl trimethyl borate (LiB(C$_5$H$_4$N)(OMe)$_3$ or LPTB), lithium bis(oxalate) borate (LiB(C$_2$O$_4$)$_2$ or LiBOB), lithium difluoro(oxalato)borate (LiBF$_2$(C$_2$O$_4$) or LiFOB), lithium bis(monofluoromalonato)borate (LiBFMB), (LiB(lithium tetracyanoborate (LiB(CN)$_4$, lithium bis(perfluoroethanesulfonyl)imide (LiN(SO$_2$ CF$_3$)$_2$ or LiBETI), lithium cyclo-difluoromethane-1,1-bis(sulfonyl)imide (LiDMSI), lithium dicyano-trifluoromethyl-imidazole (LiTDI), lithium dicyano-pentafluoroethyl-imidazole (LiPDI), lithium dicyano-heptafluoropropyl-imidazole (LiHDI), lithium fluoroalkylphosphate (LiFAP or LiF$_x$(C$_y$F$_{2y+1}$)$_z$ where x=1-3, y=1-3 and x+z=6), lithium dicyanotriazolate (LiDCTA), lithium tris(trifluoromethylsulfonyl)methanide (LiTriTFSM), lithium tricyanomethanide (LiTCM), lithium trifluoromethanesulfonate (lithium triflate or LiSO$_3$ CF$_3$), lithium borohydride (LiBH$_4$), lithium perchlorate (LiClO$_4$) and mixtures.

The non-aqueous solvent generally comprises from about 50 to about 90 volume percent (EMC, DMC or a mixture thereof), from about 5 to about 25 volume percent FEC, optionally from about 5 to about 15 volume percent PC, optionally from about 5 to about 15 volume percent alkyl acetate (methyl acetate, ethyl acetate, propyl acetate, other C3-C10 alkyl acetates, or a mixture thereof), and no more than about 10 volume percent of other organic liquids/additives. As exemplified herein, electrolytes with EMC provide desirable cycling with lower out gassing. In further embodiments, the electrolyte comprises from about 60 volume percent to about 80 volume percent EMC or DMC or a mixture of DMC and EMC, from about 9 volume percent to about 20 volume percent FEC, optionally 5 volume percent to about 10 volume percent PC, and optionally from about 5 volume percent to about 10 volume percent alkyl acetate. With respect to other optional cosolvent additives, in some embodiments, the electrolytes comprises no more than about 7 volume percent, in further embodiments no more than about 5 volume percent, in additional embodiments no more than about 2 volume percent and in some embodiments no more than about 1 volume percent total cosolvent additives. Other optional cosolvent additives refer to cosolvents other than PC and alkyl acetates. A person of ordinary skill in the art will recognize that additional ranges of solvent component concentrations within the explicit ranges above are contemplated and are within the present disclosure, and a more detailed discussion of electrolyte formulations is provided below.

The electrolyte can optionally comprise other cosolvents such as other cyclic carbonates (e.g., butylene carbonate (BC), vinylene carbonate and derivatives thereof, and vinylethylene carbonate (VEC)), lactones (e.g., gamma-butyrolactone (GBL), gamma-valerolactone (GVL) and alpha-angelica lactones (AGL)), other linear carbonates (e.g., diethyl carbonate (DEC), methyl propyl carbonate (MPC), dipropyl carbonate (DPC), methyl butyl carbonate (MEC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) esters (e.g., methyl propionate, methyl pivalate, butyl pivalate and octyl pivalate), amides (e.g., dimethyl formamide), and combinations thereof. Generally, the electrolyte comprises no or very low amounts (<0.5 vol. %) of ethylene carbonate (EC) since silicon based anodes generally do not cycle well with EC solvents. A person of ordinary skill in the art will recognize that additional ranges of additive concentrations within the explicit ranges above are contemplated and are within the present disclosure.

Other optional additives can provide antigassing effects, reduce flammability and/or provide other safety effects as described above. Any additives can be selected to help maintain desired cycling stability.

The electrolyte can comprise nonionic organic additives at concentrations of 0 to about 10 weight percent, in further embodiments from about 0 to about 7 wt %, and in other embodiments from about 0.1 wt % to about 5 wt %. In some embodiments, the nonionic organic additives can be selected from the group consisting of TEP, PS, PFPN, LPTB, propene sultone, sulfones such as dimethyl sulfone or divinyl dioxathilane-2,2-dioxide (DTD), phenyl trifluoromethyl sulphide (PTS), trivinylcyclotriboroxane (tVCBO), phenyl boronic acid ethylene glycol ester (PBE), trimethyl borate (TMB), triethyl borate (TEB), tris(trimethylsilyl) phosphite (TMSPi), and organic phosphates such as trimethyl phosphate and trioctyl phosphate. A person of ordinary skill in the art will recognize that additional ranges of additive concentrations within the explicit ranges above are contemplated and are within the present disclosure.

The use of FEC to reduce aluminum current collector corrosion with electrolytes using LiFSI is described in published Japanese patent application 2014-203748 to Shinya et al., entitled "Nonaqueous Electrolyte Solution for Lithium Ion Secondary Batteries and Lithium Ion Secondary Battery Having the Same," incorporated herein by reference. Electrolytes with blends of lithium salts, $LiPF_6$ and LiFSI, for use with silicon based electrodes is described in published U.S. patent application 2020/0168955 to Shimanuki et al. (hereinafter the '955 application), entitled "Lithium Ion Secondary Battery," incorporated herein by reference. The '955 application focuses on the inclusion of dialkyl sultone additives with certain solvents. The stated objectives in the '955 application for the new additives include a decrease of active material expansion as a result of lithium incorporation, which they speculate should assist with "durability." The electrolytes described herein have different formulations that provide the improved high power battery performance with silicon based anode active materials while maintained good cycling.

Applicant has achieved very good cycling of silicon-based electrodes using previously developed electrolytes as described in published U.S. patent application 2020/0411901 to Dong et al. (hereinafter the '901 application), entitled "Lithium Ion Cells with High Performance Electrolyte and Silicon Oxide Active Materials Achieving Very Long Cycle Life Performance," incorporated herein by reference. While the '901 application achieved important breakthroughs in cycle life performance for silicon-based cells, the results herein are directed to reduction of out gassing and improved stability desired for broad commercial application. A reference electrolyte used in the Examples is based on an electrolyte from the '901 application and is referred to as E1 with no particular significance to the nomenclature.

In some embodiments, the electrolyte formulations described in this work show better thermal characteristics and reduced out gassing, while exhibiting similar or better cycle life than a reference electrolyte formulation consisting of $LiPF_6$ salt in FEC and DMC solvents. As exemplified herein, a first family of electrolytes have formulations with a blend of $LiPF_6$ and LiTFSI salts in solvents consisting of FEC, EMC, PC and either MA or EA. A second family of new electrolytes has $LiPF_6$ salt in solvents consisting of FEC, EMC, PC and either MA or EA, along with optionally DMC. Electrolytes are also exemplified with individual salts, $LiPF_6$, LiFSI or LiTFSI, in solvents consisting of FEC, EMC, and PC. These exemplified electrolytes suggest other variations within these explicit ranges taught.

Electronic vehicles are of significant interest for lithium ion cells for commercial application. Suitable vehicles include, for example, car, trucks, vans, sports utility vehicles, crossover styles, commercial trucks, construction equipment, utility vehicles, such as fork lifts or the like, flying occupied vehicles, such as personal air vehicles or the like, unoccupied land vehicles, such as tractors, people movers, or the like, unoccupied flying vehicles, such as drones or the like, and similar vehicles. For these applications, it can be desirable to use pouch style cells with flexible enclosures. With flexible enclosures, it can be desirable to incorporate the cells into a battery pack that holds the cells within a specified volume. Such a volume constraint effect is similarly exhibited in cells assembled within metal containers, such as coin cell embodiments used in the Examples. The positioning of the cells in a pack can be the equivalent of clamping the cells to control disassembly of the electrode stack that could compromise cycling. In the examples below, cell expansion is examined for unclamped pouch cells to examine the effects of outgassing. In a constrained configuration, the cells are not able to expand, but outgassing expresses itself through an increase in pressure. An increase in pressure can be exacerbated by increases in temperature. For these reasons, the cycling performance at 45° C. can reflect the ability to control the outgassing.

General Battery Features

The negative electrode and positive electrode structures can be assembled into appropriate cells. As described further below, the electrodes are generally formed in association with current collectors to form electrode structures. A separator is located between a positive electrode and a negative electrode to form a cell. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Asahi Kasei (Japan) Also, ceramic-polymer composite materials have been developed for separator applications. These ceramic composite separators can be stable at higher temperatures, and the composite materials can reduce the fire risk. Polymer-ceramic composites for lithium ion battery separators are sold under the trademark Separion® by Evonik Industries, Germany, Lielsort® by Tiejin Lielsort Korea Co., Ltd. and Q-Series ceramic coated polymer separators from Celgard®. Also, separators can be formed using porous polymer sheets coated with a gel-forming polymer. Such separator designs are described further in U.S. Pat. No. 7,794,511 B2 to Wensley et al., entitled "Battery Separator for Lithium Polymer Battery," incorporated herein by reference. Suitable gel-forming polymers include, for example, polyvinylidene fluoride (PVDF), polyurethane, polyethylene oxide (PEO), polypropylene oxide (PPO), polyacylonitrile, gelatin, polyacrylamide, polymethylacrylate, polymethylmethacrylate, polyvinyl acetate, polyvinylpyrrolidone, polytetraethylene glycol diacrylate, copolymers thereof, and mixtures thereof.

Electrolyte provides for ion transport between the anode and cathode of the battery during the charge and discharge processes. The electrolytes for lithium ion batteries incorporate non-aqueous solvents and lithium salts. Improved electrolytes for silicon based electrodes are described in detail below. The electrolytes generally are infused into the cell prior to sealing the case.

The electrodes described herein can be assembled into various commercial cell/battery designs such as prismatic shaped batteries, wound cylindrical cells, coin cells, or other reasonable cell/battery designs. The cells can comprise a single pair of electrodes or a plurality of pairs of electrodes assembled in parallel and/or series electrical connection(s). Electrode stacks can have an extra electrode to end the stack with the same polarity as the other end of the stack for convenience in placement in a container. While the electrode structures described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the cell structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the cell. Some presently used rechargeable commercial cells include, for example, the cylindrical 18650 cells (18 mm in diameter and 65 mm long) and 26700 cells (26 mm in diameter and 70 mm long), although other cell/battery sizes can be used, as well as prismatic cells and foil pouch cells/batteries of selected sizes.

Pouch batteries can be particularly desirable for various applications, including certain vehicle applications, due to stacking convenience and relatively low container weight. A pouch battery design for vehicle batteries incorporating a high capacity cathode active material is described further in U.S. Pat. No. 8,187,752 to Buckley et al, entitled "High Energy Lithium Ion Secondary Batteries" and U.S. Pat. No. 9,083,062B2 to Kumar et al., entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well.

A representative embodiment of a pouch battery is shown in FIGS. 1A-1D. In this embodiment, pouch battery 100 comprises pouch enclosure 102, electrode core 104 and pouch cover 106. An electrode core is discussed further below. Pouch enclosure 102 comprises a cavity 110 and edge 112 surrounding the cavity. Cavity 110 has dimensions such that electrode core 104 can fit within cavity 110. Pouch cover 106 can be sealed around edge 112 to seal electrode core 104 within the sealed battery, as shown in FIGS. 1B and 1C. Terminal tabs 114, 116 extend outward from the sealed pouch for electrical contact with electrode core 104. FIG. 1C is a schematic diagram of a cross section of the battery of FIG. 1B viewed along the 3-3 line. Many additional embodiments of pouch batteries are possible with different configurations of the edges and seals.

FIG. 1D shows an embodiment of an electrode core 104 that generally comprise an electrode stack. In this embodiment, electrode stack 130 comprises negative electrode structures 132, 134, 136, positive electrode structures 138, 140, and separators 150, 152, 154, 156 disposed between the adjacent positive and negative electrodes. The separator can be provided as a single folded sheet with the electrode structures placed in the separator folds. Negative electrode structures 132, 134, 136 comprise negative electrodes 160, 162, negative electrodes 164, 166 and negative electrodes 168, 170, respectively, disposed on either side of current collectors 172, 174, 176. Positive electrode structures 138, 140 comprise positive electrodes 180, 182 and positive electrodes 184, 186, respectively, disposed on opposite sides of current collectors 188, 190, respectively. Tabs 192, 194, 196, 198, 200 are connected to current collectors 172, 188, 174, 190, 176, respectively, to facilitate the connection of the individual electrodes in series or in parallel. For vehicle applications, tabs are generally connected in parallel, so that tabs 192, 196, 200 would be electrically connected to an electrical contact accessible outside the container, and tabs 194, 198 would be electrically connected to an electrical contact as an opposite pole accessible outside the container.

Electrode stacks can have an extra negative electrode such that both outer electrodes adjacent the container are negative electrodes. Generally, a battery with stacked electrodes of the dimensions described herein have from 5 to 40 negative electrode elements (current collector coated on both sides with active material) and in further embodiments from 7 to 35 negative electrode elements with corresponding numbers of positive electrode elements being generally one less than the negative electrode elements. A person of ordinary skill in the art will recognize that additional ranges of electrode numbers within the explicit ranges above are contemplated and are within the present disclosure.

As noted above, wound electrodes can be correspondingly used for either a cylindrical battery or a roughly prismatic shaped battery. Wound cells for cylindrical lithium ion batteries are described further in U.S. Pat. No. 8,277,969 to Kobayashi et al., entitled "Lithium Ion Secondary Battery," incorporated herein by reference. Prismatic shaped batteries with wound electrodes are described in U.S. Pat. No. 7,700,221 to Yeo (the '221 patent), entitled "Electrode Assembly and Lithium Ion Secondary Battery Using the Same," incorporated herein by reference. The Kobayashi '969 patent and the Yeo '221 patent do not describe how to achieve reasonable cycling or a high energy density with silicon based active materials. Designs for prismatic shaped batteries with wound electrodes are described further, for example, in the '221 patent cited above. A particular design of either a stacked set of electrodes or a wound cell can be influenced by the target dimensions and the target capacity of the battery.

The improved negative electrodes can be used for a range of applications and cell/battery designs. For electrode stacks, the areas of the electrodes can be selected reasonably based on the volume and design constraints for the particular application. The following discussion focuses on larger cells generally designed for vehicle applications, such as drones, automobiles, trucks, flying vehicles, or other vehicles. However, the improved negative electrodes described herein can be effectively used for consumer electronics applications, which can be based on smaller cell formats. The general design of consumer electronics cells using silicon based active materials is described in published U.S. patent application 2015/0050535 to Amiruddin et al. (hereinafter the '535 application), entitled "Lithium Ion Batteries With High Capacity Anode Active Material and Good Cycling for Consumer Electronics," incorporated herein by reference. Also, it should be noted that vehicles can use smaller consumer electronics cells, and Tesla cars presently are famous for using thousands of small consumer electronics cells in their battery packs. Generally, larger format cells/batteries can achieve larger energy densities within certain ranges. It may be desirable to select positive electrode active materials based on the particular application to balance various considerations, such as energy densities.

With the selection of electrode parameters, the design of high gravimetric energy density cells can incorporate a balance of factors including electrode area, the number of electrode structures, and battery capacity. The electrode area refers to the spatial extent of one of the electrodes along one side of a current collector. FIG. 1A depicts the length "L" of electrode core 104, and FIG. 1C depicts the width "W" such that the area of the electrode is defined as L×W. In some embodiments, the area of each electrode can be similar such that the dimensions of a battery comprising an electrode stack can have a length and width that are similar to the length and width of each electrode in the stack. In some embodiments, the separator can be in sheets with an area slightly larger than the area of the electrode, and in some embodiments, the separator can be folded, pleated or formed with pockets in which the electrodes are placed in folds or the pocket of the separator. The design of cells with high capacity silicon based active materials to achieve certain overall cell capacities is described in U.S. Pat. No. 9,780,358 to Masarapu et al., entitled "Battery Designs With High Capacity Anode Materials and Cathode Materials, incorporated herein by reference.

Electrode Structures

The electrodes of the cell comprise the active material along with a binder and conductive additives. The electrodes are formed into a sheet, dried and pressed to achieve a desired density and porosity. The electrode sheets are generally formed directly on a metal current collector, such as a metal foil or a thin metal grid. For many cell structures, electrode layers are formed on both sides of the current collector to provide for desirable performance in the assembled cell or battery. The electrode layers on each side of the current collector can be considers elements of the same electrode structure since they are at the same potential in the cell, but the current collector itself, while part of the electrode structure is not generally considered part of the electrode since it is electrochemically inert. Thus, references to the physical aspects of an electrode generally refer to one layer of electrode composition within the electrode structure. An electrically conductive current collector can facilitate the flow of electrons between the electrode and an exterior circuit.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates. The characterization of the specific negative electrode layers and positive electrode layers are presented in the following sections.

In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector thicknesses within the explicit ranges above are contemplated and are within the present disclosure.

Negative Electrodes

The basic electrode design comprises a blend of active compositions, polymer binder, and an electrically conductive diluent. As noted above, in some embodiments, improved electrode designs can involve a polymer binder blend and a blend of active compositions as well as nanoscale conductive carbon additives. The active material blend can comprise in some embodiments a majority of silicon based active material, such as a silicon oxide composite, and at least 10 weight percent of distinct graphite. Also, it has been discovered that stabilization of the electrode cycling with silicon based active materials can obtained with a blend of polyimide to provide high mechanical strength with a portion of a more deformable polymer that still provides good electrode performance in a synergistic binder blend. While the graphite can provide electrical conductivity to the electrode, it has also been found that in some embodiments a quantity of distinct nanoscale conductive carbon nevertheless can be significant toward the ability to produce a long cycling negative electrode. In general, the nanoscale conductive carbon is not believed to be electrochemically active while the graphite is electrochemically active. These improved design aspects are then incorporated into electrodes with further previously discovered silicon based electrode improvements.

Significant interest has been directed to high capacity negative electrode active material based on silicon. Until Applicant's recent work, silicon based active materials generally have not achieved suitable cycling stability for automotive use for batteries containing significant quantities of silicon. The '535 application has demonstrated successful cycling suitable for consumer electronics applications and the like with cycling up to around 200-300 cycles at values of at least 80% initial capacity. Applicant has had particular success with respect to cycling stability has been achieved using materials primarily based on silicon oxide composites. Applicant's development of improved electrode structures along with suitable electrolytes has allowed for characterization of cells with a majority of silicon-based active material while achieving cycling suitable for vehicle application. As demonstrated herein, electrodes are provided that can be successfully cycled with high power for more than 800 cycles without a drop in capacity below 80% with cycling over a large voltage range at a reasonable rate. Thus, the present work is directed to extending cycling stability into a realm suitable for vehicle use. In particular, flying vehicles are particularly reliant on high power performance.

As described herein, improved cycling results are obtained with a blended active composition with a silicon based active material and graphitic carbon. Generally, an overall capacity of the negative electrode blended active material can be at least about 750 mAh/g, in further embodiments at least about 900 mAh/g, in additional embodiments at least about 1000 mAh/g, and in other embodiments at least about 1100 mAh/g cycled against lithium metal from 5 millivolts (mV) to 1.5V at a rate of C/3. The blended active material can comprise at least about 40 wt % silicon based active material, in further embodiments at least about 50 wt % silicon based active material, in other embodiments from about 55 wt % to about 95 wt % silicon based active material, and in additional embodiments from about 60 wt % to about 90 wt % silicon based active material. Correspondingly, the blended active material can comprise from about 5 wt % graphite to about 65 wt % graphite, in further embodiments from about 7 wt % graphite to about 60 wt % graphite, in additional embodiments from about 8 wt % graphite to about 55 wt %, and in other embodiments from about 10 wt % graphite to about 50 wt % graphite. A person of ordinary skill in the art will recognize that additional ranges of specific discharge capacity and concentrations of silicon based active material within the explicit ranges above are contemplated and are within the present disclosure.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium based cell. The silicon oxide can incorporate a relatively large amount of lithium such that the material can exhibit a large specific capacity. However, silicon oxide is also observed generally to have a capacity that fades relatively quickly with cell cycling. Commercial silicon based material comprising SiO, which from some suppliers may be in a composite with carbon and silicon nanocrystals, is available from Alfa Aesar (USA), Sigma-Aldrich (USA), Shin-Etsu (Japan), Osaka Titanium Corporation (Japan), and Nanostructured and Amorphous Materials Corp. (USA). Additional specific suitable formulations of the silicon based compositions are described further below. Applicant has achieved cycling stabilization of silicon oxide based composite active materials using improved electrode formulations, and these advancements are continued herein to further improve rate capabilities and corresponding power output. In some embodiments, it can be desirable to have negative electrodes comprising a combination of graphitic carbon active material and silicon based active material to extend cycling life with an acceptable decrease in specific capacity, and the superior cycling performance exemplified herein uses such active material blends.

As noted above and described in detail below, suitable silicon based active materials can comprise a composite with a carbon component. Silicon based active materials are discussed in detail in the following section. A composite refers to a particulate material with components that are intimately combined into an integral material with effective uniformity over appropriate scales, in contrast with blends that involve mixtures held together with a polymer binder. Composite components that can comprise, for example, silicon, oxygen, carbon and the like. While not wanting to be limited by theory, it is not generally believed that a carbon component of a composite with silicon is active in electrochemistry and generally not graphitic, although the activity is an abstract concept given the intimate combination in the composite and the crystal structure may be extremely complex and difficult to evaluate. In any case, the carbon component of a composite material is readily understood by a person of ordinary skill in the art to be distinguishable from the distinct graphite not in a composite in active material blends. The examples below are based on a commercial composite composition believed to be comprising primarily of silicon suboxide with some amounts of elemental silicon crystals and elemental carbon in a combined composite particulate material.

Graphite is available commercially in natural and synthetic forms, and suitable graphite includes either natural or synthetic graphite or the like. Graphite is a crystalline form of carbon with covalently bonded carbon in sheets. As used herein, graphite refers to graphitic carbon without requiring perfect crystallinity, and some natural graphite materials can have some crystalline impurities. But the graphite refers generally to a material dominated by a graphitic structure, as would be recognized in the art. Graphite is electrically conductive along the plane of the covalent carbon sheets that are stacked in the crystal. The crystalline carbon in graphitic forms can intercalate lithium, so that it is an established electrochemically active material for lithium ion batteries.

Graphite particles can have average particle diameters from about 1 micron to about 30 microns, in further embodiments from about 1.5 microns to about 25 microns, and in other embodiments from about 2 microns to about 20 microns. In general, it is desirable for the graphite to not include particles greater than the electrode thickness to avoid a bumpy electrode surface, and graphitic particles with a size significantly less than a micron can be less crystalline. In some embodiments, the graphitic carbon can have a D50 (mass median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material (which can be evaluated according to ISO 4652) can be from about 1 m$^2$/g to about 25 m$^2$/g, in further embodiments from about 1.25 m$^2$/g to about 20 m$^2$/g and in additional embodiments from about 1.5 m$^2$/g to about 12 m$^2$/g. A person of ordinary skill in the art will recognize that additional ranges of particle size and surface area for graphitic carbon active materials are contemplated and are within the present disclosure. In comparison, electrically conductive carbon blacks or the like (which have been referred to as paracrystalline) generally have surface areas of at least roughly 40 m$^2$/g to 1000 m$^2$/g or greater.

With respect to the polymer binder, Applicant has obtained reasonable cycling of silicon based cells using high tensile strength binders, e.g., polyimide binder. See U.S. Pat. No. 9,601,228 to Deng et al. (hereinafter the '228 patent) entitled: "Silicon Oxide Based High Capacity Anode Materials for Lithium Ion Batteries," incorporated herein by reference. In some embodiments to obtain longer cycling stability, it has been surprisingly found that a polymer binder blend further stabilizes cycling. In particular, a second polymer or combination of polymers providing a lower elastic modulus (corresponding with greater elasticity) can be blended with high tensile strength polyimide. The binder blend generally comprises at least about 50 wt % polyimide, in further embodiments at least about 55 wt % and in other embodiments from about 60 wt % to about 95 wt % polyimide. Similarly, the binder blend generally comprises at least about 5 wt % polymer with a lower elastic modulus, in further embodiments at least about 10 wt %, and in other embodiments from about 12 wt % to about 40 wt % lower elastic modulus polymer, as specified further below. A person of ordinary skill in the art will recognize that additional ranges of polymer quantities within the explicit ranges above are contemplated and are within the present disclosure. The polymers of the blend can be selected to be soluble in the same solvents.

Due to the large volume changes of silicon based material during cycling, electrode design has been a significant aspect of construction of cells with silicon based anodes to achieve desirable cycling. Part of the electrode design includes selection of a polymer binder that facilitates the maintenance of electrode integrity over cycling. The achievement of stable cycling of silicon-based active materials in cells with a reasonable capacity and energy density has necessitated significant cell engineering. Applicant achieved significant progress in the cycling of negative electrodes with silicon based active materials initially using a polyimide binder and nanoscale carbon electrically conductive materials. See, U.S. Pat. No. 10,290,871 to Masarapu et al., entitled "Battery Cell Engineering and Design to Reach High energy," incorporated herein by reference. The high tensile strength and high elongation were believed to be significant features of the polyimide for contributing to the cycling properties. The polyimide binders were processible with organic solvents, although more recently developed polyimides are water processible, see UBE Industries polyimides.

Polyimide was initially identified as a useful polymer binder for silicon based materials due to its mechanical strength. Thus, with the mechanical forces in the polymer associated with the material changes of the active material with the uptake or release of lithium, polyimide provides some stability to the electrode. Good cycling results, especially suitable for consumer electronics was achieved with polyimide binders. See, Applicant's '535 application cited above. Applicant then discovered that a blend of polymers with polyimide and a more elastic polymer further improved the electrode performance. See, U.S. Pat. No. 11,094,925 to Venkatachalam et al. (hereinafter the '925 patent), entitled "Electrodes with Silicon Oxide Active Materials, for Lithium Ion Cells Achieving High Capacity, High Energy Density and Long Cycle Life Performance," incorporated herein by reference. Suitable water based binders have now also been identified as an alternative to solvent based polymer binders to offer a more environmentally friendly approach. See published U.S. patent application 2022/0006090 to Hayes et al., entitled "Lithium Ion Cells With Silicon Based Active Materials and Negative Electrodes With Water Based Binders Having Good Adhesion and Cohesion," incorporated herein by reference. The Examples herein are based on organic solvent processed binders, but Applicant has achieved similar good cycling with both solvent based and water based negative electrode binders.

Polyimides are polymers based on repeat units of the imide monomer structure. The polyimide polymer chain can be aliphatic, but for high tensile strength applications, the polymer backbone generally is aromatic with the polymer backbone extending along the N-atom of the polyimide structure. For silicon-based anodes that exhibit significant morphological changes during cycling, thermally curable polyimide polymers have been found desirable for high capacity negative electrodes, which may be due to their high mechanical strength. Table 3 provides suppliers of high tensile strength polyimide polymers, and names of corresponding polyimide polymers.

TABLE 3

| Supplier | Binder |
| --- | --- |
| New Japan Chemical Co., Ltd. | Rikacoat PN-20; Rikacoat EN-20; Rikacoat SN-20 |
| DuPont | Kapton ® |
| AZ Electronic Materials | PBI MRS0810H |
| Ube Industries. Ltd. | U-Vamish S; U-Varnish A |
| Maruzen Petrochemical Co., Ltd. | Bani-X (Bis-allyl-nadi-imide) |
| Toyobo Co., Ltd. | Vyromax ® HR16NN |

The polyimide polymers can have a tensile strength of at least about 60 MPa, in further embodiments at least about 100 MPa and in other embodiments at least about 125 MPa. Some commercial polyimides with high tensile strength can also have relatively high elongation values, which is the amount of elongation tolerated before the polymer tears. In some embodiments, the polyimides can have an elongation of at least about 40%, in further embodiments at least about 50% and in other embodiments at least about 55%. Tensile strengths and elongation values can be measured according to procedures in ASTM D638-10 Standard Test Method for Tensile Properties of Plastics or ASTM D882-91 Standard Test Method for Tensile Properties of Thin Plastic Sheeting, both of which are incorporated herein by reference. Based on values reported by commercial suppliers, the results from these alternative ASTM protocols seem similar to each other for polyimides. A person of ordinary skill in the art will recognize that additional ranges of polymer properties within the explicit ranges above are contemplated and are within the present disclosure.

Suitable more flexible polymer components can be selected to be inert with respect to the electrochemistry of the cell and to be compatible with processing with the polyimide. In particular, suitable more flexible polymer components include, for example, polyvinylidene fluoride (PVDF), cellulose, such as carboxy methyl cellulose (CMC), styrene-butadiene rubber (SBR), lithiated polyacrylic acid (LiPAA), or mixtures thereof. With respect to polymer properties, some significant properties for high capacity negative electrode application are summarized in Table 4.

TABLE 4

| Binder | Elongation | Tensile Strength (MPa) | Elastic Modulus (GPa) |
|---|---|---|---|
| PVDF | 5-50% | 30-45 | 1.0-2.5 |
| Polyimide | 30-100% | 60-300 | 2.5-7 |
| CMC | 30-40% | 10-15 | 1-5 |
| SBR | 400-600% | 1-25 | 0.01-0.1 |
| LiPAA | 1-6% | 90 | 1-4 |

PVDF, CMC, and SBR are available commercially from many sources. LiPAA can be made from lithium hydroxide (LiOH) and commercial polyacrylic acid (PAA). For example, a stoichiometric amount of LiOH can be added to a solution of PAA with one mole of LiOH per monomer unit of PAA. The formation and use of LiPAA is described further in Li et al., "Lithium polyacrylate as a binder for tin-cobalt-carbon negative electrodes in lithium-ion batteries," Electrochemica Acta 55 (2010) 2991-2995, incorporated herein by reference.

The elongation refers to the percent elongation prior to tearing of the polymer. In general, to accommodate the silicon based materials, it is desirable to have an elongation of at least about 30%, in some embodiments at least about 50%, and in further embodiments at least about 70%. For the polymer binder blend, it can be desirable for the more elastic polymer binder component to have an elastic modulus (alternatively referred to as Young's modulus or tensile modulus) of no more than about 2.4 GPa, in further embodiments no more than about 2.25 GPa, in other embodiments no more than about 2 GPa, and in additional embodiments no more than about 1.8 GPa. A person of ordinary skill in the art will recognize that additional ranges of more elastic polymer component properties within the explicit ranges above are contemplated and are within the present disclosure.

To form the electrode, the powders can be blended with the polymer in a suitable liquid, such as a solvent for dissolving the polymer. Polyimides and PVDF can generally be processed in N-methyl pyrrolidone (NMP), although other suitable organic solvents may be used. Water processable polyimides are commercially available, and these water processable polyimides are suitable for blending with a wider range of other polymers. The particulate components of the electrode, i.e., the active material and nanoscale conductive carbon, can be blended with the polymer binder blend in the solvent to form a paste. The resulting paste can be pressed into the electrode structure.

The active material loading in the binder can be large. In some embodiments, the negative electrode has from about 75 wt % to about 92 wt % of negative electrode active material, in other embodiments from about 77 wt % to about 90 wt % of the negative electrode active material, and in further embodiments from about 78 wt % to about 88 wt % of the negative electrode active material. In some embodiments, the negative electrode has from about 6 wt % to about 20 wt % polymeric binder, in other embodiments about 7 wt % to 19 wt % polymeric binder, and in further embodiments from about 8 wt % to 18 wt % polymeric binder. Also, in some embodiments, the negative electrode comprises from about 1 wt % to about 7 wt % nanoscale conductive carbon, in further embodiments form about 1.5 wt % to about 6.5 wt %, and in additional embodiments from about 2 wt % to about 6 wt % nanoscale conductive carbon. A person of ordinary skill in the art will recognize that additional ranges of polymer loadings within the explicit ranges above are contemplated and are within the present disclosure.

For improved cycling negative electrodes, nanoscale carbon additives or combinations thereof have been found to be particularly desirable. Nanoscale conductive carbon refers generally to particles of high surface area elemental carbon having at least two dimensions of the primary particles being submicron. Suitable nanoscale conductive carbon includes, for example, carbon black, carbon nanotubes and carbon nanofibers. In some embodiments, the nanoscale conductive carbon additive used in the negative electrode can comprise carbon nanotubes, carbon nanofibers, carbon nanoparticles (e.g., carbon black), or combinations thereof. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of particles loadings and conductivities within the explicit ranges about are contemplated and are within the present disclosure.

Electrical conductivity, which is the inverse of resistivity, can be reported by distributors, and the conductivity is generally measured using specific techniques developed by the distributors. For example, measurements of carbon black electrical resistance is performed between two copper electrodes with Super P® carbon blacks, see Timcal Graphite & Carbon, A Synopsis of Analytical Procedures, 2008, www.timcal.com. Suitable supplemental electrically conductive additives can also be added to contribute to longer term cycling stability. Alternatively, some suppliers describe the conductive carbon concentrations to achieve the conductive percolation threshold. Carbon black refers to synthetic carbon materials and can alternative be referred to as acetylene black, furnace black, thermal black or other names suggesting the synthesis approach.

Carbon black generally is referred to as amorphous carbon, but there are suggestions of small domains with short or medium range order corresponding to graphite or diamond crystal structure in at least some forms of carbon black, but for practical purposes the material can be considered amorphous. Under ISO Technical Specification 80004-1 (2010), carbon black is a nanostructured material. The primary particles of carbon black can be on the order of tens of nanometers or less, but the primary particles are generally hard fused into chains or other aggregates, and the smallest dispersible units can be considered between about 80 nm and 800 nm, which is still submicron. Carbon blacks are available commercially that have been synthesized to provide a desirable level of electrical conductivity, such as Super-P® (Timcal), Ketjenblack® (Akzo Nobel), Shawinigan Black® (Chevron-Phillips), and Black Pearls 2000® (Cabot).

Carbon nanofibers are high aspect ratio fibers that generally comprise graphene layers in plates, cones or other forms, which carbon nanotubes comprise graphene sheets folded into tubes. Carbon nanofibers can have diameters of 250 nm or less and are commercially available, for example, Pyrograf® carbon nanofibers (Pyrograf Products, Inc.) or from American Elements, Inc. Carbon nanotubes have been found to be a desirable conductive additive that can improve cycling performance for either a positive electrode or a negative electrode. Single wall or multiwall carbon nanotubes are also available from American Elements, Inc. (CA, USA), Cnano Technologies (China), Fuji, Inc. (Japan), Alfa Aesar (MA, USA) or NanoLabs (MA, USA).

The negative electrode used in the cells described herein can have high active material loading levels along with reasonably high electrode density. For a particular active material loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 mg/cm², in other embodiments from about 2 mg/cm² to about 8 mg/cm², in additional embodiments from about 2.5 mg/cm² to about 6 mg/cm², and in other embodiments from about 3 mg/cm² to about 4.5 mg/cm². In some embodiments, the negative electrode of the battery has an active material density in some embodiment from about 0.5 g/cc (cc=cubic centimeters (cm³)) to about 2 g/cc, in other embodiment from about 0.6 g/cc to about 1.5 g/cc, and in additional embodiments from about 0.7 g/cc to about 1.3 g/cc. Similarly, the silicon oxide based electrodes can have an average dried thickness of at least about 15 microns, in further embodiments at least about 20 microns and in additional embodiments from about 25 microns to about 75 microns. The resulting silicon oxide based electrodes can exhibit capacities per unit area of at least about 3.5 mAh/cm², in further embodiments at least about 4.5 mAh/cm² and in additional embodiments at least about 6 mAh/cm². A person of ordinary skill in the art will recognize that additional ranges of active material loading level and electrode densities within the explicit ranges above are contemplated and are within the present disclosure.

High Capacity Silicon Based Anode Materials

In general, the battery designs herein are based on a high capacity anode active material. Specifically, the anode active materials generally have a specific capacity of at least about 800 mAh/g, in further embodiments at least about 900 mAh/g, in additional embodiments at least about 1000 mAh/g, in some embodiments at least about 1150 mAh/g and in other embodiments at least about 1400 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit reasonably comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Elemental silicon, silicon alloys, silicon composites and the like can have a low potential relative to lithium metal similar to graphite. However, elemental silicon generally undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Commercially available composites of silicon suboxide, elemental silicon and carbon can be used in the cells described herein. Also, other formulations of silicon based negative electrode active materials have been developed with high capacity and reasonable cycling properties. Some silicon based compositions are described below that provide potential and promising alternatives to commercially available SiO based compositions. The improved electrolyte formulations described herein are found to be particularly effective with silicon based negative electrode active materials as well as with blends of silicon based active materials with graphite.

Also, silicon based high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added directly or indirectly to the negative electrode material to offset the IRCL. The use of supplemental lithium to improve the performance of silicon based electrodes is described also in the '694 patent and '228 patent, both cited above and incorporated herein by reference. The use of supplemental lithium in the improved battery designs is described further below.

The anode, i.e., negative electrode, of the batteries described herein can use nanostructured active silicon based materials to accommodate better for volume expansion and thus maintain the mechanical electrode stability and cycle life of the battery. Nanostructured silicon based negative electrode compositions are disclosed in the '694 application, the '228 patent, as well as U.S. Pat. No. 9,139,441 to Anguchamy et al. (the '441 patent), entitled: "Porous Silicon Based Anode Material Formed Using Metal Reduction," incorporated herein by reference. Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in the '441 patent referenced above.

With respect to the composite materials, nanostructured silicon components can be combined with, for example, carbon nanoparticles and/or carbon nanofibers within an intimate composite material. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon.

Silicon oxide based compositions have been formed into composite materials with high capacities and very good cycling properties as described in the '228 patent referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials.

In general, a range of composites can be used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. The component structure may or may not correspond with the structure of the components within the composite material. Thus, the general compositions of the composites can be represented as $\alpha SiO-\beta Gr-\chi HC-\delta M-\varepsilon CNF-\phi Si$, where $\alpha$, $\beta$, $\chi$, $\delta$, $\varepsilon$, and $\phi$ are relative weights that can be selected such that $\alpha+\beta+\chi+\delta+\varepsilon+\phi=1$. Generally $0.35<\alpha<1$, $0\leq\beta<0.6$, $0\leq\chi<0.65$, $0\leq\delta<0.65$, $0\leq\varepsilon<0.65$, and $0\leq\phi<0.65$. Certain subsets of these composite ranges are of particular interest. In some embodiments, composites with SiO and one or more carbon based components are desirable, which can be represented by a formula $\alpha SiO-\beta Gr-\chi HC-\varepsilon CNF$, where $0.35<\alpha<0.9$, $0\leq\beta<0.6$, $0\leq\chi<0.65$ and $0\leq\varepsilon<0.65$ ($\delta=0$ and $\phi=0$), in further embodiments $0.35<\alpha<0.8$, $0.1\leq\beta<0.6$, $0.0\leq\chi<0.55$ and $0\leq\varepsilon<0.55$, in some embodiments $0.35<\alpha<0.8$, $0\leq\beta<0.45$, $0.0\leq\chi<0.55$ and $0.1\leq\varepsilon<0.65$, and in additional embodiments $0.35<\alpha<0.8$, $0\leq\beta<0.55$, $0.1\leq\chi<0.65$ and $0\leq\varepsilon<0.55$. In additional or alternative embodiments, composites with SiO, inert metal powders and optionally one or more conductive carbon components can be formed that can be represented by the formula $\alpha SiO-\beta Gr-\chi HC-\delta M-\varepsilon CNF$, where $0.35<\alpha<1$, $0\leq\beta<0.55$, $0\leq\chi<0.55$, $0.1\leq\delta<0.65$, and $0\leq\varepsilon<0.55$. In further additional or alternative embodiments, composites of SiO with elemental silicon and optionally one or more conductive carbon components can be formed that can be represented by the formula $\alpha SiO-\beta Gr-\chi HC-\varepsilon CNF-\phi Si$, where $0.35<\alpha<1$, $0\leq\beta<0.55$, $0\leq\chi<0.55$, $0\leq\varepsilon<0.55$, and $0.1\leq\phi<0.65$ and in further embodiments $0.35<\alpha<1$, $0\leq\beta<0.45$, $0.1\leq\chi<0.55$, $0\leq\varepsilon<0.45$, and $0.1\leq\phi<0.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

Solution based approaches for the synthesis of various Si—SiO$_x$—C-M (M=metal) composites are described in published U.S. patent application 2014/0308585 to Han et al., entitled "Silicon-Based Active Materials for Lithium Ion Batteries and Synthesis With Solution Processing," incorporated herein by reference. Silicon-based carbon composites with graphene sheets are described in published U.S. patent application 2014/0370387 to Anguchamy et al., entitled "Silicon-Silicon Oxide-Carbon Composites For Lithium Battery Electrodes and Methods for Forming the Composites," incorporated herein by reference. Commercial materials that are believed to comprise a $SiO_x$—Si—C or $SiO_x$—Si composite are used in the batteries in the Examples.

The capacity of the anode significantly influences the energy density of the battery. A higher specific capacity of the anode material results in a lower weight of the anode in the cell for the same output. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

Positive Electrodes

Various positive electrode chemistries can be introduced effectively with the improved negative electrodes described above. The selected compositions can be blended into positive electrode along with a suitable binder and electrically conductive materials. This section focuses on particularly desirable positive electrode active materials for high voltage cycling and moderately high capacity. Also, this section describes the overall electrode composition and properties.

To some degree, the desired application of the final cells can influence the selection of the positive electrode composition. From this perspective, a broad range of compositions are described in the following. For automotive use and for similar applications, a particular positive electrode chemistry has found to be desirable with respect to achieving high energy density along with cycling to over 600 cycles while maintaining at least 80% capacity, although some materials provide promising results with somewhat lesser cycling stability. Specifically, nickel-rich lithium nickel manganese cobalt oxides are found to provide the very long cycling performance herein based on the improved electrolytes described herein. In alternative embodiments, a blend of nickel-rich lithium nickel manganese cobalt oxide and (lithium+manganese) rich-lithium nickel manganese cobalt oxide are blended to provide reasonable positive electrode performance. Furthermore, the nickel rich lithium nickel manganese cobalt oxides alone as the active material can provide desirably high energy densities due to the average discharge voltage with good cycling when paired with the silicon based negative electrodes described herein. Examples are presented below for a nickel rich lithium nickel manganese cobalt oxides alone.

Nickel-rich lithium nickel manganese cobalt oxides (N-NMC) can provide desirable cycling and capacity properties for the lithium ion batteries described herein. In particular, the nickel-rich compositions can be approximately represented by the formula $LiNi_xMn_y Co_zO_2$, x+y+z≈1, 0.45≤x, 0.025≤y, z≤0.35, in further embodiments, 0.50≤x, 0.03≤y, z≤0.325, and in 0.55≤, 0.04≤y, z≤0.3. In some embodiments, y and z are approximately equal. The amount of nickel can influence the selected charge voltage to balance cycling stability and discharge energy density. For values of x in the range of 0.525≤x≤0.7 a selected charge voltage can be from 4.25V to 4.375V. For values of x in the range of 0.7≤x≤0.9, the selected charge voltage can be from 4.05V to 4.325V. A person of ordinary skill in the art will recognize that additional ranges of composition and selected charge voltages within the explicit ranges above are contemplated and are within the present disclosure. These composition have been found to provide relatively stable higher voltage cycling, good capacities and desirable impedance. N-NMC powders can be synthesized using techniques, such as coprecipitation, and these are available commercially, such as from BASF Corp. (Germany), TODA Corp. (Japan), L&F Materials Corp. (Korea), Umicore N.V. (Belgium), and Ningbo Jinhe New Materials Co., Ltd. (China). Commercially available formulations of these compounds include, for example, $LiNi_{0.5}Mn_{0.3} Co_{0.2}O_2$ (BASF), $LiNi_{0.6}Mn_{0.2} Co_{0.2}O_2$ (L&F, Korea and Umicore, Belgium), $LiNi_{0.8}Mn_{0.1} Co_{0.1}O_2$ (L&F, Korea, BASF, Germany, Umicore, Belgium and LG Chemical, Korea).

For the N-NMC compositions, the average voltage trends slightly larger with increasing amounts of nickel, but the charge voltage for stable cycling trends slightly lower with increasing nickel. Thus, there can be tradeoffs with active material selection, although the N-NMC active materials can provide good cycling and reasonably high capacity and energy density.

As noted above, desirable blends can comprise N-NMC with (lithium rich+manganese rich) lithium nickel manganese cobalt oxides (LM-NMC or HCMR™). With respect to the active material blends for a positive electrode, the active materials can comprise from about 3 wt % to about 85 wt % LM-NMC. These compositions can be approximately represented by the formula $Li_{1+b}Ni_\alpha Mn_\beta Co_\gamma A_\delta O_{2-z}F_z$, where b+α+β+γ+δ1, b ranges from about 0.04 to about 0.3, α ranges from 0 to about 0.4, β range from about 0.2 to about 0.65, γ ranges from 0 to about 0.46, δ ranges from about 0 to about 0.15 and z ranges from 0 to 0.2, with the proviso that both α and γ are not 0, and where A is a metal different from lithium, manganese, nickel and cobalt. In some embodiments, A can be Mg, Sr, Ba, Cd, Zn, Al, Ga, B, Zr, Ti, Ca, Ce, Y, Nb, Cr, Fe, V, or combinations thereof. Also, in additional or alternative embodiments, $Li_{1+b}Ni_\alpha Mn_\beta Co_\gamma A_\delta O_2$ with 0.05≤b≤0.125, 0.225≤α≤0.35, 0.35≤β≤0.45, 0.15≤γ≤0.3, 0≤δ≤0.05 and up to five mole percent of the oxygen can be replaced with a fluorine dopant. A person of ordinary skill in the art will recognize that additional ranges of composition within the explicit ranges above are contemplated and are within the present disclosure. Long cycle stability has been achieved for (lithium+manganese) rich-NMC active materials at relatively high cycling voltages, as described in U.S. Pat. No. 8,928,286 to Amiruddin et al., entitled "Very Long Cycling of Lithium Batteries With Lithium Rich Cathode Materials," incorporated herein by reference.

It is found that for LM-NMC positive electrode active materials a coating on the material can improve the performance of corresponding cells. Suitable coating materials, which are generally believed to be electrochemically inert during battery cycling, can comprise metal fluorides, metal oxides, or metal non-fluoride halides. Improved metal fluoride coatings with appropriately engineered thicknesses are described in U.S. Pat. No. 9,843,041 to Lopez et al, entitled "Coated Positive Electrode Materials for Lithium Ion Batteries," incorporated herein by reference.

The positive electrode active materials can comprise other materials, such as lithium cobalt oxide, $LiNi_{0.33}Mn_{0.33} Co_{0.33}O_2$ (NMC111), $LiNi_{0.8} Co_{0.15}Al_{0.05}O_2$ (NCA), lithium manganese oxide ($LiMn_2O_4$), lithium metal phosphate, such as lithium iron phosphate ($LiFePO_4$), mixtures thereof, or the like. A person of ordinary skill in the art will recognize that additional ranges of composition blends within the explicit ranges above are contemplated and are within the present disclosure.

As noted above, the positive electrode generally comprises active material, with an electrically conductive material within a binder. The active material loading in the electrode can be large. In some embodiments, the positive electrode comprises from about 85 wt % to about 99 wt % of positive electrode active material, in other embodiments from about 90 wt % to about 98 wt % of the positive electrode active material, and in further embodiments from about 95 wt % to about 97.5 wt % of the positive electrode active material. In some embodiments, the positive electrode has from about 0.75 wt % to about 10 wt % polymeric binder, in other embodiments from about 0.8 wt % to about 7.5 wt % polymeric binder, and in further embodiments from about 0.9 wt % to about 5 wt % polymeric binder.

The positive electrode composition generally can also comprise an electrically conductive additive distinct from the electroactive composition. In some embodiments, the positive electrode can have 0.4 wt % to about 12 wt % conductive additive, in further embodiments from about 0.45 wt % to about 7 wt %, and in other embodiments from about 0.5 wt % to about 5 wt % conductive additive. A person of ordinary skill in the art will recognize that additional ranges of particles loadings within the explicit ranges about are contemplated and are within the present disclosure. The positive electrode active materials are described above. Suitable polymer binders for the positive electrode include, for example, PVDF, polyethylene oxide, polyimide, polyethylene, polypropylene, polytetrafluoroethylene, polyacrylates, rubbers, e.g. ethylene-propylene-diene monomer (EPDM) rubber or SBR, copolymers thereof, or mixtures thereof. For the positive electrode, PVDF can be used with good results, and the positive electrodes in the examples use a pvdf binder. Electrically conductive additives are described in detail for the negative electrode, and nanoscale conductive carbon can be used effectively for the positive electrode.

For a particular loading level, the electrode density (of active material) is inversely correlated with thickness so that an electrode with a greater density is thinner than an electrode with a lower density. Loading is equal to the density times the thickness. In some embodiments, the positive electrode of the battery has a loading level of positive electrode active material that is from about 10 mg/cm² to about 40 mg/cm², in other embodiments from about 12 mg/cm² to about 37.5 mg/cm², in additional embodiments from about 13 mg/cm² to about 35 mg/cm², and in other embodiments from 20 mg/cm² to about 32.5 mg/cm² In some embodiments, the positive electrode of the battery has an active material density in some embodiment from about 2.5 g/cc to about 4.6 g/cc, in other embodiment from about 3.0 g/cc to 4.4 g/cc, and in additional embodiment from about 3.25 g/cc to about 4.3 g/cc. In further embodiments, the positive electrodes can have a thickness on each side of the current collector following compression and drying of the positive electrode material from about 45 microns to about 300 microns, in some embodiments from about 80 microns to about 275 microns and in additional embodiments from about 90 microns to about 250 microns. A person of ordinary skill in the art will recognize that additional ranges of active material loading level, electrode thickness and electrode densities within the explicit ranges above are contemplated and are within the present disclosure.

Supplemental Lithium

The improved high energy battery designs described herein generally comprise supplemental lithium, and this section is directed to approaches for the incorporation of supplemental lithium for appropriate embodiments. In general, the inclusion of supplemental lithium is desirable for cells with silicon-based negative electrode active materials since the material may exhibit relatively high irreversible capacity loss during the initial charge of the battery. Also, supplemental lithium surprisingly also stabilizes cycling of LM-NMC. Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling. Generally, the positive electrodes are provided with extractable lithium, and initiation or formation of the cell involves an initial charge to extract the lithium from the positive electrode, which is generally greater than or equal the cycling capacity. Supplemental lithium can be considered supplemental to the initial lithium provided in the positive electrode active material.

Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. If the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source in addition to other electrode components.

In some embodiments, at least a portion of the supplemental lithium is initially associated with the negative electrode. For example, the supplemental lithium can be in the form of elemental lithium, a lithium alloy or other lithium source that is more electronegative than the negative electrode active material. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. After the negative electrode is in contact with electrolyte, a reaction can take place, and the supplemental lithium is transferred to the negative electrode active material. Since the electrode is electrically conductive internally, the circuit does not need to be closed to provide for electron flow resulting from the reactions. During this process, the solid electrolyte interface (SEI) layer may also be formed. Thus, the supplemental lithium is loaded into the negative electrode active material with at least a portion generally consumed in formation of the SEI layer. Supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material placed on the surface of the active layer. In an alternative configuration, a supplemental lithium source layer is between the active layer and current collector. Also, in some embodiments, the negative electrode can comprise supplemental lithium source layers on both surfaces of the active layer.

An arrangement to perform electrochemical preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In some embodiments, a lithium source within an electrode can be assembled into a cell with the electrode to be preloaded with lithium. A separator can be placed between the respective electrodes. Current can be allowed to flow between the electrodes to provide for controlled electrochemical prelithiation.

In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously. Commercial SiO—Si—C composite compositions are presently commercially available such as from Shin-Etsu Chemical Company, Japan, KSC-series products. The various approaches for incorporating supplemental lithium into a cell is described in U.S. Pat. No. 9,166,222 to Amiruddin et al., entitled "Lithium Ion Batteries With Supplemental Lithium," incorporated herein by reference.

In general, for embodiments in which supplemental lithium is used, the amount of supplemental lithium preloaded or available to load into the active composition can be in an amount of at least about 2.5% of capacity, in further embodiments from about 3% to about 55% of capacity, in additional embodiments from about 5% to about 52.5% of capacity, and in some embodiments from about 5% to about 50% of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 60% to 180% of the first cycle IRCL of the negative electrode, in further embodiments, it is from 80% to 165%, and in other embodiments from 90% to 155%. A person of ordinary skill in the art will recognize that additional ranges of percentage within the explicit ranges above are contemplated and are within the present disclosure. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. A person of ordinary skill in the art will recognize that additional ranges of IRCL within the explicit ranges above are contemplated and are within the present disclosure.

Balance of Cathode and Anode

The overall performance of the battery has been found to depend on the capacities of both the negative electrode and positive electrode and their relative balance. Balance of the electrodes has been found to be significant with respect to achieving a particularly high energy density for the battery as well as to achieve good cycling properties. In some embodiments, there may be a tradeoff with respect to achieving longer cycling stability and energy density. To achieve longer cycling stability, it can be desirable to balance the battery to achieve a relatively lower energy density, but with a battery suitable for stable long term use under a broader range of operating parameters. With appropriately selected active materials, desirable electrode designs and improved electrolyte formulations, high energy densities are still achievable while obtaining cycling to more than 800 cycles with no more than 80% capacity drop. The electrode balance can be evaluated in several alternative ways, which can work effectively when properly accounting for the particular evaluation approach.

Testing of active materials can be performed in lithium cells with a lithium metal electrode, and such cells are generally referred to as half-cells, in contrast with lithium ion cells with both electrodes comprising a lithium alloying or intercalation material (referred to as full cells). In a half cell with a silicon based electrode, the lithium electrode acts as the negative electrode, and the silicon based electrode acts as the positive electrode, which is opposite of its usual role as the negative electrode in a lithium ion cell.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to a voltage selected based on the material chemistry and the selected charge voltage of the cell design (generally from 4.2V to 4.5V) and intercalated or inserted back into the positive electrode to 2V at a rate of C/20, with a slight adjustment, e.g. generally 0.1V, to a higher charge voltage against the lithium metal based on the voltage of the ultimate anode relative to lithium metal. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20. In actual use, the observed capacities can change from the tested capacities due to various factors, such as high rate operation and alteration of voltage range, which can be due to battery design as well as due to composition of the counter electrode not being lithium metal. For some evaluation approaches, a subsequent capacity after the first cycle can be used to evaluate electrode balance, and if desired a greater discharge rate can be used, such as C/3 or C/10. The use of the balance after a formation cycle or a few formation cycles can be desirable in that the balance is based more on conditions during use of the battery.

In most commercially available carbon based batteries, approximately 7-10% excess anode is taken over the cathode to prevent lithium plating. One important concern of too much excess anode is that the weight of the cell will increase reducing the energy density of the cell. Compared to graphite which has a first cycle IRCL of ~7%, high capacity silicon based anodes can have IRCL ranging from about 10% to about 40%. A significant portion of the capacity may become inactive in the cell after the first charge-discharge cycle and add to significant dead weight to the battery.

For high capacity anode materials, the negative electrode irreversible capacity loss generally is greater than the positive electrode irreversible capacity loss, which generates additional lithium availability for the cell. If the negative electrode has a significantly higher irreversible capacity loss than the positive electrode, the initial charge of the negative electrode irreversibly consumes lithium so that upon subsequent discharge, the negative electrode cannot supply enough lithium to provide the positive electrode with sufficient lithium to satisfy the full lithium accepting capacity of the positive electrode. This results in a waste of positive electrode capacity, which correspondingly adds weight that does not contribute to cycling. Most or all of the lithium loss from the net IRCL (negative electrode IRCL minus positive electrode IRCL) can be compensated by supplemental lithium as described above. Evaluation of electrode balance during the 1st formation cycle may or may not account for supplemental lithium. In subsequent cycles after the formation cycle or a few cycles, any excess supplemental lithium not consumed for the IRCL is generally alloyed into the anode material. The electrode balance can be evaluated at a cycling stage after formation, such as the 4th cycle at a selected rate used for that cycle, and these capacities can be estimated from the electrode performances.

As noted above, supplemental lithium can be introduced in various ways. If supplemental lithium is introduced to the negative electrode active material prior to assembly of the cell, the negative electrode can exhibit considerably reduced irreversible capacity loss relative to other approaches for introduction of supplemental lithium. While not wanting to be limited by theory, the changes to the material associated with an irreversible capacity loss can take place during the pre-lithiation process performed prior to the cell assembly. With a reduction in irreversible capacity loss, electrode balance (positive electrode capacity vs. negative electrode capacity) has less of an initial imbalance from the IRCL to adjust. A similar way to consider this situation is that the negative electrode capacity is already adjusted to account for supplemental lithium so that the measured capacity of the negative electrode can be considered as a hypothetical full capacity minus the supplemental lithium delivered to the negative electrode active material. For these embodiments, it can still be effective to consider the 4th cycle capacity for evaluating balance, but the 4th cycle capacity can be more similar to the 1st cycle capacity.

From the perspective of providing stable longer term cycling performance, it can be desirable to balance the electrodes to provide for effective use of both electrode capacities as well as avoiding the plating of lithium metal during cycling. In general, the balance of the electrodes is considered at the time of assembly of the electrodes referencing the initial capacities of the electrodes relative to lithium metal.

In general, battery life can be selected to end when the energy output drops by roughly 20% from the initial capacity at a constant discharge rate, although other values can be selected as desired. For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity evaluated at a rate of C/20 from an open circuit voltage to 1.5V against lithium is about 110% to about 195%, in further embodiment from about 120% to about 185% and in additional embodiments from about 130% to about 190% relative to the sum of the initial positive electrode charge capacity at a rate of C/20 from an open circuit voltage to the charge voltage of the cell design (generally from 4.2V to 4.6V) plus the oxidation capacity of any supplemental lithium. Alternatively, the electrode balance can be evaluated at the fourth cycle at a discharge rate of C/10 or C/3 with the negative electrode capacity relative to positive electrode capacity from about 110% to about 195%, in further embodiment from about 120% to about 185% and in additional embodiments from about 130% to about 190%. A person of ordinary skill in the art will recognize that additional ranges of balance within the explicit ranges above are contemplated and are within the present disclosure. Such a balance is described in the battery designs described below.

Cell Performance Properties

The combination of design features described herein can provide longer cycling stability while maintaining desired high power cell performance. In particular applications, it can be significant to maintain the power capability later in the cell life prior to charging. In other words, the cell should have high rate capability and high capacity, while maintaining cycle life to be a practical solution. The achievement of the long term high power cycling involves use of the improved electrolytes described above along with the balance of cell design parameters, especially for the negative electrode.

The selected charge voltage can be influenced by the positive electrode active material. Generally, the selected charge voltage for these cells is from about 4.05V to 4.4V. As noted above, a selected charge voltage is generally based on the cathode active materials since the anode is designed to have a low voltage against elemental lithium over the relevant voltage range. The cells can exhibit very good cycling performance with high power generation, which involves a high discharge rate. In some embodiments, the cells can exhibit a discharge capacity at cycle 700 of at least about 75% of the 6th cycle capacity discharged at 1 C rate or a 4 C rate from the selected charge voltage to 2.5V at room temperature, in other embodiments at least about 80% and in additional embodiments at least about 82% at the 700th cycle relative to the 6th cycle discharge capacity when cycled from the selected charge voltage to 2.5V at 1 C charge rate at room temperature. Similarly, the batteries can exhibit a discharge capacity at cycle 825 of at least about 75% of the 6th cycle capacity discharged at 1 C rate from the selected charge voltage to 2.5V at room temperature, in other embodiments at least about 80% and in additional embodiments at least about 82.5% at the 825th cycle relative to the 6th cycle discharge capacity when cycled from the selected charge voltage to 2.5V at a rate of 1 C rate at room temperature. A person of ordinary skill in the art will recognize that additional ranges within the explicit ranges above are contemplated and are within the present disclosure.

Further Inventive Concepts

1. The lithium ion cell comprising:
   a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to ab1out 100% silicon-based active material, and from 0 wt % to about 55 wt % graphitic carbon;
   a positive electrode comprising a lithium metal oxide, conductive carbon, and a polymer binder;
   a separator between the negative electrode and the positive electrode;
   electrolyte comprising from about 1.0M to about 2.5M lithium salt and non-aqueous solvent, wherein the lithium salt comprises from about 60 mole percent to about 100 mole percent LiTFSI, and wherein the nonaqueous solvent comprises from about 5 vol % to about 25 vol % fluoroethylene carbonate; and a container enclosing the negative electrode, the positive electrode, the separator and the electrolyte;

wherein the cell has a room temperature discharge specific capacity at a rate of 4 C of at least about 120 mAh/g between 2.5V and a selected charge voltage based on the weight of the cathode active material and wherein the lithium ion cell having a capacity at the 700th cycle of at least about 80% of the capacity at the 7th cycle when cycled at room temperature from the 7th cycle to the 700th cycle between 2.5V and the selected charge voltage at a rate of 4 C and wherein the container is a pouch.

2. The lithium ion cell of inventive concept 1 wherein the container is a canister and the negative and positive electrodes are rolled into a cylindrical or prismatic shape.

3. The lithium ion cell of inventive concept 1 wherein the non-aqueous solvent comprises from about 50 vol % to about 90 vol % dimethyl carbonate, ethylmethyl carbonate or a mixture thereof, and no more than about 35 vol % optional cosolvents selected from the group consisting of propylene carbonate, ethyl acetate, methyl acetate, propyl acetate, and mixtures thereof.

4. The lithium ion cell of inventive concept 1 wherein the silicon-based active material comprises a silicon-silicon oxide carbon composite material.

5. The lithium ion cell of inventive concept 1 wherein the graphitic carbon has a BET surface area from about 1 $m^2/g$ to about 20 $m^2/g$.

6. The lithium ion cell of inventive concept 1 wherein the polymer binder of the negative electrode comprises a blend of polyimide and a water based polymer binder.

7. The lithium ion cell of inventive concept 1 wherein the polymer binder of the negative electrode comprises a blend of at least about 50 wt % polyimide and a second polymer binder selected from the group consisting of polyvinylidene fluoride, cellulose, styrene-butadiene rubber, lithiated polyacrylic acid, copolymers thereof and mixtures thereof, wherein the polyimide has an elongation of at least about 40% and the second polymer binder has an elasticity greater than that of the polyimide.

8. The lithium ion cell of inventive concept 1 wherein the polymer binder of the negative electrode comprises a water soluble binder.

9. The lithium ion cell of inventive concept 8 wherein the water soluble binder comprises poly (acrylamide-co-acrylate salt) having at least about 5 mole percent of the acrylate salt moiety and at least about 5 mole percent of the acrylamide moiety.

10. The lithium ion cell of inventive concept 8 wherein the water soluble binder comprises metal-poly acrylic acid/acrylate (M-PAA) moieties form corresponding monomers, where M is a cation of lithium, sodium, potassium or a mixture thereof.

11. The lithium ion cell of inventive concept 1 wherein the lithium metal oxide comprises a lithium nickel cobalt manganese oxide approximately represented by the formula $LiNi_xMn_yCo_zO_2$, where $0.45 \leq x$, $0.05 \leq y$, $z \leq 0.35$, $x+y+z \approx 1$.

12. The lithium ion cell of inventive concept 1 further comprising supplemental lithium in an amount from about 80% to about 180% of the negative electrode first cycle irreversible capacity loss, the lithium ion cell having a ratio at the fourth cycle at a discharge rate of C/3 of negative electrode capacity divided by the positive electrode capacity from about 1.10 to about 1.95.

13. The lithium ion cell of inventive concept 1 wherein the negative electrode active material comprises from about 60 wt % to about 95 wt % silicon-oxide based material and from about 5 wt % to about 40 wt % graphite.

14. The lithium ion cell of inventive concept 1 wherein the solvent consists essentially of from about 60 vol % to about 85 vol % ethylmethyl carbonate and from about 10 vol % to about 20 vol % fluoroethylene carbonate and no more than 25 vol % optional cosolvent selected from the group consisting of propylene carbonate, ethyl acetate, methyl acetate, propyl acetate, and mixtures thereof.

15. The lithium ion cell of inventive concept 14 wherein the lithium salt consists essentially of from about 0.3M to about 0.6M $LiPF_6$ and from about 0.8M to about 1.4M LiTFSI and no more than about 5 mole percent optional other lithium salts.

16. The lithium ion cell of inventive concept 14 wherein the electrolyte consists essentially of: lithium salt, solvent, no more than about 10 weight percent (wt %) optional additive selected from the group consisting of triethyl phosphate (TEP), ethoxy (pentafluoro) cyclotriphosphazene (PFPN), 1,3-propane sultone (PS), and mixtures thereof; and no more than about 5 wt % additional cosolvents and/or lithium-free organic additives.

17. A lithium ion cell comprising: a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 to about 55 wt % graphitic carbon; a positive electrode comprising a lithium metal oxide, conductive carbon, and a polymer binder; a separator between the negative electrode and the positive electrode; electrolyte comprising from about 1.1M to about 2.2M lithium salt and non-aqueous solvent, wherein the lithium salt comprises from about 90 mole percent to about 100 mole percent $LiPF_6$, and wherein the non-aqueous solvent comprises from about 5 vol % to about 25 vol % fluoroethylene carbonate, 50 vol % to 80 vol % dimethyl carbonate, ethylmethyl carbonate or a mixture thereof, from about 5 vol % to about 15 vol % propylene carbonate and from about 5 vol % to about 20 vol % methyl acetate, ethyl acetate, propyl acetate, or mixtures thereof; and a container enclosing the negative electrode, the positive electrode, the separator and the electrolyte; wherein the cell has a room temperature discharge specific capacity at a rate of 4 C of at least about 120 mAh/g between 2.5V and a selected charge voltage based on the weight of the cathode active material and wherein the lithium ion cell having a capacity at the 650th cycle of at least about 80% of the capacity at the 7th cycle when cycled at room temperature from the 7th cycle to the 650th cycle between 2.5V and the selected charge voltage at a rate of 1 C.

18. The lithium ion cell of inventive concept 17 wherein the non-aqueous solvent comprises from about 50 vol % to about 90 vol % dimethyl carbonate, ethylmethyl carbonate or a mixture thereof, and no more than about 35 vol % optional cosolvents selected from the group consisting of propylene carbonate, ethyl acetate, methyl acetate, propyl acetate, and mixtures thereof.

19. The lithium ion cell of inventive concept 17 wherein the silicon-based active material comprises a silicon-silicon oxide carbon composite material.

20. The lithium ion cell of inventive concept 17 wherein the graphitic carbon has a BET surface area from about 1 $m^2/g$ to about 20 $m^2/g$.

21. The lithium ion cell of inventive concept 17 wherein the polymer binder of the negative electrode comprises a blend of polyimide and a water based polymer binder.

22. The lithium ion cell of inventive concept 17 wherein the polymer binder of the negative electrode comprises a blend of at least about 50 wt % polyimide and a second polymer binder selected from the group consisting of polyvinylidene fluoride, cellulose, styrene-butadiene rubber, lithiated polyacrylic acid, copolymers thereof and mixtures thereof, wherein the polyimide has an elongation of at least about 40% and the second polymer binder has an elasticity greater than that of the polyimide.

23. The lithium ion cell of inventive concept 17 wherein the polymer binder of the negative electrode comprises a water soluble binder.

24. The lithium ion cell of inventive concept 23 wherein the water soluble binder comprises poly (acrylamide-co-acrylate salt) having at least about 5 mole percent of the acrylate salt moiety and at least about 5 mole percent of the acrylamide moiety.

25. The lithium ion cell of inventive concept 23 wherein the water soluble binder comprises metal-poly acrylic acid/acrylate (M-PAA) moieties form corresponding monomers, where M is a cation of lithium, sodium, potassium or a mixture thereof.

26. The lithium ion cell of inventive concept 17 wherein the lithium metal oxide comprises a lithium nickel cobalt manganese oxide approximately represented by the formula $LiNi_xMn_yCo_zO_2$, where $0.45 \leq x$, $0.05 \leq y$, $z \leq 0.35$, $x+y+z \approx 1$.

27. The lithium ion cell of inventive concept 17 further comprising supplemental lithium in an amount from about 80% to about 180% of the negative electrode first cycle irreversible capacity loss, the lithium ion cell having a ratio at the fourth cycle at a discharge rate of C/3 of negative electrode capacity divided by the positive electrode capacity from about 1.10 to about 1.95.

28. The lithium ion cell of inventive concept 17 wherein the negative electrode active material comprises from about 60 wt % to about 95 wt % silicon-oxide based material and from about 5 wt % to about 40 wt % graphite.

29. The lithium ion cell of inventive concept 17 wherein the solvent consists essentially of from about 60 vol % to about 75 vol % ethylmethyl carbonate and from about 10 vol % to about 20 vol % fluoroethylene carbonate.

30. The lithium ion cell of inventive concept 29 wherein the electrolyte consists essentially of: lithium salt, solvent, no more than about 10 weight percent (wt %) optional additive selected from the consisting of triethyl phosphate group (TEP), ethoxy (pentafluoro) cyclotriphosphazene (PFPN), 1,3-propane sultone (PS), and mixtures thereof; and no more than about 5 wt % additional cosolvents and/or lithium-free organic additives.

EXAMPLES

General Methods and Materials.

General methods and materials are described in the '925 patent cited above. The electrolyte formulations were tested through their incorporation into coin cells and pouch cells using NMC positive electrodes and negative electrodes incorporating a blend of silicon oxide based composites and graphite as the active materials. Specifically, the active materials for the positive electrodes were commercial lithium nickel manganese cobalt oxides having the formula $LiNi_{0.6}Mn_{0.2} Co_{0.2}O_2$ (NMC622) or $LiNi_{0.8}Mn_{0.1} Co_{0.1}O_2$ (NMC811). NMC811 is commercially available from different suppliers as a polycrystalline form or a single crystalline form, different examples are performed with each of these as the active material for the positive electrode. The negative electrode active material was a commercial SiO—Si—C(SiOx) composite, referred to as SOC, that was blended with electrochemically active graphite.

The positive electrodes had a loading of active material from about 93 wt % to 97.5 wt % blended with 1 wt % to 4 wt % PVDF binder, and 1 wt % to 3 wt % nanoscale carbon. The cathode material was blended with NMP solvent, spread onto an aluminum foil current collector, pressed, and dried.

To form the negative electrode with the silicon oxide based active material, the active material was formed, unless otherwise noted, by blending 65 wt % to 80 wt % of a powder of commercial silicon oxide/silicon/carbon composite material (referred to herein as $SiO_x/Si/C$) and the balance (20 wt % to 35 wt %) of electroactive graphite (KS 6 synthetic graphite, Imerys S.A.). The negative electrode active material was mixed thoroughly with from 1 wt % to 7 wt % of a nanoscale carbon electrically conductive additive to form a homogeneous powder mixture. The negative electrodes had 2-6 wt % carbon nanotubes as a conductive additive. The powder components of the electrode, active material and carbon nanotubes, were mixed to form a homogeneous powder mixture. The negative electrode had from 1-7 wt % lower elastic modulus binder and 7-15 wt % polyimide. The lower elastic modulus binder to polyimide weight ratios was 0.714.

To form the negative electrode, a blend of polymer binders, polyimide binder and lower elastic modulus binder, were mixed with NMP (Sigma-Aldrich) and stirred overnight to form a polymer binder-NMP solution. The homogenous powder mixture was then added to the polymer binder-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained from 2 to 20 wt % binder with the remainder of the electrode contributed by the powders. The negative electrodes were electrochemically pre-lithiated with sufficient lithium to compensate for 100% to 160% of the loss of lithium due to the anode irreversible capacity loss.

To form the coin cells, a section of negative electrode was cut to size along with separator, and a section of positive electrode was also cut to size. The negative electrode capacity at the 4th cycle was balanced at 105% to 150% of the positive electrode capacity at the fourth cycle. The separator for these cells was a Celgard® porous polymer membrane. The electrodes with the separator between them was placed in a coin cell enclosure. An electrolyte selected as described below was placed in the cell and the cell was sealed.

For some examples, pouch cells having a design similar to that shown in FIG. 1A-1D were prepared as follows. The prismatic shaped pouch cells had approximate dimensions, neglecting tabs, of 145 mm×64 mm×7.7 mm (thick). The electrodes were formed as described above, and a separator sheet was pleated with electrode plated placed within the separator folds. The separator for the pouch cells was a porous polymer composite sheet with a gel-forming polymer coating. Supplemental lithium was provided by applying lithium powder (SLMP®, Livent Corp.) to the negative electrode surface prior to assembly to roughly compensate for 100% to 160% of the IRCL of the silicon based negative electrode active material. The batteries were designed to have a total capacity of roughly 11 Ah at a discharge rate of C/3 at 30 degrees C.

Figure 2:
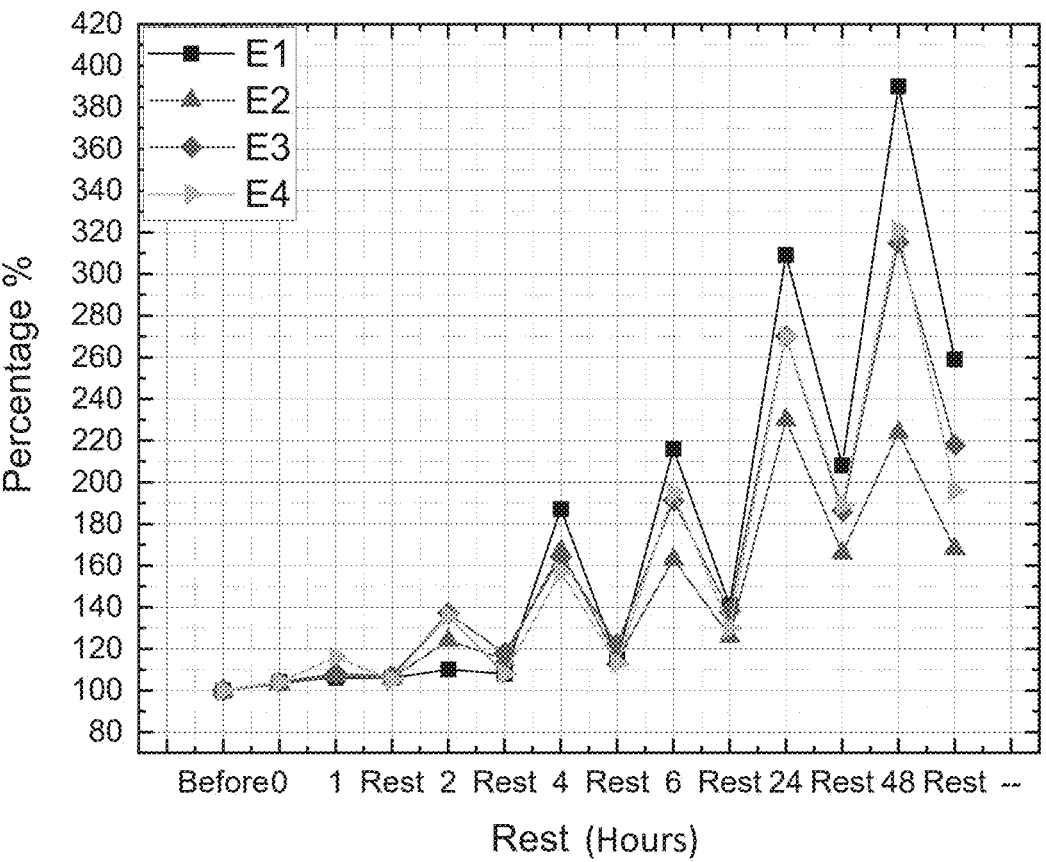
FIG. 2 is a plot showing gassing performance of electrolytes E1-E4 in pouch cells held at 65° C. The plot shows percent change in thickness of the pouch cells as a function of time. The electrode active materials were NMC622 for the positive active material and silicon oxide composite SOC for the negative active material

The electrolyte salts, solvents, co-solvents and additives used in the Examples are presented in Table 5. The subsequent examples evaluate the performance of the cells based on the selected electrolyte.

again, and the cells are returned to the oven for the next interval. As shown in FIG. 2, a pouch cell with E1 electrolyte exhibited larger less desirable changes in thickness over a 48 hour period, as compared to pouch cells comprising E2, E3 and E4 electrolytes.

Example 2—Cycling Performance at Different Rates for $LiPF_6$/LiTFSI Electrolytes with Various Solvents This example explores cycling performance with electrolytes having differing amounts of FEC along with various other solvent components.

Lithium ion batteries, when used in combination with electrolytes E2, E3, E4, may exhibit improved or comparable cycling as compared to batteries comprising known electrolytes with reduced gas generation. Coins cells with NMC622 positive electrode active material and SOC anode were prepared with each of the electrolytes E1-E4. Cycling

TABLE 5

| Electrolyte Code | Salt | | | Solvent | | | Additive | | | | Co-Solvent | | |
|---|---|---|---|---|---|---|---|---|---|---|---|---|---|
| | $LiPF_6$ (M) | LiFSI (M) | LiTFSI (M) | DMC (vol %) | EMC (vol %) | FEC (vol %) | TEP (wt %) | PFPN (wt %) | LPTB (wt %) | PS (wt %) | PC (vol %) | MA (vol %) | EA (vol %) |
| E1 | 1.2-1.8 | | | 70-95 | | 5-30 | | | | | | | |
| E2 | 0.3-0.6 | | 0.8-1.4 | | 50-80 | 10 | | | | | 5-15 | | 5-30 |
| E3 | 0.3-0.6 | | 0.8-1.4 | | 50-80 | 15 | | | | | 5-15 | 5-15 | |
| E4 | 0.3-0.6 | | 0.8-1.4 | | 50-80 | 20 | | | | | 5-15 | 5-15 | |
| E5 | 0.3-0.6 | | 0.8-1.4 | | 50-80 | 5-25 | | 0.5-5 | | | 5-15 | 5-15 | |
| E6 | 0.3-0.6 | | 0.8-1.4 | | 50-80 | 5-25 | 0.5-3 | | | | 5-15 | 5-15 | |
| E7 | 0.3-0.6 | | 0.8-1.4 | | 50-80 | 5-25 | 0.5-3 | 0.5-5 | | | 5-15 | 5-15 | |
| E8 | 0.3-0.6 | | 0.8-1.4 | | 50-80 | 5-25 | 0.5-3 | 0.5-5 | | | 5-15 | 5-15 | |
| E9 | 0.3-0.6 | | 0.8-1.4 | | 50-80 | 5-25 | | | 0.1-2 | | 5-15 | | 5-30 |
| E10 | 1.2-1.8 | | | | 60-90 | 5-25 | | | | | 5-15 | | |
| E11 | | 1.2-1.8 | | | 60-90 | 5-25 | | | | | 5-15 | | |
| E12 | | | 1.2-1.8 | | 60-90 | 5-25 | | | | | 5-15 | | |
| E13 | 0.4-0.7 | 0.8-1.3 | | | 60-90 | 5-25 | | | | | 5-15 | | |
| E14 | 0.5-1.2 | 0.5-1.2 | | | 60-90 | 5-25 | | | | | 5-15 | | |
| E15 | 0.4-0.7 | 0.8-1.3 | | | 60-90 | 5-25 | | | | | 5-15 | | |
| E21 | 1.2-1.8 | | | 10-30 | 20-50 | 5-25 | | | | | 5-15 | 20 | |
| E22 | 1.2-1.8 | | | | 50-80 | 5-25 | | | | | 5-15 | 20 | |
| E23 | 1.2-1.8 | | | | 50-80 | 5-25 | | | | | 5-15 | | 20 |
| E24 | 1.2-1.8 | | | | 50-85 | 5-25 | | | | | | | 10 |
| E25 | 1.2-1.8 | | | | 50-85 | 5-25 | | | | | | 10 | |
| E26 | 1.2-1.8 | | | 70-95 | | 5-30 | | | | 3 | | | |
| E27 | 1.2-1.8 | | | 70-95 | | 5-30 | | | | 6 | | | |
| E28 | 0.3-0.6 | | 0.8-1.4 | | 50-80 | 15 | | | | 1.5 | 5-15 | 5-15 | |
| E29 | 0.3-0.6 | | 0.8-1.4 | | 50-80 | 15 | | | | 3.0 | 5-15 | 5-15 | |
| E30 | 1.5 | | | 80 | | 20 | 6 | | | | 10 | | |
| E31 | 1.5 | | | | 70 | 20 | 6 | | | | 10 | | |
| E32 | 1.5 | | | | 70 | 20 | 6 | | | 3 | 10 | | |

Example 1—Gassing Performance of $LiPF_6$/LiTFSI Electrolytes with Various Solvents This example explores the gas emissions from cells produced with different electrolytes described herein.

Figure 3A:
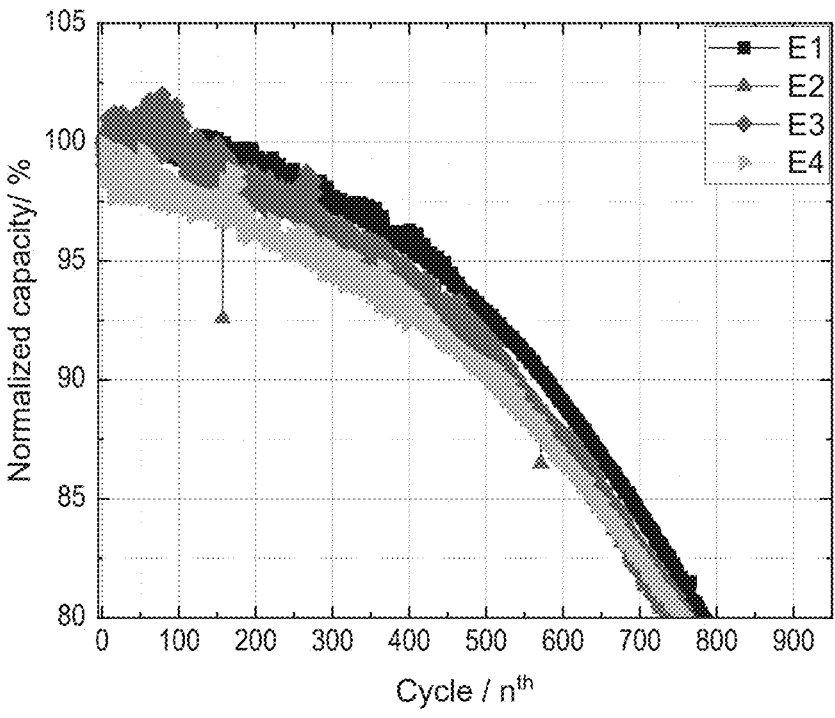
FIG. 3A is a plot of normalized capacity as a function of cycle number for coin cells prepared with electrolytes E1-E4. The coin cells were cycled with a 1 C charge/1 C discharge rate. The electrode active materials were NMC622 for the positive active material and silicon oxide composite SOC for the negative active material.
Figure 3B:
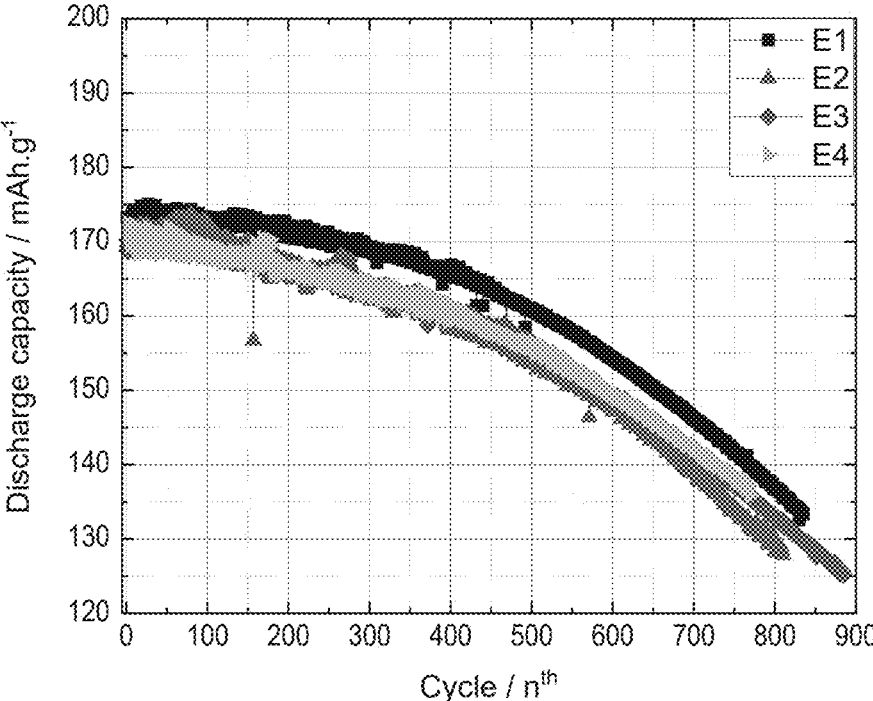
FIG. 3B is a plot of un-normalized specific discharge capacity, referenced relative to the weight of the positive electrode active material, for the data shown in FIG. 3A.

Lithium ion cells had the SOC anode and a positive electrode with NMC622 in combination with the E2-E9 electrolytes, may exhibit less gassing as compared to batteries comprising known electrolytes. FIG. 2 shows hours of storage at 65° C. versus percentage change in thickness for electrolytes E1-E4 used in conjunction with pouch cells having NMC622 cathode and SOC anode. The pouch cells filled with electrolyte are stored at 65° C. and thicknesses are measured at intervals over 48 hours. After each measurement from cells removed from the oven, the cells are allowed to rest at room temperature for 30 minutes. After cooling to room temperature, the thickness is measured performance of the coin cells under different conditions were measured and results are shown FIGS. 3A-3E. For cycling, two cycles were performed with C/10 rate, cycles 3 and 4 at a C/5 rate, cycles 4 and 5 at a C/3 rate, and then cycle 7 on were performed at the desired testing rate for longer cycling. Every 50 cycles, a cycle was performed at C/3 to verify cell performance. Unless indicated otherwise, this cycling format was used for other examples also. FIG. 3A is a plot of normalized capacity as a function of cycle number for coin cells cycled with 1 C charge/1 C discharge rates, from 4.3V to 2.5V. Electrolytes E2, E3, E4 exhibit similar cycling behavior as compared to E1. All of the cells achieved more than 700 cycles at 1 C/1 C charge and discharge rates prior to the capacity dropping below 80% of the seventh cycle capacity. FIG. 3B shows a plot of un-normalized specific discharge capacity for the data shown in FIG. 3A. As used herein, un-normalized specific discharge capacities are referenced relative to the weight of the positive electrode active material.

Figure 3C:
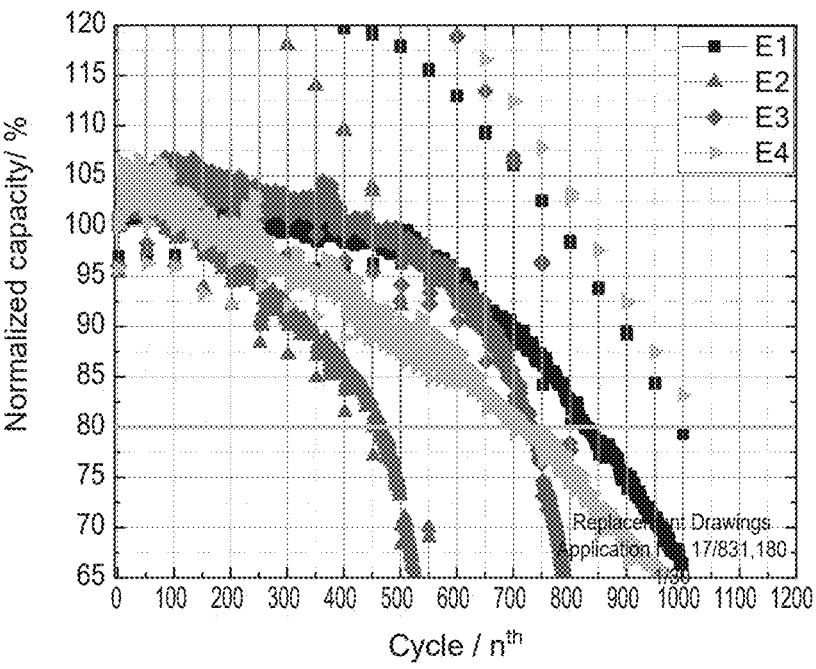
FIG. 3C is a plot of normalized capacity as a function of cycle number for the coin cells described in FIG. 3A, where cycling is carried out with a 4 C charge/1 C discharge rate.
Figure 3D:
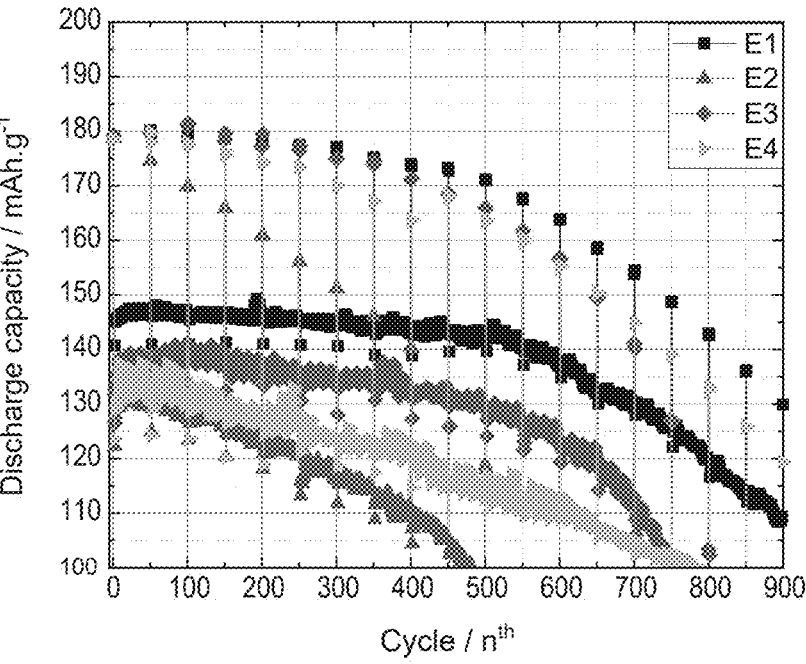
FIG. 3D is a plot of un-normalized specific discharge capacity, referenced relative to the weight of the positive electrode active material, for the data shown in FIG. 3C.

FIG. 3C is a plot of normalized capacity as a function of cycle number for the coin cells cycled with 4 C charge/1 C discharge rates. Every 50 cycles a 1 C charge/1 C discharge cycle was run to confirm cell performance. E3 and E4 electrolytes exhibit similar cycling behavior as compared to E1, but E2 is worse than E1. This suggests that slightly higher FEC concentrations are beneficial for high rate charging without sacrificing cycling performance. E1, E3 and E4 achieved at least 750 cycles before capacity dropped below 80% of the second cycle capacity. FIG. 3D shows a plot of un-normalized specific capacity for the data shown in FIG. 3C.

Figure 3E:
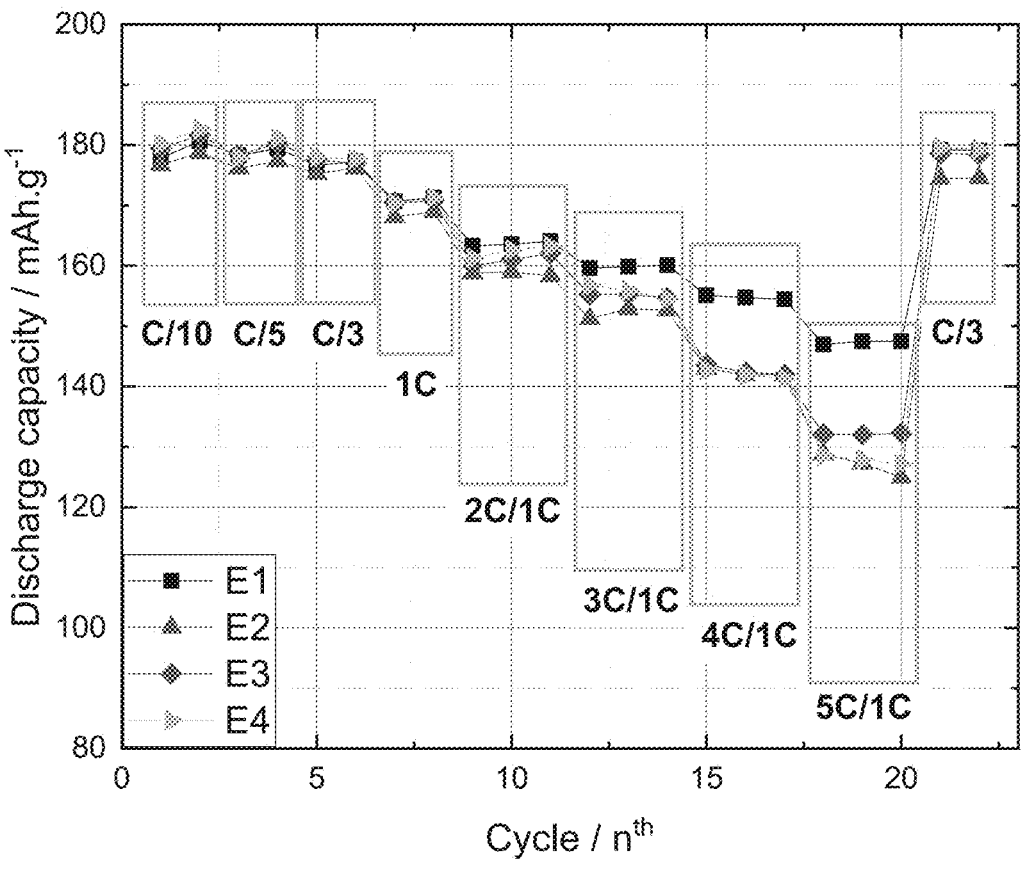
FIG. 3E is a plot of discharge capacity as a function of cycle number for the coin cells described in FIG. 3A, where cycling is carried out at various charge and discharge rates.

FIG. 3E is a plot of discharge capacity as a function of cycle number for the coin cells cycled at various discharge rates. The charge rate protocol employed in generating these data is shown in Table 6.

TABLE 6

| Test Protocol | |
| --- | --- |
| Step | Description |
| a) | 2 cycles for each of the following C-rates |
| | C/10 charge + C/10 discharge |
| | C/5 charge + C/5 discharge |
| | C/3 charge + C/3 discharge |
| | 1 C charge + 1 C discharge |
| b) | 3 cycles for each of the following C-rates |
| | 2 C charge + 1 C discharge |
| | 3 C charge + 1 C discharge |
| | 4 C charge + 1 C discharge |
| | 5 C charge + 1 C discharge |
| c) | 2 cycles |
| | C/3 charge + C/3 discharge |

Electrolytes E2, E3 and E4 exhibited lower rate capacity at rates greater than 2 C charge/1 C discharge rates, compared to E1 electrolyte. Lower rate capacities for E2, E3 and E4 may be due to the use of EMC compared to DMC in E1. Similar or higher ionic conductivity may be anticipated for E2, E3 and E4 compared to E1.

Figure 4A:
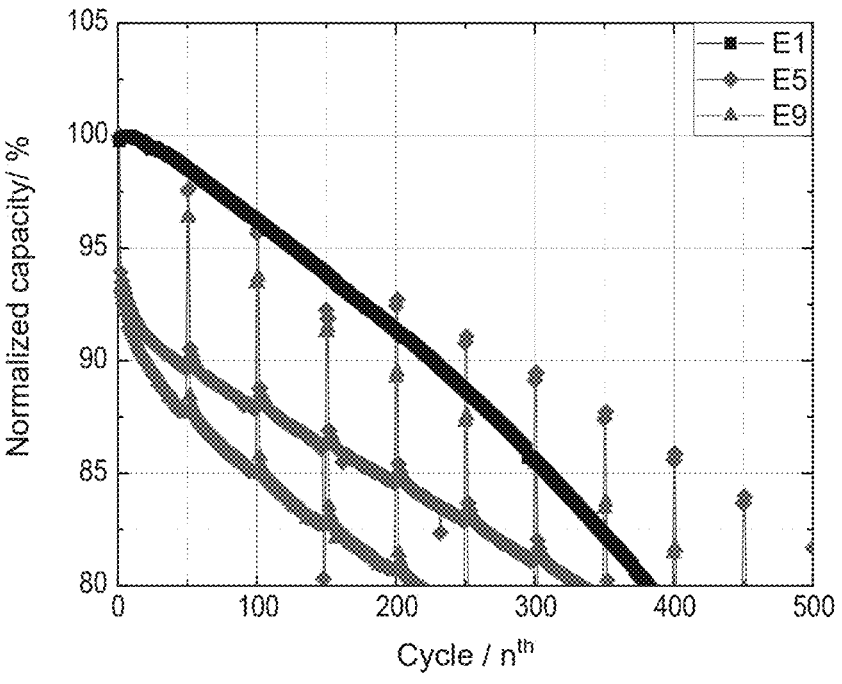
FIG. 4A is a plot of normalized capacity as a function of cycle number for coin cells prepared with electrolytes E1, E5 and E9. The coin cells were cycled with a 4 C charge/1 C discharge rate. The electrode active materials were NMC622 for the positive active material and SOC for the negative electrode active material.
Figure 4B:
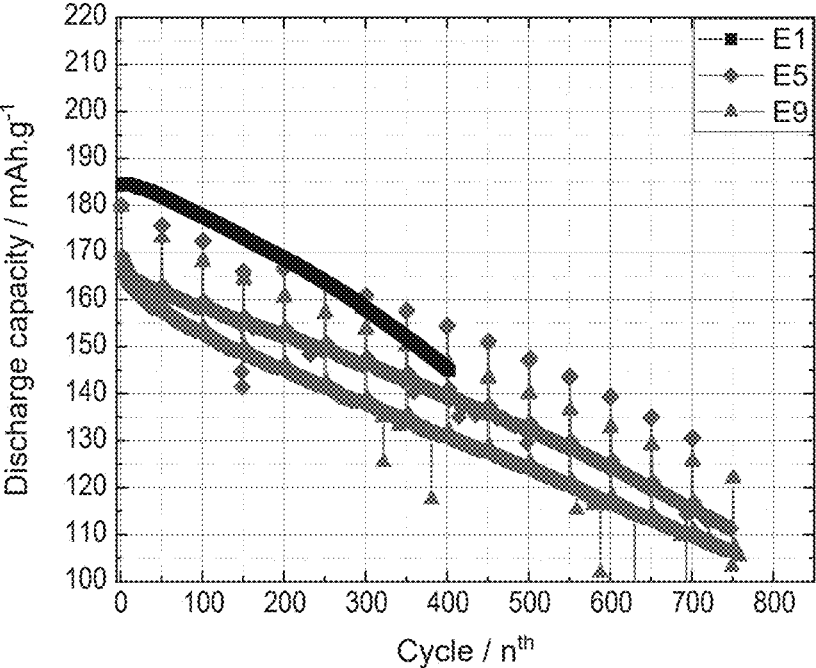
FIG. 4B is a plot of un-normalized specific discharge capacity, referenced relative to the weight of the positive electrode active material, for the data shown in FIG. 4A.

Example 3—Cycling Performance of LiPF$_6$/LiTFSI Electrolytes With Different Solvents, Additives and Co-Solvents The effects of additives and co-solvents were determined measuring cycling performance for electrolyte E5 comprising 0.5-5 wt % PFPN and electrolyte E9 comprising 0.1-2 wt % LPTB and 5-30 wt % EA. Coins cells with NMC622 positive electrode active material and SOC anode were prepared with each of the electrolytes E5 and E9. FIG. 4A is a plot of normalized capacity as a function of cycle number for the coin cells at 45° C. and cycled with 4 C charge/1 C discharge rates. A 1 C rate capacity check was carried out every 50 cycles. FIG. 4B shows a plot of un-normalized specific capacity for the data shown in FIG. 4A. For electrolytes E5 (E3+PFPN) and E9 (E2+LPTB and EA) improved cycling performance was observed relative to that of electrolyte E1 apart from an initial drop at short cycling.

Example 4—Cycling Performance of LiPF$_6$/LiTFSI Electrolytes with Selected Solvents, Additives and Co-Solvents and NMC811 Positive Electrode Active Material This example provides cycling results for cells with NMC811 active material with the same silicon based anode and with various electrolytes escribed herein.

Figure 5A:
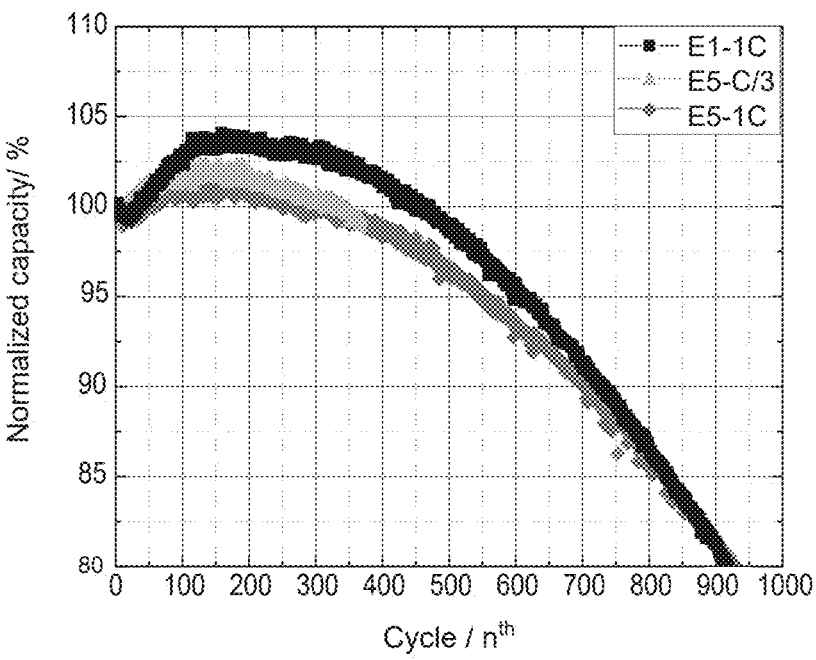
FIG. 5A is a plot of normalized capacity as a function of cycle number for coin cells prepared with electrolytes E1 and E5. The coin cells were cycled with C/3 charge/C/3 discharge and 1 C charge/1 C discharge rates. The electrode active materials were NMC811 for the positive active material and SOC for the negative electrode active material.
Figure 5B:
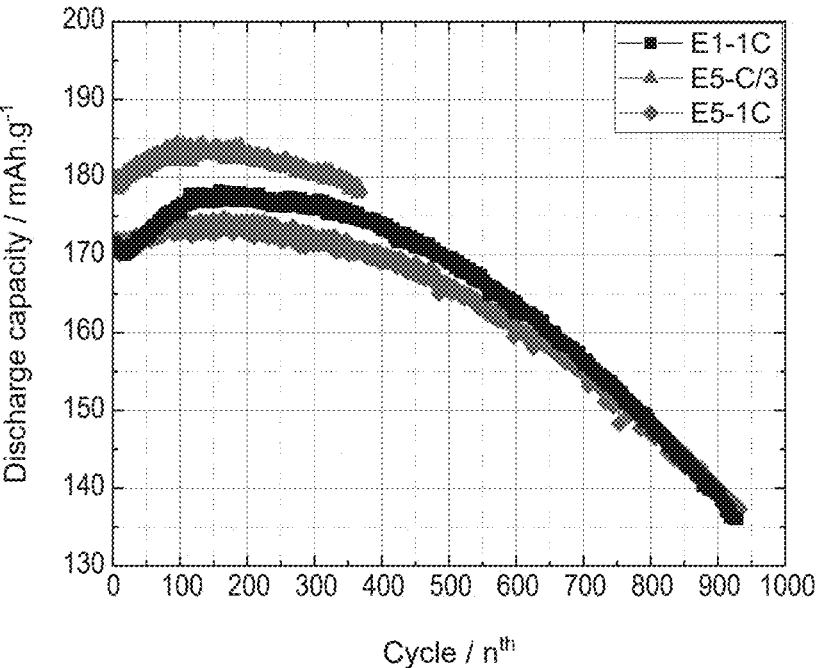
FIG. 5B is a plot of un-normalized specific discharge capacity, referenced relative to the weight of the positive electrode active material, for the data shown in FIG. 5A.

Coins cells with NMC811 positive electrode active material and SOC anode were prepared with each of electrolytes E1 and E5. Cycling performance of the coin cells were measured as described for Example 2, and results are shown in FIGS. 5A-5D. FIG. 5A is a plot of normalized capacity as a function of cycle number for coin cells cycled with C/3 charge-discharge rates and 1 C/1 C charge-discharge rates. Comparable cycle life was obtained for E5 as compared to E1, and cells based on each electrolyte cycles for 900 cycles or more while achieving 80% capacity relative to the seventh cycle. FIG. 5B shows a plot of un-normalized specific capacity for the data shown in FIG. 5A.

Figure 5C:
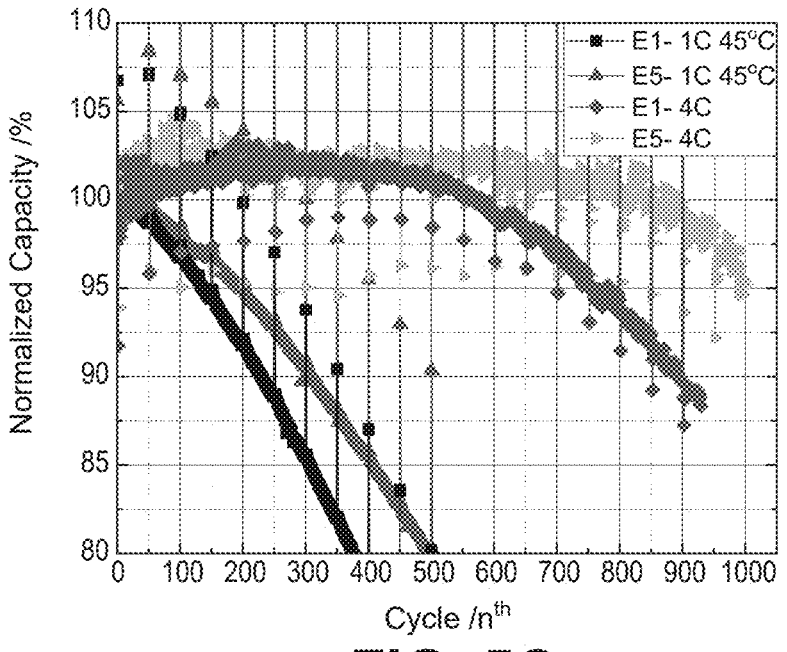
FIG. 5C is a plot of normalized capacity as a function of cycle number for the coin cells described in FIG. 5A, where cycling is carried out with a 4 C charge/1 C discharge rate (room temperature) and 1 C charge/1 C discharge rate (at 45° C.).
Figure 5D:
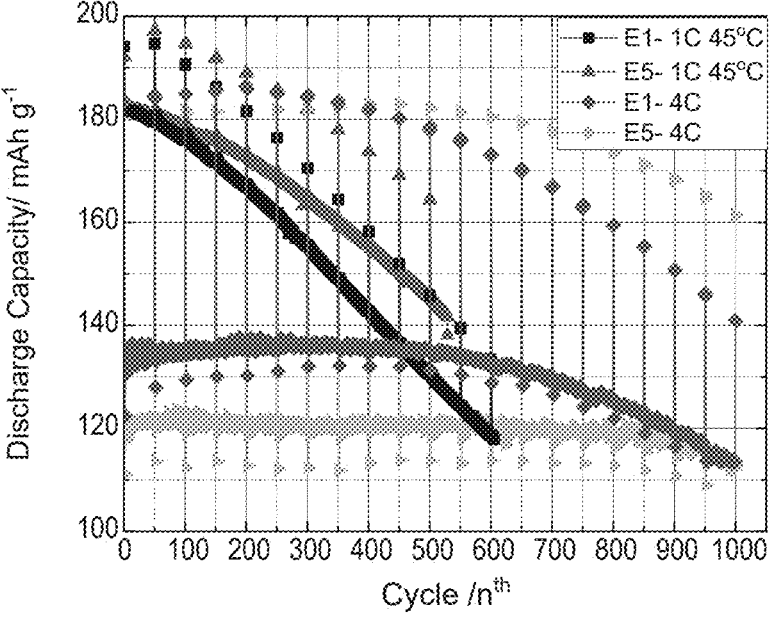
FIG. 5D is a plot of un-normalized specific discharge capacity, referenced relative to the weight of the positive electrode active material, for the data shown in FIG. 5C.

FIG. 5C is a plot of normalized capacity as a function of cycle number for coin cells at cycled with 4 C/1 C charge-discharge rates (room temperature) and 1 C/1 C charge-discharge rates (45° C.). Excellent cycle life may be projected for E5 as compared to E1. FIG. 5D shows a plot of un-normalized specific capacity for the data shown in FIG. 5C. Generally, under high rate conditions or high temperature conditions, E5 had better cycle performance relative to E1 for NMC811. Electrolyte E5 included additive PFPN.

Figure 6A:
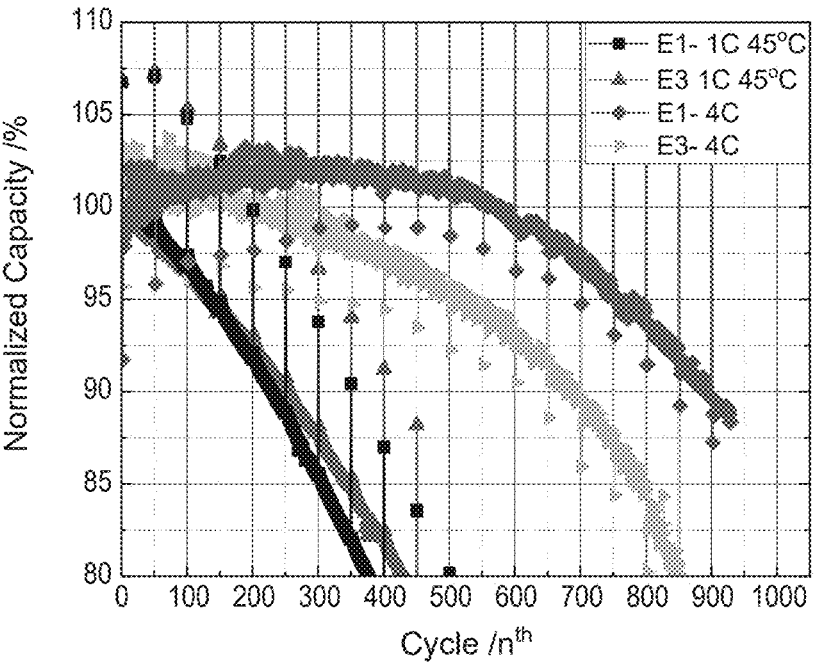
FIG. 6A is a plot of normalized capacity as a function of cycle number for coin cells prepared with electrolytes E1 and E3. The coin cells were cycled as described in FIG. 5C. The electrode active materials were NMC811 for the positive active material and SOC for the negative electrode active material.
Figure 6B:
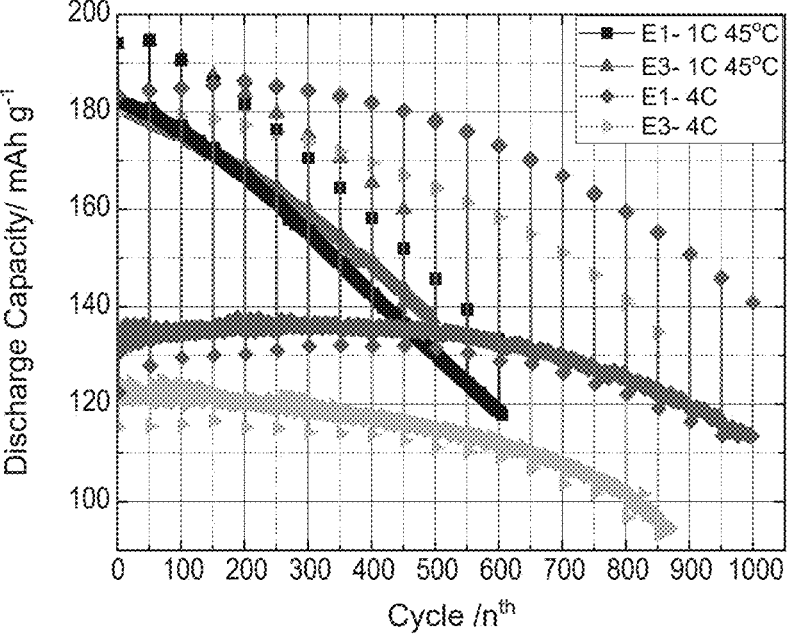
FIG. 6B is a plot of un-normalized specific discharge capacity, referenced relative to the weight of the positive electrode active material, for the data shown in FIG. 6A.

FIG. 6A is a plot of normalized capacity as a function of cycle number for coin cells prepared with electrolytes E1 and E3. The coin cells were cycled as described in FIG. 5C. The electrode active materials were NMC811 for the positive active material and SOC for the negative electrode active material. Cells were cycles at 1 C charge/1 C discharge at 45° C. or at 4 C charge/1 C discharge at room temperature. At the 1 C rate/45° C., the E1 and E3 electrolytes performed comparably, but at 4 C/1 C cycling, the E3 electrolyte did not perform as well as the E1 electrolyte. FIG. 6B shows a plot of un-normalized specific capacity for the data shown in FIG. 6A.

Figure 7A:
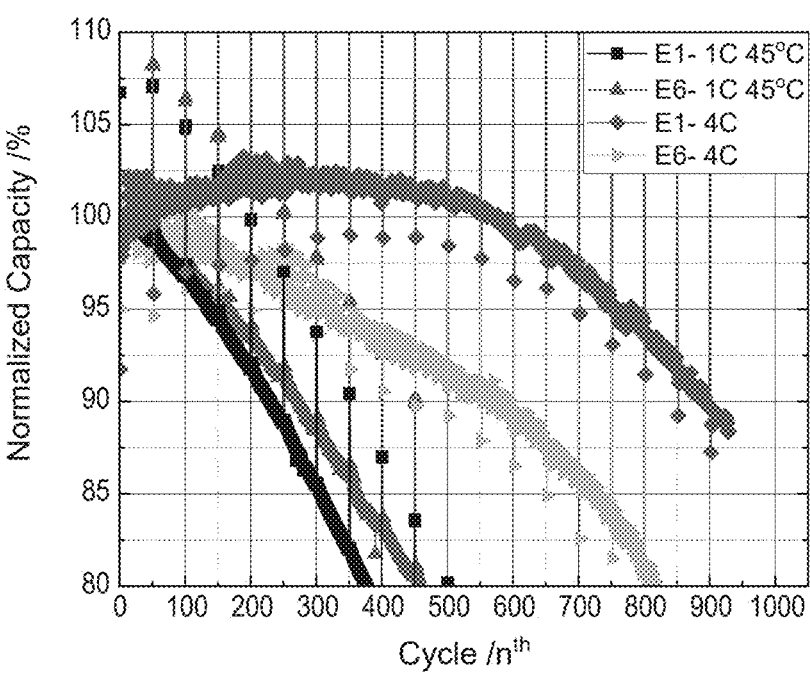
FIG. 7A is a plot of normalized capacity as a function of cycle number for coin cells prepared with electrolytes E1 and E6. The coin cells were cycled as described in FIG. 5C. The electrode active materials were NMC811 for the positive active material and SOC for the negative electrode active material.
Figure 7B:
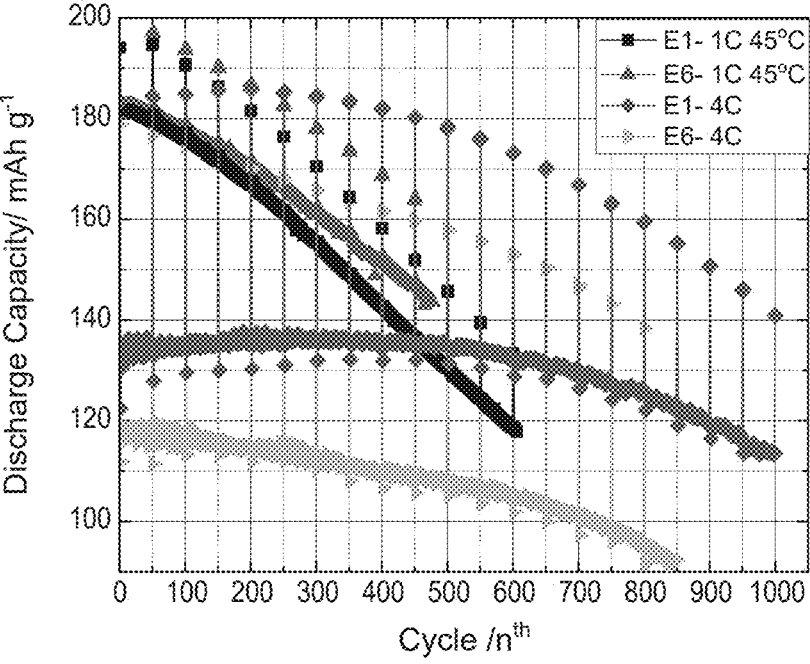
FIG. 7B is a plot of un-normalized specific discharge capacity, referenced relative to the weight of the positive electrode active material, for the data shown in FIG. 7A.

FIG. 7A is a plot of normalized capacity as a function of cycle number for coin cells prepared with electrolytes E1 and E6. The coin cells were again cycled with 1 C charge/1 C discharge at 45° C. and at 4 C/1 C at room temperature. The electrode active materials were NMC811 for the positive active material and SOC for the negative electrode active material. E6 had slightly better cycling performance at 45° C. and significantly worse high rate cycling. FIG. 7B shows a plot of un-normalized specific capacity for the data shown in FIG. 7A.

FIG. 8A is a plot of normalized capacity as a function of cycle number for coin cells prepared with electrolytes E1 and E7. Electrolyte E7 included additive TEP. The coin cells were again cycled with 1 C charge/1 C discharge at 45° C. and at 4 C/1 C at room temperature. The electrode active materials were NMC811 for the positive active material and SOC for the negative electrode active material. Compared with E1, cells with electrolyte E7 exhibited good high temperature cycling but poor high rate cycling. FIG. 8B shows a plot of un-normalized specific capacity for the data shown in FIG. 8A.

FIG. 9A is a plot of normalized capacity as a function of cycle number for coin cells prepared with electrolytes E1 and E8. Electrolyte E8 also included additive TEP. The coin cells were cycled with 1 C charge/1 C discharge at 45° C. and at 4 C/1 C at room temperature. The electrode active materials were NMC811 for the positive active material and SOC for the negative electrode active material. The performance of cells with electrolyte E8 was similar to cells with electrolyte E7. While high charge rate performance of cells with electrolytes E7 and E8 is poorer than cells with the E1 electrolyte, these cells still cycle well over 700 cycles with 80% capacity. FIG. 9B shows a plot of un-normalized specific capacity for the data shown in FIG. 9A.

The data for Example 4 show improved cycle life for electrolytes E3 and E5-E8 having PFPN, TEP, and combinations of PFPN and TEP, as compared to E1 electrolyte. In particular, E5 exhibit better cycle life at both 1 C/1 C and 4 C/1 C rates and better 1 C/1 C cycling when stored at 45° C.

Example 5—Gassing Behavior of $LiPF_6$ Electrolytes with Various Co-Solvents This example explores swelling behavior of pouch cells formed with selected electrolytes from Table 3.

Lithium ion cells having the SOC anode and NMC622 cathode in combination with the E21-E24 electrolytes as well as reference electrolyte E1 were prepared and studies were carried out as described above for Example 2. FIG. 10 shows hours of storage at 65° C. versus percentage change in thickness for E21-E24 electrolytes and the E1, E2 and E10 electrolytes used in conjunction with pouch cells. As shown in FIG. 10, pouch cells having the baseline E1 electrolyte exhibited the greatest undesirable changes in thickness over a 48 hour period, as compared to the other pouch cells.

Example 6—Cycling Performance of $LiPF_6$ Electrolytes with Various Co-Solvents Cycling performance at different rates was measured for coin cells with E21-E25 electrolytes. The data for the each of the E21-E25 electrolytes are shown compared to that for E1 electrolyte.

FIG. 11A is a plot of normalized capacity as a function of cycle number for coin cells prepared with electrolytes E1 and E21. The coin cells were cycled as described in FIG. 5C, except that all cycling was performed at room temperature. The electrode active materials were NMC622 for the positive active material and SOC for the negative electrode active material. Electrolyte E21 exhibited behavior similar to that of E1 when 1 C charge/1 C discharge rate was employed, but inferior behavior when 4 C charge/1 C discharge rate was employed. FIG. 11B is a plot of un-normalized specific discharge capacity for the data shown in FIG. 11A.

FIG. 12A is a plot of normalized capacity as a function of cycle number for coin cells prepared with electrolytes E1 and E22. The coin cells were cycled as described in FIG. 5C, except that the cycling was at room temperature. The electrode active materials were NMC622 for the positive active material and SOC for the negative electrode active material. Electrolyte E22 exhibited behavior similar to that of E1 when 1 C charge/1 C discharge rate was employed, but inferior behavior when 4 C charge/1 C discharge rate was employed. FIG. 12B shows a plot of un-normalized specific capacity for the data shown in FIG. 12A.

FIG. 13A is a plot of normalized capacity as a function of cycle number for coin cells prepared with electrolytes E1 and E23. The coin cells were cycled as described in FIG. 5C, except the cycling was performed at room temperature. The electrode active materials were NMC622 for the positive active material and SOC for the negative electrode active material. Electrolyte E23 exhibited inferior behavior compared to that of E1 when 1 C charge/1 C discharge and 4 C charge/1 C discharge rates were employed. FIG. 13B shows a plot of un-normalized specific capacity for the data shown in FIG. 13A.

FIG. 14A is a plot of normalized capacity as a function of cycle number for coin cells prepared with electrolytes E1 and E24. The coin cells were cycled as described in FIG. 5C, except that the cycling was performed at room temperature. The electrode active materials were NMC622 for the positive active material and SOC for the negative electrode active material. Electrolyte E24 exhibited inferior behavior compared to that of E1 when 1 C charge/1 C discharge and 4 C charge/1 C discharge rates were employed. FIG. 14B shows a plot of un-normalized specific capacity for the data shown in FIG. 14A.

FIG. 15A is a plot of normalized capacity as a function of cycle number for coin cells prepared with electrolytes E1 and E25. The coin cells were cycled as described in FIG. 5C, except that the cells were cycled at room temperature. The electrode active materials were NMC622 for the positive active material and SOC for the negative electrode active material. Electrolyte E25 exhibited behavior similar to that of E1 when 1 C charge/1 C discharge rate was employed, but inferior behavior when 4 C charge/1 C discharge rate was employed. FIG. 15B shows a plot of un-normalized specific capacity for the data shown in FIG. 15A.

The data suggest that when a single salt $LiPF_6$ electrolyte is employed, replacement of EMC with DMC can provide similar results, but mostly provides inferior results, regardless of co-solvents being present in the electrolyte.

Example 7—Cycling Performance at Different Rates for Electrolytes with Various Lithium Salts Including $LiPF_6/LiFSI$ Discharge capacity at various discharge rates as a function of cycle number was measured for coin cells with electrolytes E1 and E10-E13 comprising singles salt electrolytes $LiPF_6$, LiFSI and LiTFSI and a dual salt electrolyte $LiPF_6/$LiFSI.

The fast charge test protocol for evaluating rate performance is shown in Table 7.

TABLE 7

| Test Protocol | |
| --- | --- |
| Step | Description |
| a) | 2 cycles for each of the following C-rates |
| | $CC^1 + CV^2$ to 4.3 V charge/CC to 2.5 V discharge |
| | C/10 charge + C/10 discharge |
| | C/5 charge + C/5 discharge |
| | C/3 charge + C/3 discharge |
| | 1 C charge + 1 C discharge |
| b) | 3 cycles for each of the following CC currents |
| | CC + CV to 4.3 V charge (total time limited to 15 min.)/ |
| | CC to 2.5 V discharge at 1 C rate |
| | 15 mA - near true 15 minute constant current |
| | 20 mA |
| | 25 mA |
| | 30 mA |
| | 35 mA |
| | 40 mA - near 15 minute constant voltage |
| c) | 2 cycles |
| | CC + CV to 4.3 V charge/CC to 2.5 V discharge at C/3 rate |

[1]CC = constant current
[2]CV = constant voltage

FIG. 16 is a plot of discharge capacity as a function of cycle number for coin cells prepared with electrolytes E1 and E10-E12, all single salt electrolytes, where cycling is carried out according to the test protocol shown in Table 7. The electrode active materials were NMC622 for the positive active material and silicon oxide composite SOC for the negative active material. Electrolyte E11 with LiFSI exhibited improved 4 C discharge as compared to E1. Electrolytes E10-E12 exhibited rate performance as some function of conductivity, i.e., LiFSI>LiPF$_6$>LiFSI.

FIG. 17 is a plot of discharge capacity as a function of cycle number for coin cells prepared with electrolytes E10 and E11 single salt electrolytes and electrolyte E13 dual salt electrolyte, where cycling is carried out according to the test protocol shown in Table 7 The electrode active materials were NMC622 for the positive active material and silicon oxide composite SOC for the negative active material. Electrolyte E13 exhibited "15 minute-4 C charge" performance similar to that of electrolyte E10; the dual salt LiPF$_6$/LiFSI electrolyte exhibit similar performance to that of single salt LiFSI electrolyte.

FIG. 18 is a plot of normalized capacity as a function of cycle number for a coin cell prepared with electrolyte E14 dual salt LiPF$_6$/LiFSI electrolyte. The concentration of each salt LiPF$_6$ and LiFSI in E14 was the same, whereas the concentration of LiFSI was greater than that of LiPF$_6$ in E13. The coin cell was cycled with a 1 C charge/1 C discharge rate. The electrode active materials were NMC811 for the positive active material and silicon oxide composite SOC for the negative active material.

Electrolytes with mixed salt systems of LiFSI and LiPF$_6$ exhibited 4 C charge performance seemingly better than that of cells with pure LiFSI, although one repeat exhibited deteriorating performance likely due to a manufacturing flaw.

Example 8—Cycling Performance of LiPF$_6$/LiFSI and LiPF$_6$/LiTFSI Electrolytes with No Low Boiling Solvent FIG. 19A is a plot of un-normalized specific discharge capacity as a function of cycle number for coin cells prepared with electrolytes E2 and E15. Electrolyte E15 includes dual salt electrolyte LiPF$_6$/LiFSI with co-solvent PC having a boiling point of 242° C. Electrolyte E2 includes the same dual salt combination and co-solvent PC in addition to co-solvent EA having a boiling point of 77° C. The data are referenced relative to the weight of the positive electrode active material. The electrode active materials were NMC811 for the positive active material and silicon oxide composite SOC for the negative active material. The coin cells were cycled with different charge rates according to the charge rate protocol shown below in Table 8.

TABLE 8

| | Test Protocol |
|---|---|
| Step | Description |
| a) | 1 cycle C/10 charge + C/10 discharge |
| | 1 cycle C/5 charge + C/5 discharge |
| | 2 cycles C/3 charge + C/3 discharge |
| | 2 cycles 1 C charge + 1 C discharge |
| b) | 3 cycles for each of the following C-rates |
| | 2 C charge + 1 C discharge |
| | 3 C charge + 1 C discharge |
| | 4 C charge + 1 C discharge |
| | 5 C charge + 1 C discharge |
| c) | 2 cycles |
| | C/3 charge + C/3 discharge |

The data show that E15 exceeds or is similar to that of E2. Thus, solvents free of low boiling components could be employed with good high rate cycling performance.

FIG. 19B is a plot of normalized capacity as a function of 1 C charge/1 C discharge rate cycle number for coin cells.

The coin cells were cycled with 1 C charge/1 C discharge rate. The electrode active materials were NMC811 for the positive active material and silicon oxide composite SOC for the negative active material. FIG. 19C is a plot un-normalized specific discharge capacity cycled at a 4 C charge and 1 C discharge rate, referenced relative to the weight of the positive electrode active material, for the data shown in FIG. 19B.

Example 9—Cycling Performance of LiPF$_6$/LiTFSI Electrolytes in Pouch Cells This example explores cycling performance of various electrolytes in pouch batteries or cells. Pouch cells with NMC811 positive electrode active material and SOC anode were prepared with each of the electrolytes E3, E5 and E7. The pouch cells had an energy density of 315 Wh/kg based on the total weight of the cell and a capacity of 12 Ah at C/3. Cycling performance of the pouch cells under different conditions were measured and results are shown FIGS. 20A-21B.

FIG. 20A is a plot of normalized capacity as a function of cycle number for the pouch cells cycled with 1 C charge/1 C discharge rates, from 4.2V to 2.5V. Electrolytes E3, E5 and E7 exhibited similar cycling behavior wherein 1000 cycles were carried out without the normalized capacity dropping below 90%. FIG. 20B shows a plot of un-normalized specific discharge capacity, referenced relative to the weight of the positive electrode active material, for the data shown in FIG. 20A.

FIG. 21A is a plot of normalized capacity as a function of cycle number for the pouch cells cycled with 4 C charge/1 C discharge rates, from 4.2V to 2.5V. A C/3 cap check was carried out every 50 cycles. Electrolytes E3, E5 and E7 exhibited similar cycling behavior wherein 1000 cycles were carried out without the normalized capacity dropping below 90%. Electrolyte E3 exhibited cycling behavior wherein 1200 cycles were carried out without the normalized capacity dropping below 90%. FIG. 21B shows a plot of un-normalized specific discharge capacity, referenced relative to the weight of the positive electrode active material, for the data shown in FIG. 21A.

Example 10—Cycling Performance of LiPF$_6$/LiTFSI Electrolyte in Pouch Cell Including Different Cathode Active Material This example explores cycling performance of E3 in a pouch cell including a different cathode active material. The NCM811 cathode is single crystal in nature compared to previously reported polycrystalline NCM811 cathodes. The pouch cell had an energy density of 325 Wh/kg based on the total weight of the cell and a capacity of 12 Ah at C/3. Cycling performance of the pouch cell under different conditions was measured and results are shown FIGS. 22A-24B.

FIG. 22A is a plot of normalized capacity as a function of cycle number for the pouch cell cycled with 1 C charge/1 C discharge rate, from 4.2V to 2.5V. After 800 cycles, the normalized capacity of the cell remained above 80%. FIG. 22B shows a plot of un-normalized specific discharge capacity, referenced relative to the weight of the positive electrode active material, for the data shown in FIG. 22A.

FIG. 23A is a plot of normalized capacity as a function of cycle number for the pouch cell cycled with 4 C charge/1 C discharge rate, from 4.2V to 2.5V. A C/3 cap check was carried out every 50 cycles. After 600 cycles, the normalized capacity of the cell remained above 80%. FIG. 23B shows a plot of un-normalized specific discharge capacity, referenced relative to the weight of the positive electrode active material, for the data shown in FIG. 23A.

FIG. 24A is a plot of normalized capacity as a function of cycle number for the pouch cell cycled with 1 C charge/1 C discharge rate, from 4.2V to 2.5V, wherein cycling was carried out for the pouch cell at 45° C. After 500 cycles, the normalized capacity of the cell remained above 90%. FIG. 24B shows a plot of un-normalized specific discharge capacity, referenced relative to the weight of the positive electrode active material, for the data shown in FIG. 24A.

Example 11—Cycling Performance of Electrolytes with Additive PS

Cycling performance of electrolytes including PS as an additive were determined for coin cells prepared with E1, E3 and E26-E29. The coin cells included single crystal NCM811 positive electrode active material and SOC negative electrode. Cycling performance of the coin cells under different conditions were measured and results are shown FIGS. 25, 26, 27A and 27B.

FIG. 25 is a plot of specific capacity, referenced relative to the weight of the positive electrode active material, as a function of cycle number for the coin cells prepared with E1, E26 and E27. Cycling was carried out with 1 C charge/1 C discharge rates, from 4.2V to 2.5V. The data show that specific capacity begins to drop off after about 150 cycles and rapidly deteriorates after about 300 cycles.

FIG. 26 is a plot of specific capacity, referenced relative to the weight of the positive electrode active material, as a function of cycle number for the coin cells prepared with E1, E26 and E27. Cycling was carried out with 4 C charge/1 C discharge rates, from 4.2V to 2.5V. A C/3 cap check was carried out every 50 cycles. The data show that specific capacity begins to drop off after about 400 cycles.

FIG. 27A is a plot of specific capacity, referenced relative to the weight of the positive electrode active material, as a function of cycle number for the coin cells prepared with E3, E28 and E29. Cycling was carried out with 4 C charge/1 C discharge rates, from 4.2V to 2.5V. A C/3 cap check was carried out every 50 cycles. The data show that specific capacity drops off after about 350 cycles. FIG. 27B shows a plot of capacity retention for the data shown in FIG. 27A. The data are similar to the data shown in FIG. 27A.

Example 12—Gassing Behavior of Electrolytes with Different Additives

Pouch cells having the SOC anode and NMC622 cathode in combination with the E30-32 electrolytes were prepared and studies were carried out as described above for Example 1. FIG. 28 shows hours of storage at 65° C. versus percentage change in thickness of the cell. The data show that less gassing is observed by adding PFPN to the electrolyte, and even less gassing by adding PFPN and PS.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A lithium ion cell comprising:
a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 to about 55 wt % graphitic carbon;
a positive electrode comprising a lithium metal oxide, conductive carbon, and a polymer binder;
a separator between the negative electrode and the positive electrode;
electrolyte comprising from about 1.1M to about 2.2M lithium salt and non-aqueous solvent, wherein the lithium salt consists essentially of $LiPF_6$, from about 60 mole percent to about 100 mole percent LiTFSI, and no more than about 2 mole percent optional other lithium salts, wherein the non-aqueous solvent comprises from about 5 vol % to about 25 vol % fluoroethylene carbonate, 50 vol % to 90 vol % dimethyl carbonate, ethylmethyl carbonate or a mixture thereof, and no more than about 35 vol % optional cosolvents selected from the group consisting of propylene carbonate, ethyl acetate, methyl acetate, propyl acetate, and mixtures thereof; and
a container enclosing the negative electrode, the positive electrode, the separator and the electrolyte;
wherein the cell has a room temperature discharge specific capacity at a rate of 4 C of at least about 120 mAh/g between 2.5V and a selected charge voltage based on the weight of the cathode active material.

2. The lithium ion cell of claim 1 wherein the silicon-based active material comprises a silicon-silicon oxide carbon composite material.

3. The lithium ion cell of claim 1 wherein the graphitic carbon has a BET surface area from about 1 $m^2/g$ to about 20 $m^2/g$.

4. The lithium ion cell of claim 1 wherein the polymer binder of the negative electrode comprises a blend of polyimide and a water based polymer binder.

5. The lithium ion cell of claim 1 wherein the polymer binder of the negative electrode comprises a blend of at least about 50 wt % polyimide and a second polymer binder selected from the group consisting of polyvinylidene fluoride, cellulose, styrene-butadiene rubber, lithiated polyacrylic acid, copolymers thereof and mixtures thereof, wherein the polyimide has an elongation of at least about 40% and the second polymer binder has an elasticity greater than that of the polyimide.

6. The lithium ion cell of claim 1 wherein the polymer binder of the negative electrode comprises a water soluble binder.

7. The lithium ion cell of claim 6 wherein the water soluble binder comprises poly (acrylamide-co-acrylate salt)

having at least about 5 mole percent of the acrylate salt moiety and at least about 5 mole percent of the acrylamide moiety.

8. The lithium ion cell of claim 6 wherein the water soluble binder comprises metal-poly acrylic acid/acrylate (M-PAA) moieties form corresponding monomers, where M is a cation of lithium, sodium, potassium or a mixture thereof.

9. The lithium ion cell of claim 1 wherein the lithium metal oxide comprises a lithium nickel cobalt manganese oxide approximately represented by the formula $LiNi_xMn_yCo_zO_2$, where $0.45 \leq x$, $0.05 \leq y$, $z \leq 0.35$, $x+y+z \approx 1$.

10. The lithium ion cell of claim 9 wherein the lithium metal oxide further comprises a lithium and manganese rich lithium nickel manganese cobalt oxide represented by the formula $Li_{1+b}Ni_\alpha Mn_\beta CO_\gamma A_\delta O_{2-z}F_z$, where $b+\alpha+\beta+\gamma+\delta \approx 1$, b ranges from about 0.04 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15 and z ranges from 0 to 0.2, with the proviso that both $\alpha$ and $\gamma$ are not 0, and where A is a metal different from lithium, manganese, nickel and cobalt.

11. The lithium ion cell of claim 1 further comprising supplemental lithium in an amount from about 80% to about 180% of the negative electrode first cycle irreversible capacity loss, the lithium ion cell having a ratio at the fourth cycle at a discharge rate of C/3 of negative electrode capacity divided by the positive electrode capacity from about 1.10 to about 1.95.

12. The lithium ion cell of claim 1 wherein the negative electrode active material comprises from about 60 wt % to about 95 wt % silicon-oxide based material and from about 5 wt % to about 40 wt % graphite.

13. The lithium ion cell of claim 1 wherein the solvent consists essentially of from about 60 vol % to about 85 vol % ethylmethyl carbonate and from about 10 vol % to about 20 vol % fluoroethylene carbonate and no more than 25 vol % optional cosolvent selected from the group consisting of propylene carbonate, ethyl acetate, methyl acetate, propyl acetate, and mixtures thereof.

14. The lithium ion cell of claim 13 wherein the lithium salt consists essentially of from about 0.3M to about 0.6M $LiPF_6$ and from about 0.8M to about 1.4M LiTFSI.

15. The lithium ion cell of claim 14 wherein the electrolyte consists essentially of:
  lithium salt,
  solvent,
  no more than about 10 weight percent (wt %) optional additive selected from the group consisting of triethyl phosphate (TEP), ethoxy (pentafluoro) cyclotriphosphazene (PFPN), 1,3-propane sultone (PS), and mixtures thereof; and
  no more than about 5 wt % additional cosolvents and/or lithium-free organic additives.

16. The lithium ion cell of claim 1 wherein the lithium ion cell has a capacity at the 700th cycle of at least about 80% of the capacity at the 7th cycle when cycled at room temperature from the 10th cycle to the 700th cycle between 2.5V and the selected charge voltage at a rate of 4 C.

17. A lithium ion cell comprising:
  a negative electrode comprising from about 75 wt % to about 96 wt % an active material from about 0.1 wt % to about 7 wt % nanoscale conductive carbon and from about 4 wt % to about 20 wt % polymer binder, wherein the active material comprises from about 45 wt % to about 100% silicon-based active material, and from 0 wt % to about 55 wt % graphitic carbon;
  a positive electrode comprising a lithium metal oxide, conductive carbon, and a polymer binder;
  a separator between the negative electrode and the positive electrode;
  electrolyte comprising from about 1.0M to about 2.5M lithium salt and non-aqueous solvent, wherein the lithium salt consists essentially of $LiPF_6$, from about 60 mole percent to about 100 mole percent LiTFSI, and no more than about 2 mole percent optional other lithium salts, and wherein the non-aqueous solvent comprises from about 5 vol % to about 25 vol % fluoroethylene carbonate; and
  a container enclosing the negative electrode, the positive electrode, the separator and the electrolyte;
  wherein the cell has a room temperature discharge specific capacity at a rate of 4 C of at least about 120 mAh/g between 2.5V and a selected charge voltage based on the weight of the cathode active material and
  wherein the lithium ion cell having a capacity at the 700th cycle of at least about 80% of the capacity at the 7th cycle when cycled at room temperature from the 7th cycle to the 700th cycle between 2.5V and the selected charge voltage at a rate of 4 C.

* * * * *